US009753959B2

(12) United States Patent
Birdwell et al.

(10) Patent No.: US 9,753,959 B2
(45) Date of Patent: Sep. 5, 2017

(54) METHOD AND APPARATUS FOR CONSTRUCTING A NEUROSCIENCE-INSPIRED ARTIFICIAL NEURAL NETWORK WITH VISUALIZATION OF NEURAL PATHWAYS

(71) Applicant: University of Tennessee Research Foundation, Knoxville, TN (US)

(72) Inventors: J. Douglas Birdwell, Oak Ridge, TN (US); Mark E. Dean, Jefferson City, TN (US); Margaret Drouhard, Knoxville, TN (US); Catherine Schuman, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 385 days.

(21) Appl. No.: 14/513,497

(22) Filed: Oct. 14, 2014

(65) Prior Publication Data

US 2015/0106306 A1  Apr. 16, 2015

Related U.S. Application Data

(60) Provisional application No. 61/891,621, filed on Oct. 16, 2013, provisional application No. 61/934,052, (Continued)

(51) Int. Cl.
*G06N 3/02* (2006.01)
*G06F 17/30* (2006.01)
(Continued)

(52) U.S. Cl.
CPC ....... *G06F 17/30312* (2013.01); *G06N 3/049* (2013.01); *G06N 3/063* (2013.01);
(Continued)

(58) Field of Classification Search
CPC ...................................................... G06N 3/02
See application file for complete search history.

(56) References Cited

U.S. PATENT DOCUMENTS 7,533,071 B2   5/2009  Snook
8,311,965 B2  11/2012  Breitwisch et al.
(Continued)

FOREIGN PATENT DOCUMENTS

WO   WO2004027704   4/2004

OTHER PUBLICATIONS

Matlab, Neural Network Toolbox 6 Users Guide, 2010, 901 pages.*
(Continued)

*Primary Examiner* — Vincent Gonzales
(74) *Attorney, Agent, or Firm* — Cameron LLP

(57) ABSTRACT

A method and apparatus for constructing one of a neuroscience-inspired artificial neural network and a neural network array comprises one of a neuroscience-inspired dynamic architecture, a dynamic artificial neural network array and a neural network array of electrodes associated with neural tissue such as a brain, the method and apparatus having a special purpose display processor. The special purpose display processor outputs a display over a period of selected reference time units to demonstrate a neural pathway from, for example, one or a plurality of input neurons through intermediate destination neurons to an output neuron in three dimensional space. The displayed neural network may comprise neurons and synapses in different colors and may be utilized, for example, to show the behavior of a neural network for classifying hand-written digits between values of 0 and 9 or recognizing vertical/horizontal lines in a grid image of lines.

26 Claims, 81 Drawing Sheets

Related U.S. Application Data filed on Jan. 31, 2014, provisional application No. 61/946,179, filed on Feb. 28, 2014, provisional application No. 61/951,690, filed on Mar. 12, 2014, provisional application No. 62/001,951, filed on May 22, 2014, provisional application No. 62/024,081, filed on Jul. 14, 2014.

(51) Int. Cl.
  *G06N 3/063* (2006.01)
  *G06N 3/08* (2006.01)
  *G06N 3/10* (2006.01)
  *G06N 3/04* (2006.01)

(52) U.S. Cl.
  CPC ............. *G06N 3/0635* (2013.01); *G06N 3/08* (2013.01); *G06N 3/086* (2013.01); *G06N 3/10* (2013.01)

(56) References Cited

U.S. PATENT DOCUMENTS

| | | | |
|---|---|---|---|
| 8,433,665 | B2 | 4/2013 | Tang et al. |
| 8,510,239 | B2 | 8/2013 | Modha |
| 8,515,885 | B2 | 8/2013 | Modha |
| 8,600,919 | B2 | 12/2013 | Poon et al. |
| 2009/0292661 | A1 | 11/2009 | Hass |
| 2009/0327195 | A1* | 12/2009 | Iscen ............... G06N 5/042 706/47 |
| 2011/0028827 | A1 | 2/2011 | Sitaram et al. |
| 2012/0005141 | A1 | 1/2012 | Sasagawa |
| 2012/0036099 | A1 | 2/2012 | Venkatraman et al. |
| 2012/0109863 | A1 | 5/2012 | Esser et al. |
| 2013/0073497 | A1 | 3/2013 | Akopyan et al. |
| 2014/0195468 | A1* | 7/2014 | Mohammadi ............ G06N 3/08 706/21 |
| 2015/0006444 | A1 | 1/2015 | Tamatsu et al. |

OTHER PUBLICATIONS

J. Yoshimi, "Simbrain: A visual framework for neural network analysis and education", Brains, Minds, and Media, vol. 3, May 23, 2008, 27 pages.*

L. Hansen and P. Salamon, "Neural Network Ensembles", IEEE Trans. on Pattern Analysis and Mach. Intel., vol. 12, No. 10, Oct. 1990, pp. 993-1001.*

Y. Le Cun et al., "Handwritten Digit Recognition with a Back-Propagation Network", in Neural Information Proc. Sys., 1989, pp. 396-404.*

Hawkins, Jeff et al., "Sequence memory for prediction, inference and behavior," Phil. Trans. Royal Soc. B, pp. 1203-1209, 2009.

Glackin et al., "A Novel Approach for the Implementation of Large Scale Spiking Neural Networks on FPGA Hardware," IWANN 2005, LNCS 3512, pp. 552-563, 2005.

Cassidy et al., "FPGA Based Silicon Spiking Neural Array," Biomedical Circuits and Systems Conference (BIOCAS 2007), pp. 75-78, IEEE, 2007.

Cassidy et al., "Cognitive Computing Building Block: A Versatile and Efficient Digital Neuron Model for Neurosynaptic Cores," IBM Research, pp. 1-10, 2013.

Sharp et al., "Power-efficient simulation of detailed cortical microcircuits on SpiNNaker," Journal of Neuroscience Methods, 201, pp. 110-118, 2012.

Lewis, M. Anthony et al., "Control of a robot leg with an adaptive a(nalog)VLSI CPG chip," Neurocomputing, 38-40, 2001, pp. 1409-1421.

Lewis, M. Anthony et al., "CPG Design Using Inhibitory Networks," Proc. of the 2005 IEEE International Conference on Robotics and Automation, (ICRA 2005), pp. 3682-3687, 2005.

Friedmann, Simon et al., "Reward-based learning under hardware constraints—using a RISC processor embedded in a neuromorphic substrate," Frontiers in Neuroscience, 7-160, pp. 1-17, 2013.

Benjamin, B. V. et al., "Neurogrid: A mixed-analog-digital multichip system for large-scale neural simulations." Proceedings of the IEEE, 102, pp. 699-716, 2014.

Indiveri, Giacomo et al., "Neuromorphic silicon neuron circuits." Frontiers in Neuroscience, 5-73, pp. 1-23, 2011.

Abbass, Hussein A., Michael Towsey, and G. Finn. "C-Net: A method for generating non-deterministic and dynamic multivariate decision trees." Knowledge and Information Systems 3.2 (2001): pp. 184-197.

Belatreche, Ammar, Laim P. Maguire, and Martin McGinnity. "Advances in design and application of spiking neural networks." Soft Computing 11.3 (2007): pp. 239-248.

Bohte, Sander M., Joost N. Kok, and Han La Poutre. "Error-backpropagation in temporally encoded networks of spiking neurons." Neurocomputing 48.1 (2002): pp. 17-37.

Garcia-Pedrajas, Nicolás, Domingo Ortiz-Boyer, and César Hervás-Martínez. "An alternative approach for neural network evolution with a genetic algorithm: Crossover by combinatorial optimization." Neural Networks 19.4 (2006): pp. 514-528.

Jin, Yaochu, Ruojing Wen, and Bernhard Sendhoff. "Evolutionary multi-objective optimization of spiking neural networks." Artificial Neural Networks—ICANN 2007. Springer Berlin Heidelberg, 2007. pp. 370-379.

Mangasarian, Olvi L., R. Setiono, and W. H. Wolberg. "Pattern recognition via linear programming: Theory and application to medical diagnosis." Large-scale numerical optimization (1990): pp. 22-31.

Michie, Donald, David J. Spiegelhalter, and Charles C. Taylor. "Machine learning, neural and statistical classification." (1994).

Parekh, Rajesh, Jihoon Yang, and Vasant Honaver. "Constructive neural-network learning algorithms for pattern classification." Neural Networks, IEEE Transactions on 11.2 (2000): pp. 436-451.

Pavlidis, N. G., et al. "Spiking neural networks training using evolutionary algorithms." Neural Networks, 2005 IJCNN'05, Proceedings, 2005 IEEE International Joint Conference on, vol. 4., IEEE, 2005. pp. 2190-2194.

Setiono, Rudy, and Lucas Chi Kwong Hui. "Use of a quasi-Newton method in a feedforward neural network construction algorthm." Neural Networks, IEEE Transactions on 6.1 (1995): pp. 273-277.

Moore, Kendra E., and Jack C. Chiang. "ALPHA/Sim: ALPHA/Sim simultaion software tutorial," Proceedings of the 32nd conference on Winter simulation, pp. 259-267. Society for Computer Simulation International, 2000.

Poor, H. Vincent, and Olympia Hadjiliadis. Quickest detection, vol. 40, pp. 102-129, Cambridge: Cambridge University Press, 2009.

Van Trees, Harry L.. Detection, Estimation, and Modulation Theory—Part I—Detection, Estimation, and Linear Modulation Theory, pp. 23-45, John Wiley & Sons, 2001.

Rosenblatt, F., "The perception: A probabilistic model for information storage and organization in the brain." Psycological Review, 65(6): pp. 386-408, 1958.

Fogel, David B., Eugene C. Wasson III, and Edward M. Boughton. "Evolving neural networks for detecting breast cancer." Cancer letters, 96.1, pp. 49-53 (1995).

Boyd, Stephen P., Venkataramanan Balakrishnan, Craig H. Barratt, Nasser M. Khraishi, Xiaoming Li, David G. Meyer, and Stephen A. Norman. "A new CAD method and associated architectures for linear controllers." IEEE Transactions on Automatic Control, 33, No. 3, pp. 268-283, 1988.

Garcia, Carlos E., and A. M. Morshedi. "Quadratic programming solution of dynamic matrix control (QDMC)." Chemical Engineering Communications 46, No. 1-3, pp. 73-87, 1986.

Athans, Michael, David Castanon, K-P. Dunn, C. Greene, Wing Lee, N. Sandell Jr, and Alan S. Willsky. "The stochastic control of the F-8C aircraft using a multiple model adaptive control (MMAC) method—Part I: Equilibrium flight." IEEE Transactions on Automatic Control, 22, No. 5, pp. 768-780, 1977.

Narendra, Kumpati S., and Jeyendran Balakrishnan. "Adaptive control using multiple models." IEEE Transactions on Automatic Control, 42, No. 2, pp. 171-187, 1997.

(56) References Cited

OTHER PUBLICATIONS

Anderson, Brian, Thomas Brinsmead, Daniel Liberzon, and A. Stephen Morse. "Multiple model adaptive control with safe switching." International journal of adaptive control and signal processing 15, No. 5, pp. 445-470, 2001.

Morshedi, A. M., C. R. Cutler, and T. A. Skrovanek. "Optimal Solution of Dynamic Matrix Control with Linear Programing Techniques (LDMC)." Proc. American Control Conference, pp. 199-208, 1985.

Gattu, Gangadhar, and Evanghelos Zafiriou. "Nonlinear quadratic dynamic matrix control with state estimation." Industrial & engineering chemistry research 31, No. 4, pp. 1096-1104, 1992.

Morari, Manfred, and Jay H Lee. "Model predictive control: past, present and future." Compters & Chemical Engineering 23, No. 4, pp. 667-682, 1999.

Yao, Xin, "Evolving artificial neural networks," Proceedings of the IEEE, 87(9):1423-1447, Sep. 1999.

Montana, David J. and Lawrence Davis, "Training feedforward neural networks using genetic algorithms," Proceedings of the 11th international joint conference on Artificial intelligence—vol. 1, pp. 762-767, San Francisco, CA, USA, 1989, Morgan Kaufmann Publishers Inc.

Fogel, D. B., L. Fogel, and V. Porto, "Evolving neural networks," Biological Cybernetics, 63(6): 487-493, 1990.

Beer, Randall D. and John C. Gallagher. Evolving dynamical neural networks for adaptive behavior, Adapt. Behav., 1(1):91-122, Jun. 1992.

Wieland, A. P., "Evolving neural network controllers for unstable systems," Neural Networks, 1991, IJCNN-91-Seattle International Joint Conference on, vol. ii, pp. 667-673, Jul. 1991.

Dominic, S., R. Das, D. Whitley, and C. Anderson, Genetic reinforcement learning for neural networks, Neural Networks, 1991, IJCNN-91-Seattle International Joint Conference on, vol. ii, pp. 71-76 vol. 2, Jul. 1991.

Gomez, Faustino, Jurgen Schmidhuber, and Risto Miikkulainen, "Efficient non-linear control through neuroevolution," Johannes Furnkranz, Tobias Scheffer, and Myra Spiliopoulou, editors, Machine Learning: ECML 2006, vol. 4212 of Lecture Notes in Computer Science, pp. 654-662, Springer Berlin/Heidelberg, 2006.

Gomez, Faustino, Jurgen Schmidhuber, and Risto Miikkulainen, "Accelerated neural evolution through cooperatively coevolved synapses," J. Mach. Learn. Res., 9: 937-965, Jun. 2008.

Floreano, Dario, Peter Durr, and Claudio Mattiussi, "Neuroevolution: from architectures to learning," Evolutionary Intelligence, 1(1): 47-62, 2008.

Branke, Jurgen, "Evolutionary algorithms in neural network design and training—A review," Jarmo T. Alander, editor, Proc. of the First Nordic Workshop on Genetic Algorithms and their Applications (1NWGA), vol. 95-1, pp. 145-163, Vaasa, Finland, 1995.

Whitley, D., T. Starkweather, and C. Bogart, "Genetic algorithms and neural networks: optimizing connections and connectivity," Parallel Computing, 14(3): 347-361, 1990.

Koza, J.R. and J.P. Rice, Genetic generation of both the weights and architecture for a neural network. In Neural Networks, 1991., IJCNN-91-Seattle Inter-national Joint Conference on, vol. ii, pp. 397-404 vol. 2, Jul. 1991.

Dasgupta, D. and D.R. McGregor, "Designing application-specific neural networks using the structured genetic algorithm," Combinations of Genetic Algorithms and Neural Networks, 1992, COGANN-92. International Workshop on, pp. 87-96, Jun. 1992.

White, David and Panos Ligomenides, "Gannet: A genetic algorithm for optimizing topology and weights in neural network design," Jos'e Mira, Joan Cabestany, and Alberto Prieto, editors, New Trends in Neural Computation, vol. 686 of Lecture Notes in Computer Science, pp. 322-327, Springer Berlin/Heidelberg, 1993.

Maniezzo, V. Genetic evolution of the topology and weight distribution of neural networks. Neural Networks, IEEE Transactions on, 5(1):39-53, Jan. 1994.

Angeline, P. J., G.M. Saunders, and J.B. Pollack, "An evolutionary algorithm that constructs recurrent neural networks," Neural Networks, IEEE Transactions on, 5(1):54-65, Jan. 1994.

Tang, K.S., C.Y. Chan, K.F. Man, and S. Kwong. "Genetic structure for nn topology and weights optimization," Genetic Algorithms in Engineering Systems: Innovations and Applications, 1995. GALESIA. First International Conference on (Conf. Publ. No. 414), pp. 250-255, Sep. 1995.

Liu, Yong and Xin Yao, "A population-based learning algorithm which learns both architectures and weights of neural networks," Chinese Journal of Advanced Software Research (Allerton), 10011:54-65, 1996.

Moriarty, David E. and Risto Mikkulainen, "Efficient reinforcement learning through symbiotic evolution," Machine Learning, 22(1):11-32, 1996.

Moriarty, David E. and Risto Miikkulainen, "Forming neural networks through efficient and adaptive coevolution," Evol. Comput., 5(4):373-399, Dec. 1997.

Gomez, Faustino and Risto Miikkulainen, "2-d pole balancing with recurrent evolutionary networks," Proceeding of the International Conference on Artificial Neural Networks (ICANN), pp. 425-430, 1998.

Yao, Xin and Yong Liu, "A new evolutionary system for evolving artificial neural networks," Neural Networks, IEEE Transactions on, 8(3): 694-713, May 1997.

Pujol, Joo Carlos Figueira and Riccardo Poli, "Evolving the topology and the weights of neural networks using a dual representation," Applied Intelligence, 8:73-84, 1998.

Abbass, Hussein A., "An evolutionary artificial neural networks approach for breast cancer diagnosis," Artificial Intelligence in Medicine, 25(3):265-281, 2002.

Stanley, Kenneth O. and Risto Miikkulainen, "Evolving neural networks through augmenting topologies," Evolutionary Computation, 10(2): 99-127, 2002.

Stanley, K.O., B.D. Bryant, and R. Miikkulainen, "Evolving adaptive neural networks with and without adaptive synapses," Evolutionary Computation, 2003. CEC '03, The 2003 Congress on, vol. 4, pp. 2557-2564, Dec. 2003.

Alba, Enrique and J. Chicano, "Training neural networks with ga hybrid algorithms," Kalyanmoy Deb, editor, Genetic and Evolutionary Computation, GECCO 2004, vol. 3102 of Lecture Notes in Computer Science, pp. 852-863. Springer Berlin/Heidelberg, 2004.

Fieldsend, J. E. and S. Singh, "Pareto evolutionary neural networks," Neural Networks, IEEE Transactions on, 16 (2):338-354, Mar. 2005.

Palmes, P. P., T. Hayasaka, and S. Usui, "Mutation-based genetic neural network," Neural Networks, IEEE Transactions on, 16(3):587-600, May 2005.

Kassahun, Y. Towards a Unified Approach to Learning and Adaptation, PhD thesis, Christian-Albrechts-University, Kiel, Germany, Feb. 2006.

Siebel, Nils T. and Gerald Sommer, "Evolutionary reinforcement learning of artificial neural networks," Int. J. Hybrid Intell. Syst., 4(3):171-183, Aug. 2007.

Siebel, Nils T., J. Botel, and G. Sommer, "Efficient neural network pruning during neuro-evolution," Neural Networks, 2009. IJCNN 2009. International Joint Conference on, pp. 2920-2927, Jun. 2009.

Stanley, Kenneth O., David B. D'Ambrosio, and Jason Gauci, "A hypercube-based encoding for evolving large-scale neural networks," Artificial Life, 15(2):185-212, 2009.

Gauci, Jason and Kenneth O. Stanley, "Autonomous evolution of topographic regularities in artificial neural networks," Neural Computation, 22(7):1860-1898, 2010.

Markram, Henry, Wulfram Gerstner, and Per Jesper Sjostrom, "A history of spike-timing-dependent plasticity," Frontiers in Synaptic Neuroscience, 3:4, pp. 1-24, 2011.

Beer, Randall D., "On the dynamics of small continuous-time recurrent neural networks," Adaptive Behavior, 3 (4):469-509, 1995.

Beer, Randall D., "The dynamics of adaptive behavior: A research program," Robotics and Autonomous Systems, 20 (2-4):257-289, 1997, ice:title;Practice and Future of Autonomous Agents.

(56) References Cited

OTHER PUBLICATIONS

Gallagher, John C. and Saranyan Vigraham, "A modified compact genetic algorithm for the intrinsic evolution of continuous time recurrent neural networks," Proceedings of the Genetic and Evolutionary Computation Conference, GECCO '02, pp. 163-170, San Francisco, CA, USA, 2002, Morgan Kaufmann Publishers Inc.

Merolla, P., J. Arthur, F. Akopyan, N. Imam, R. Manohar, and D.S. Modha, "A digital neurosynaptic core using embedded crossbar memory with 45pj per spike in 45nm," Custom Integrated Circuits Conference (CICC), 2011 IEEE, pp. 1-4, Sep. 2011.

Preissl, Robert, Theodore M. Wong, Pallab Datta, Myron Flickner, Raghavendra Singh, Steven K. Esser, William P. Risk, Horst D. Simon, and Dharmendra S. Modha. "Compass: a scalable simulator for an architecture for cognitive computing," Proceedings of the International Conference on High Performance Computing, Networking, Storage and Analysis, SC '12, pp. 54:1-54:11, Los Alamitos, CA, USA, 2012, IEEE Computer Society Press.

Kashtan, Nadav, Uri Alon, and Jr. Callan, Curtis G., "Spontaneous evolution of modularity and network motifs," Proceedings of the National Academy of Sciences of the United States of America, 102(39): pp. 13773-13778, 2005.

Caelli, T., Ling Guan, and W. Wen, "Modularity in neural computing," Proceedings of the IEEE, 87(9): 1497-1518, Sep. 1999.

Cho, Sung-Bae and K. Shimohara, "Modular neural networks evolved by genetic programming," Evolutionary Computation, 1996, Proceedings of IEEE International Conference on, pp. 681-684, May 1996.

Garcia-Pedrajas, N., C. Hervas-Martinez, and J. Munoz-Perez, "Covnet: a cooperative coevolutionary model for evolving artificial neural networks," Neural Networks, IEEE Transactions on, 14(3): 575-596, May 2003.

Garcia-Pedrajas, N., C. Hervas-Martinez, and D. Ortiz-Boyer.Cooperative coevolution of artificial neural network ensembles for pattern classification, Evolutionary Computation, IEEE Transactions on, 9(3):271-302, Jun. 2005.

Reisinger, Joseph, Kenneth O. Stanley, and Risto Miikkulainen, Evolving reusable neural modules. In Proceedings of the Genetic and Evolutionary Computation Conference, pp. 69-81, 2004.

Hornby, Gregory S., "Measuring, enabling and comparing modularity, regularity and hierarchy in evolutionary design," Proceedings of the 2005 conference on Genetic and evolutionary computation, GECCO '05, pp. 1729-1736, New York, NY, USA, 2005, ACM.

Kamioka, Takumi, Eiji Uchibe, and Kenji Doya, "Neuroevolution based on reusable and hierarchical modular representation," Proc. 15th Int. Conf. Advances in Neuro-Information Processing, Part I (ICONIP'08), pp. 22-31. Berlin, Heidelberg: Springer-Verlage, 2009.

Yao, Xin and M.M. Islam, "Evolving artificial neural network ensembles," Computational Intelligence Magazine, IEEE, 3(1): 31-42, Feb. 2008.

Singh, S., A. Barto, and N. Chentanez, "Intrinsically motivated reinforcement learning," 18th Annual Conference on Neural Information Processing Systems (NIPS), pp. 1-8, 2004.

Stewart et al., "Python Scripting in the Nengo Simulator," Frontiers in NeuroInformatics, V. 3, Article 7, pp. 1-9, 2009.

Izhikevich et al, "Spike-timing Dynamics of Neuronal Groups," Cerebral Cortex, pp. 933-944, 2004.

Izhikevich, Eugene M, "Which Model to Use for Cortical Spiking Networks," IEEE Transactions on Neural Networks, pp. 1063-1070, 2004.

Wang, Fang, Vijaya K. Devabhaktuni, and Qi-Jun Zhang. "A hierarchical neural network approach to the development of a library of neural models for microwave design." IEEE transactions on microwave theory and techniques 46.12 (1998): 2391-2403.

Lawrence, Steve et al. "Face recognition: A convolutional neural-network approach." IEEE transactions on neural networks 8.1 (1997): 98-113.

Stewart et al ("Python scripting in the Nengo simulator" 2009).

Izhikevich et al ("Spike-timing Dynamics of Neuronal Groups" 2004).

* cited by examiner

Structure of a Typical Neuron

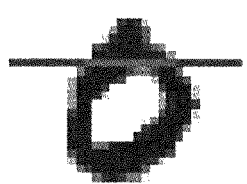 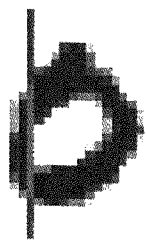 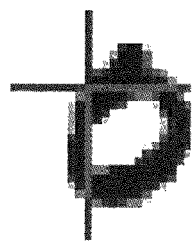
Example Digits     By Row     By Column     By Row and Column
FIG. 9

Example network set to use visibility upon activity with a default visibility of ghost for all elements.

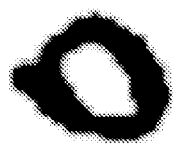
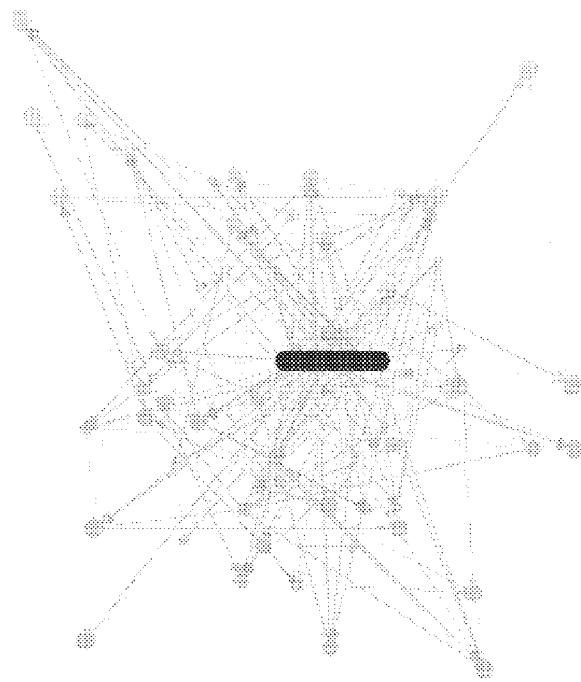
FIG. 17A

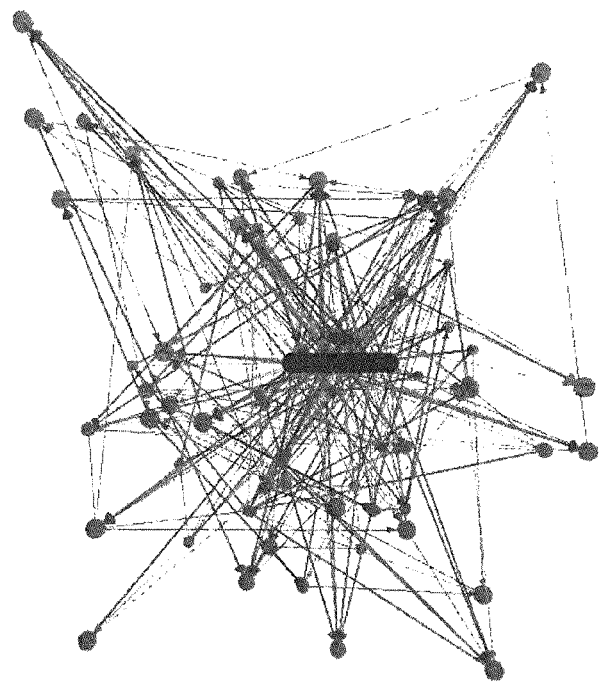
FIG. 17B

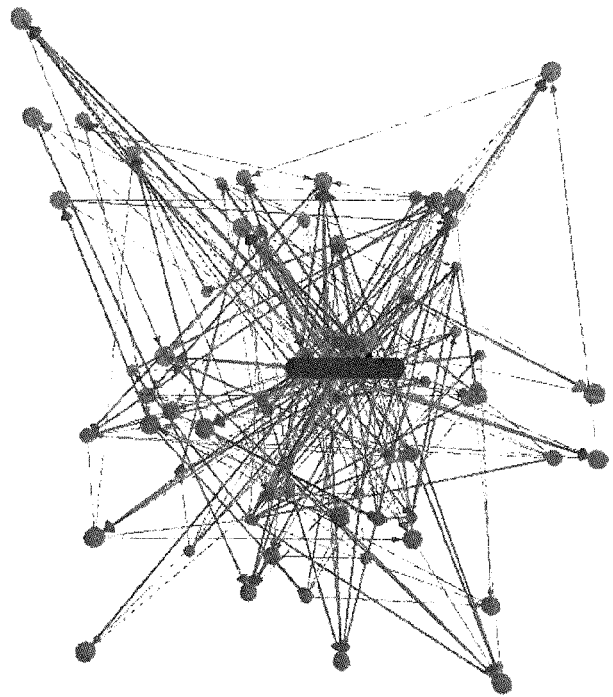
FIG. 17C

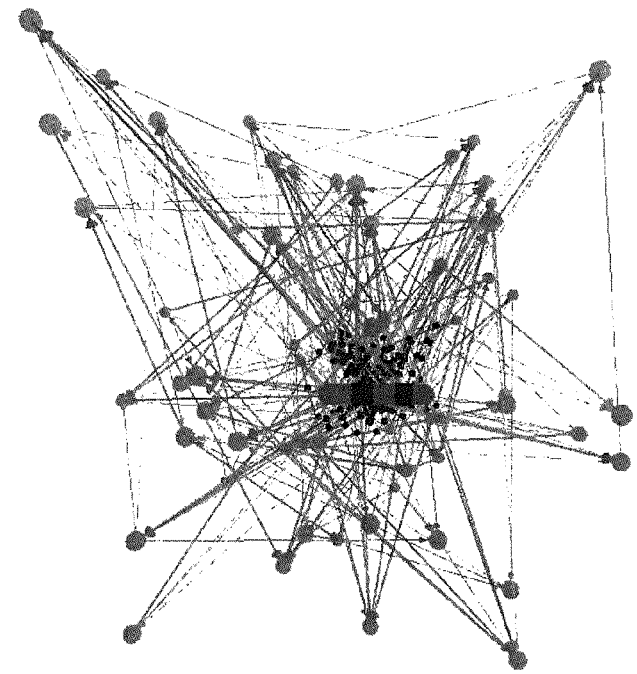
FIG. 17D

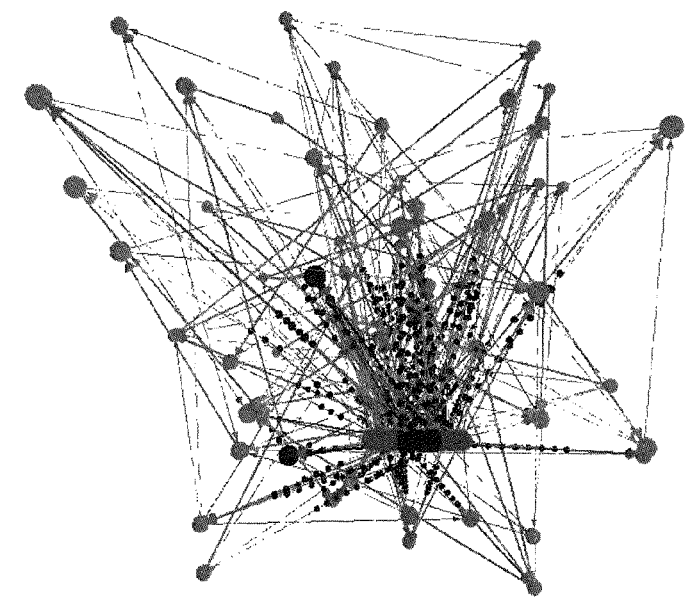
FIG. 17F

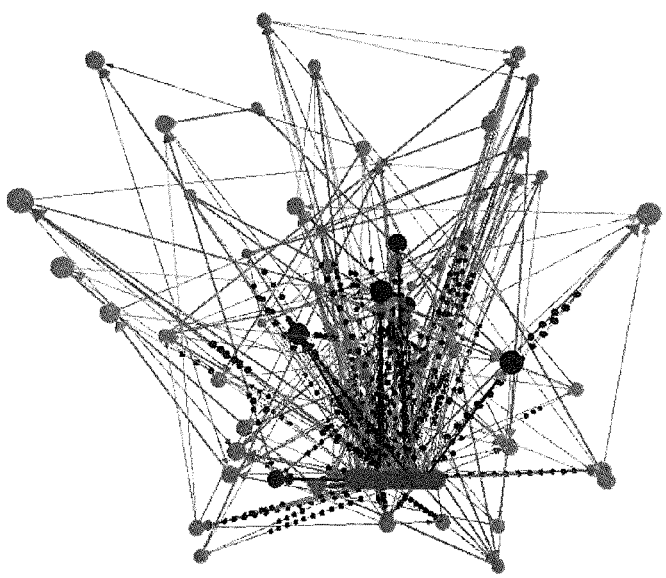
FIG. 17G

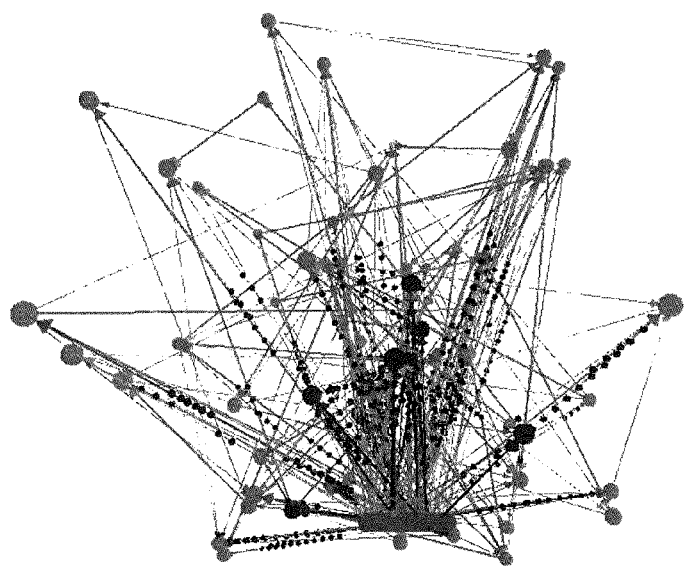
FIG. 17H

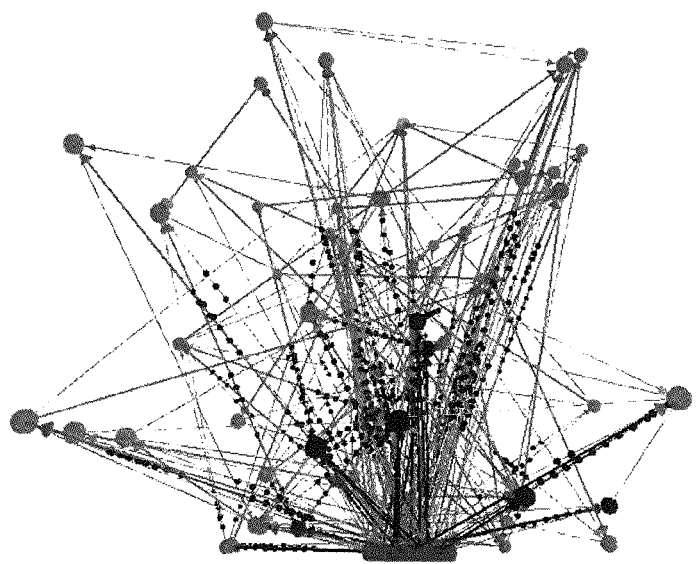
FIG. 17I

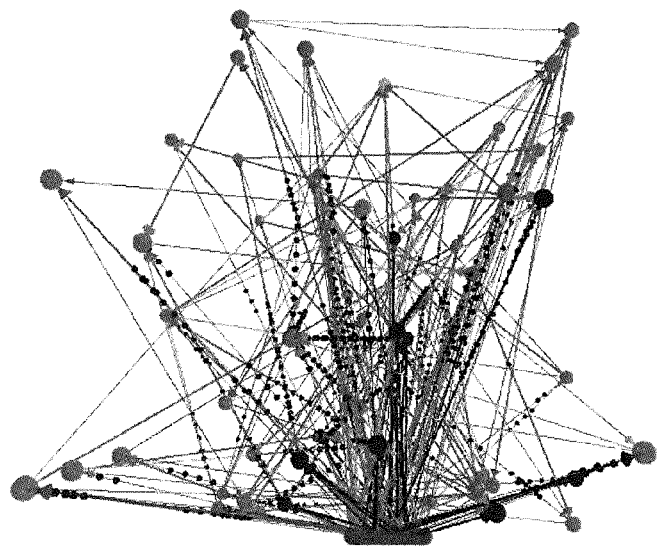
FIG. 17J
Running time: 173.07693

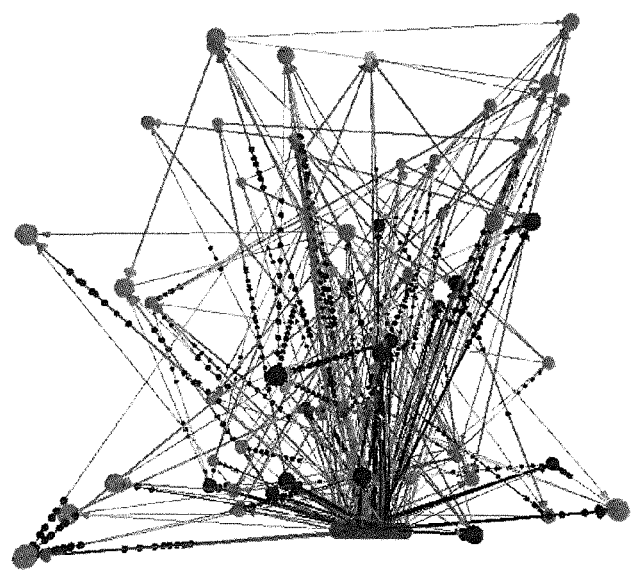
FIG. 17K

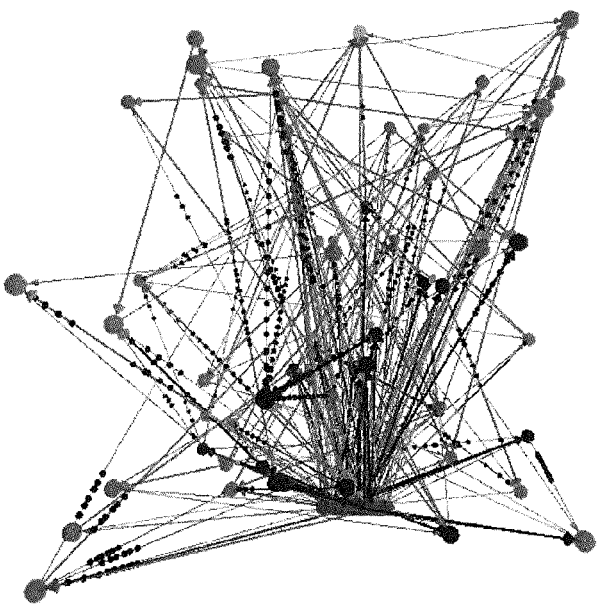
FIG. 17L

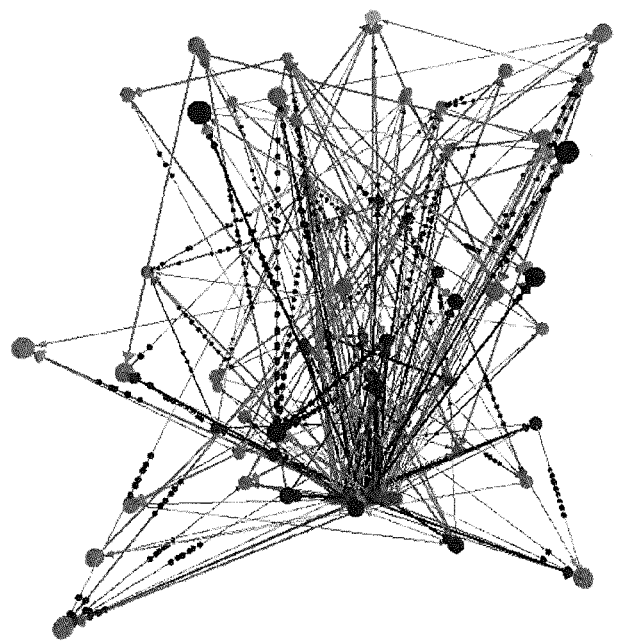
FIG. 17M

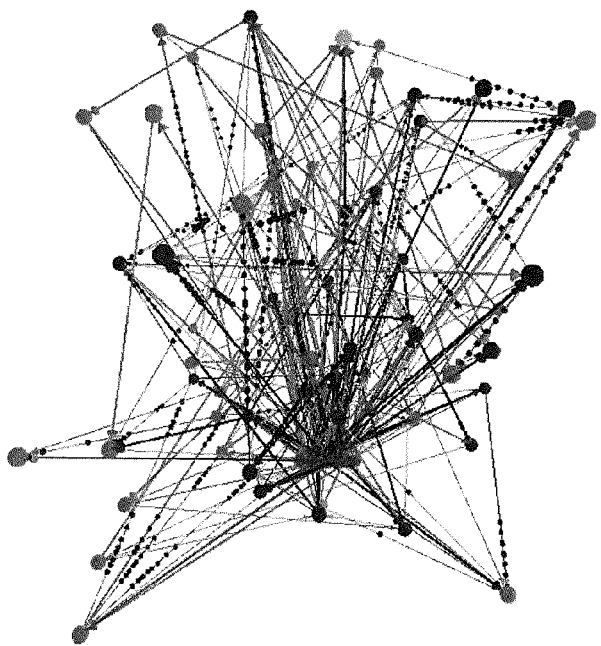
FIG. 170

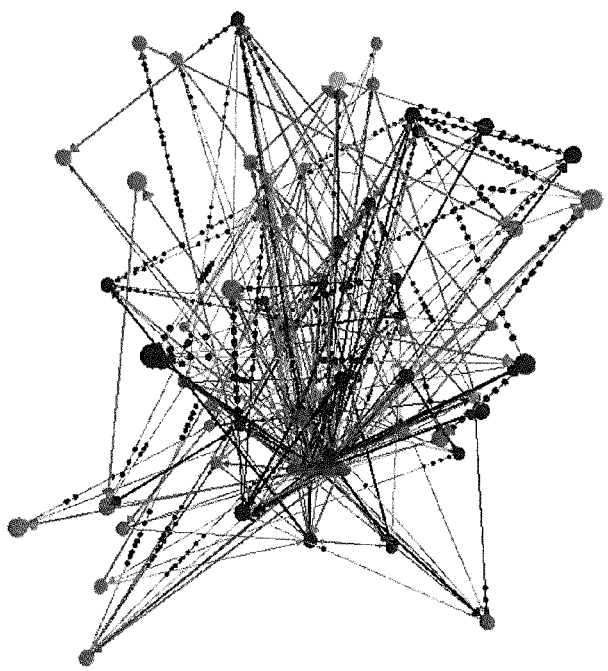
FIG. 17P
Running time: 288.46155

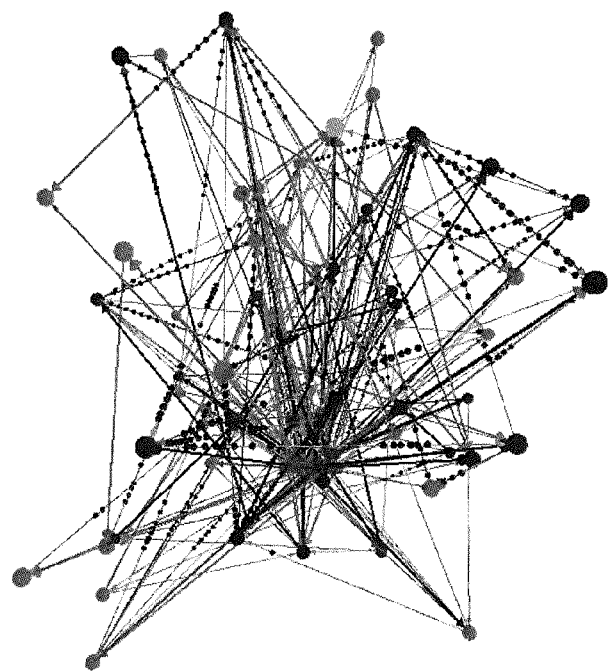
FIG. 17Q
Running time: 307.69232

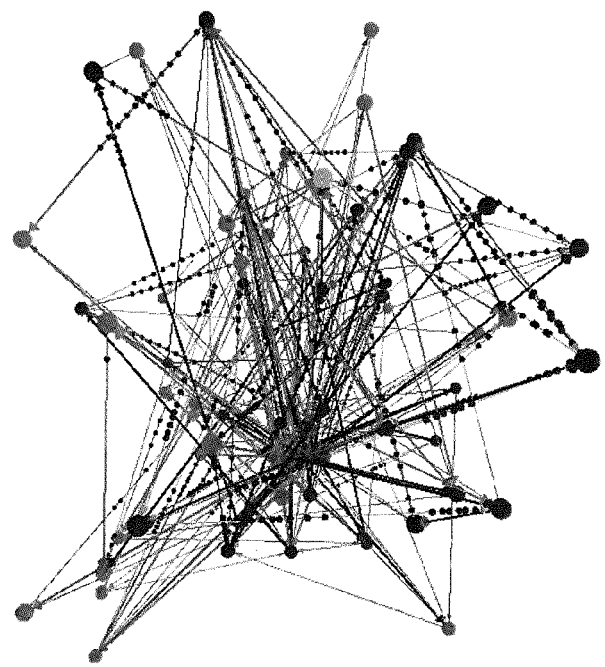
FIG. 17R

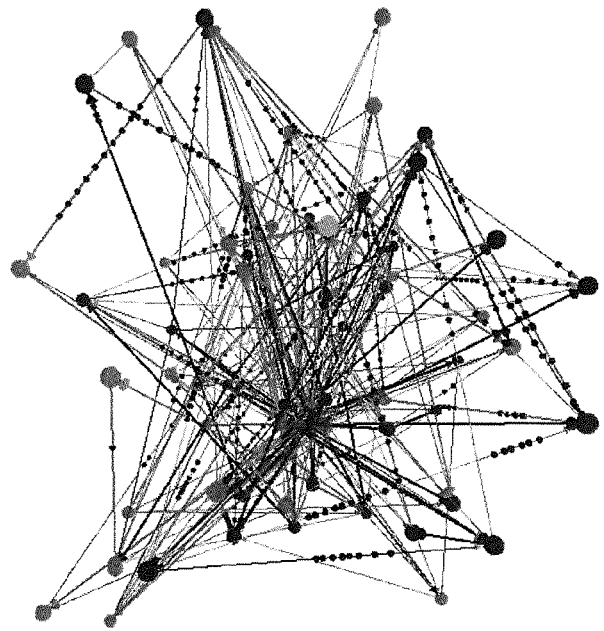
FIG. 17S
Running time: 346.15387

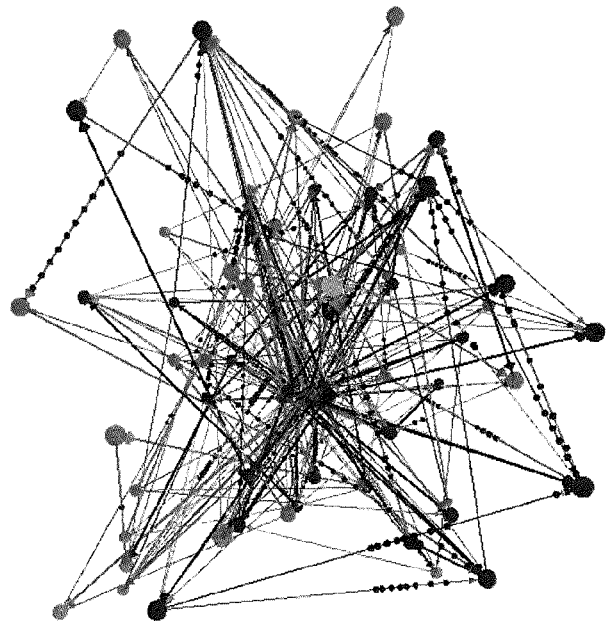
FIG. 17T

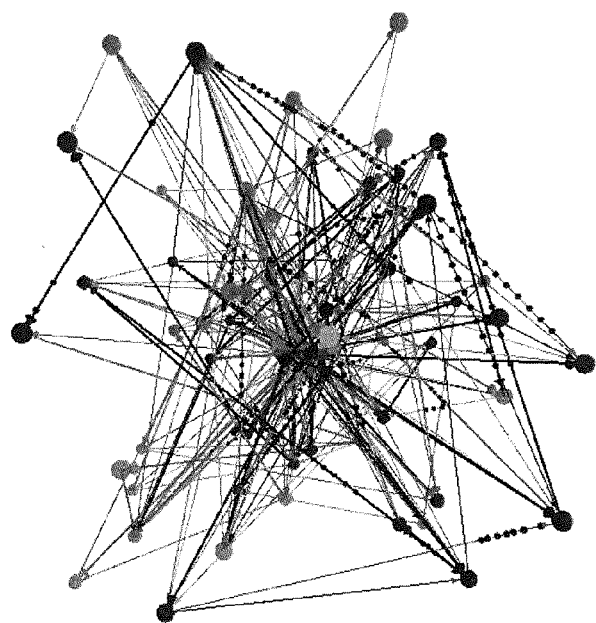
FIG. 17V

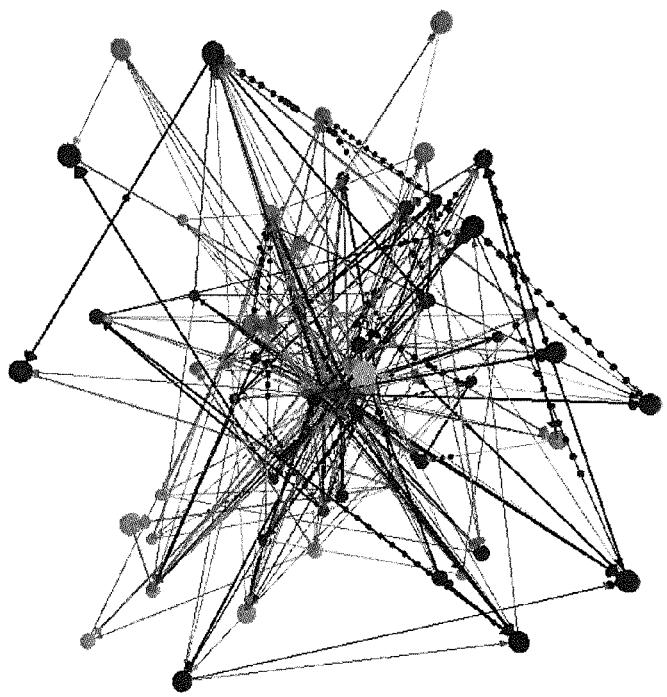
FIG. 17W
Running time: 423.07697

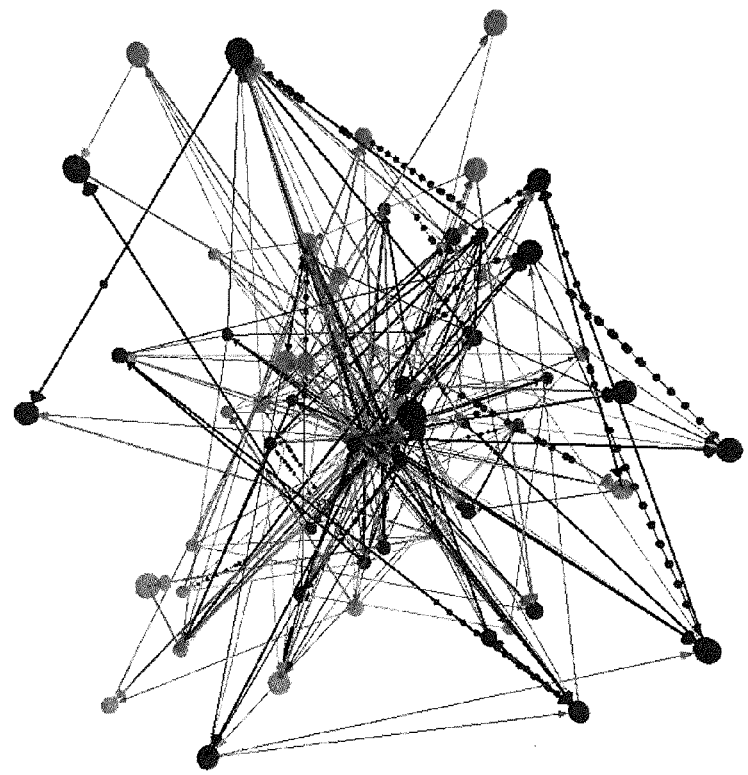
FIG. 17X
Running time: 442.3077

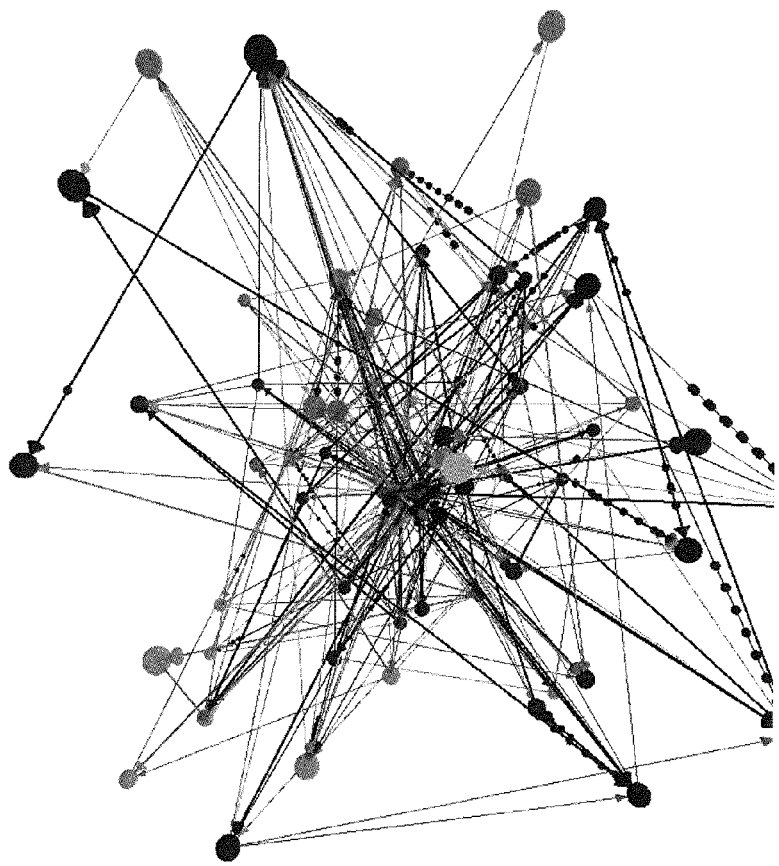
FIG. 17Y

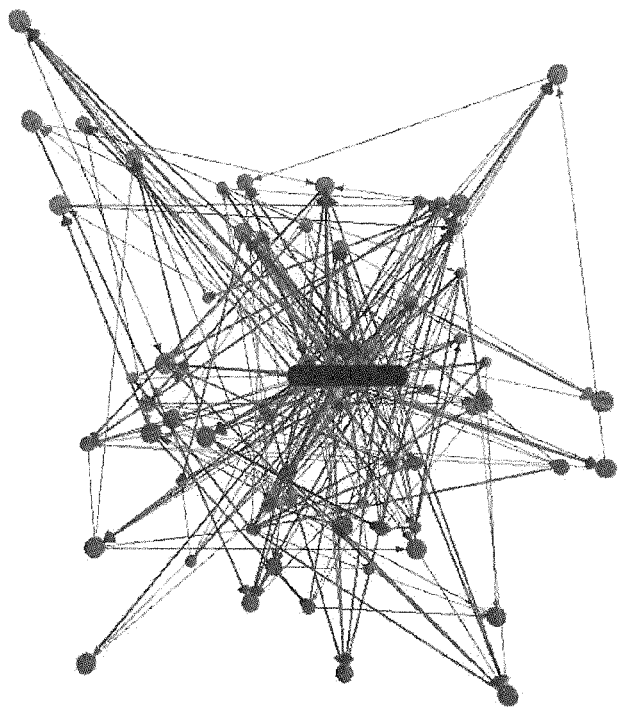
FIG. 18B

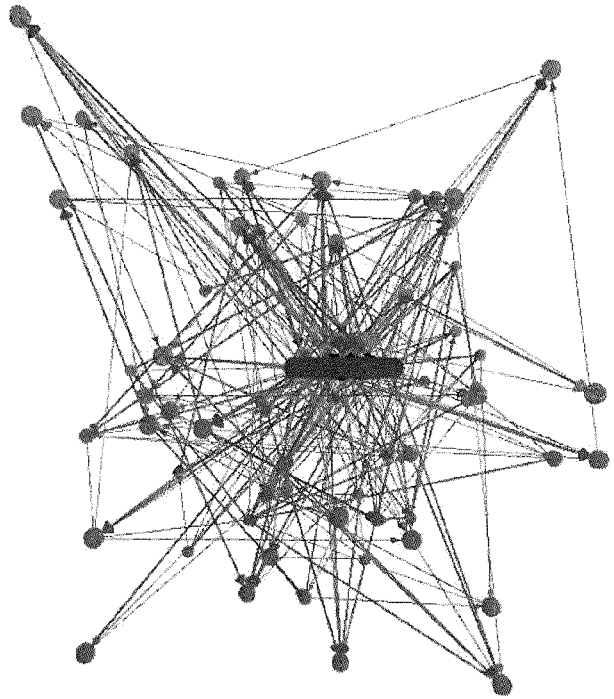
FIG. 18C

Running time: 76.92308
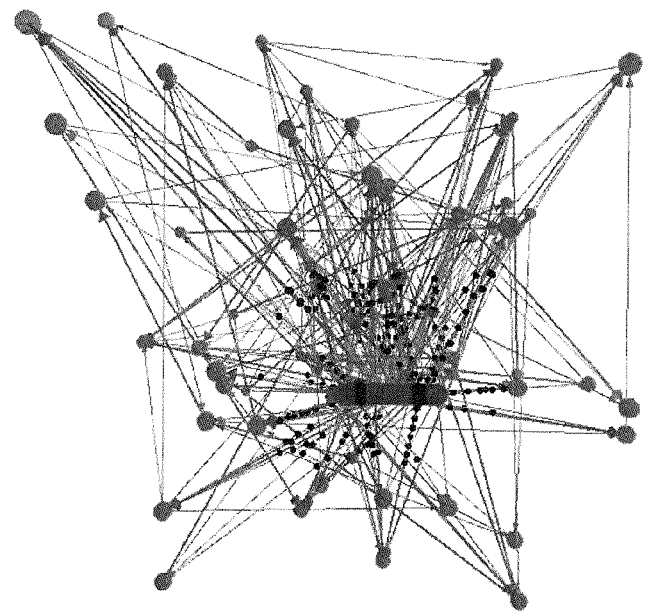
FIG. 18E

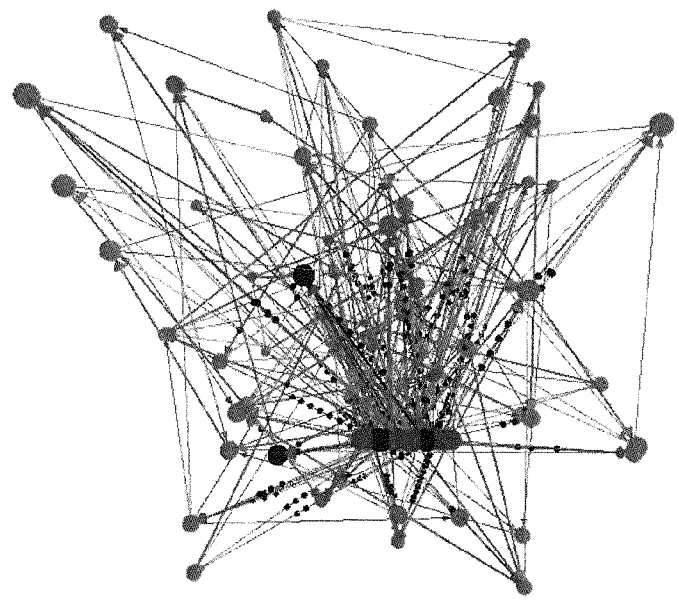
FIG. 18F

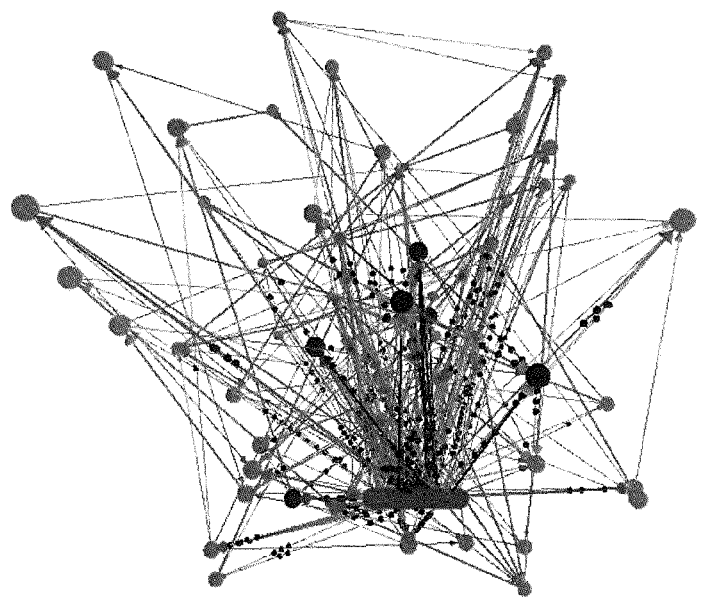
FIG. 18G

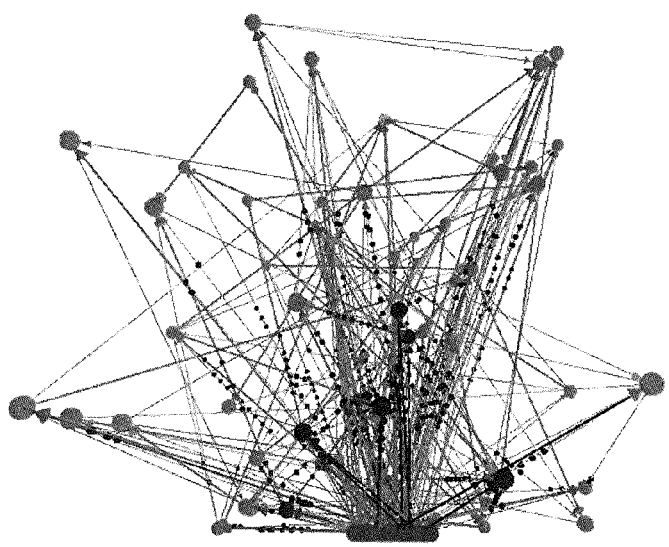
FIG. 18I
Running time: 153.84616

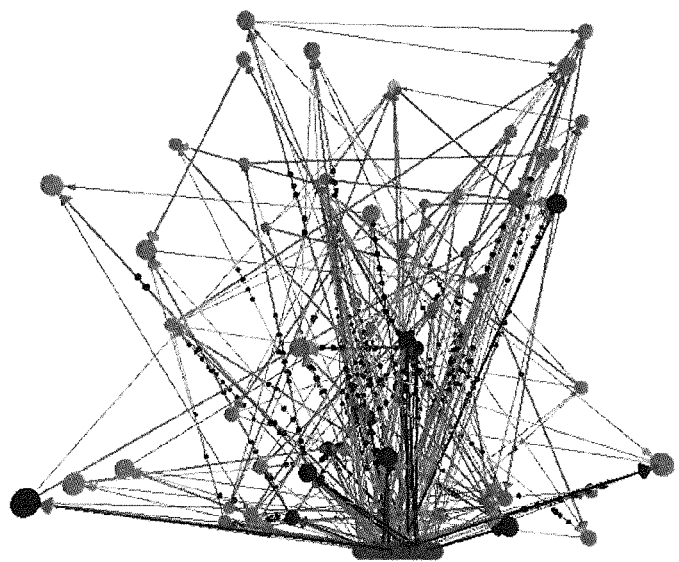
FIG. 18J
Running time: 173.07693 

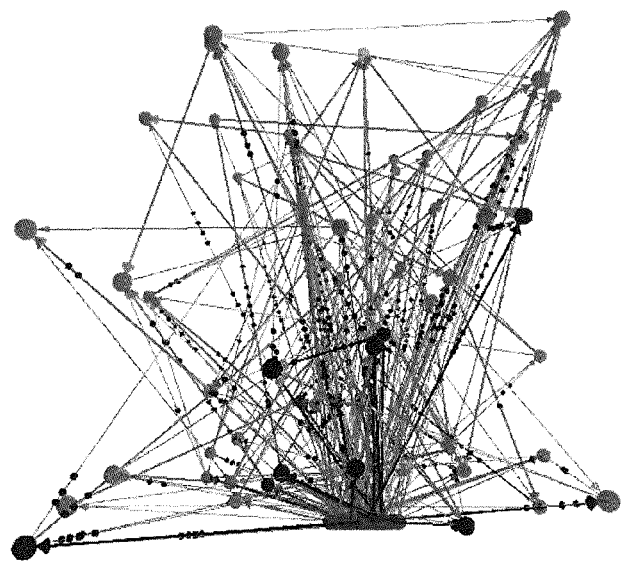
Running time: 192.3077
FIG. 18K

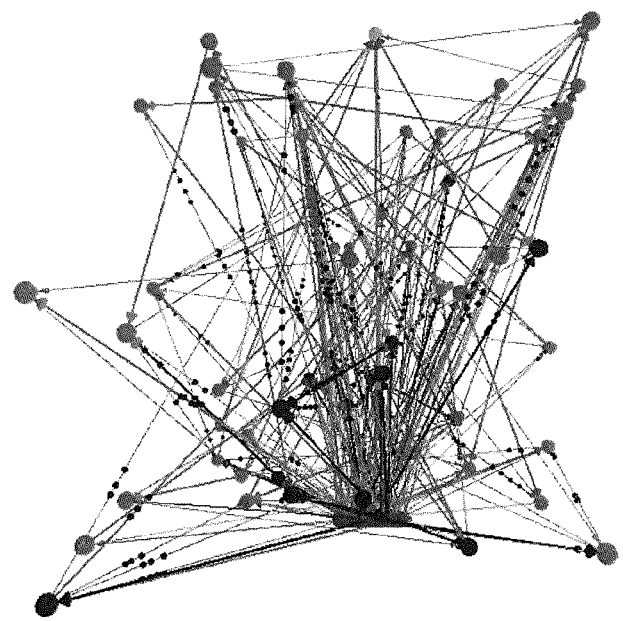
Running time: 211.53848
FIG. 18L

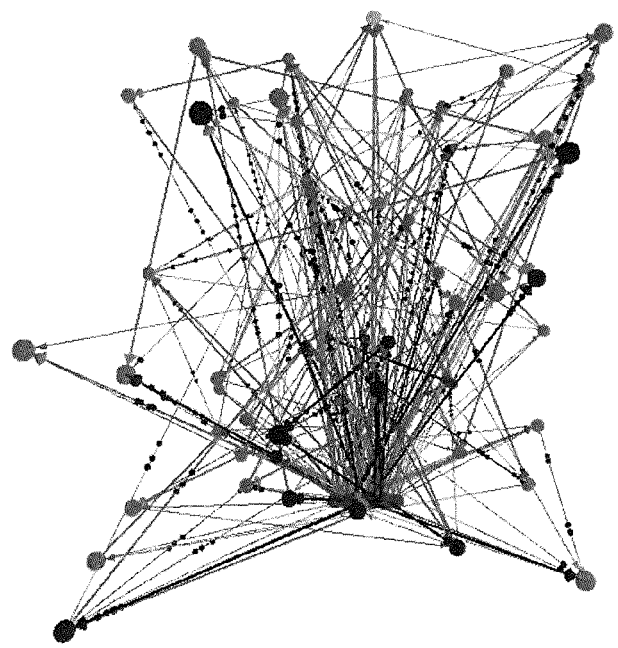
FIG. 18M

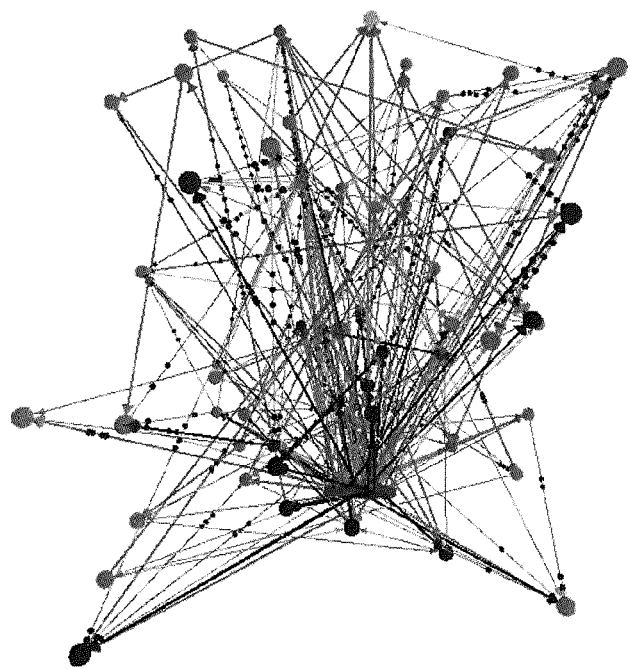
Running time: 250.0
FIG. 18N

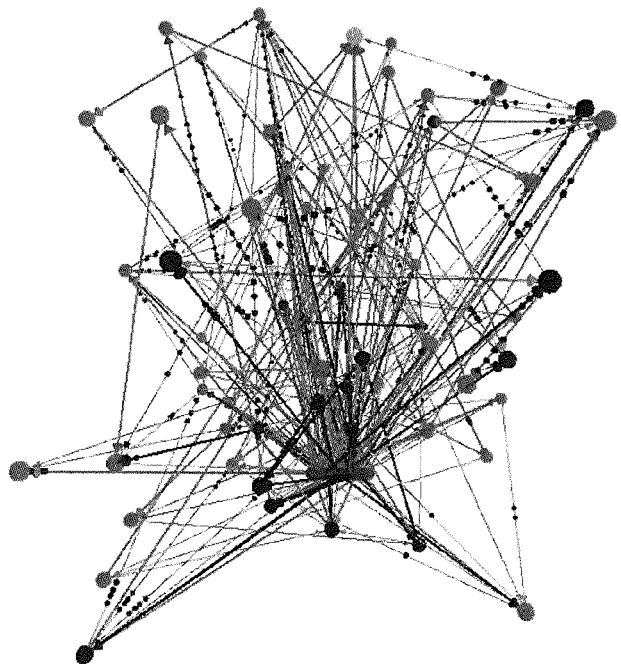
FIG. 18O
Running time: 269.23077

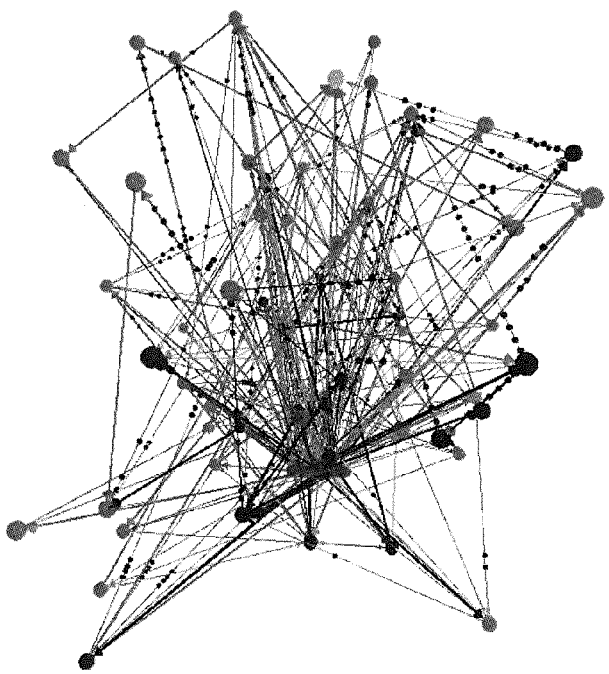
FIG. 18P

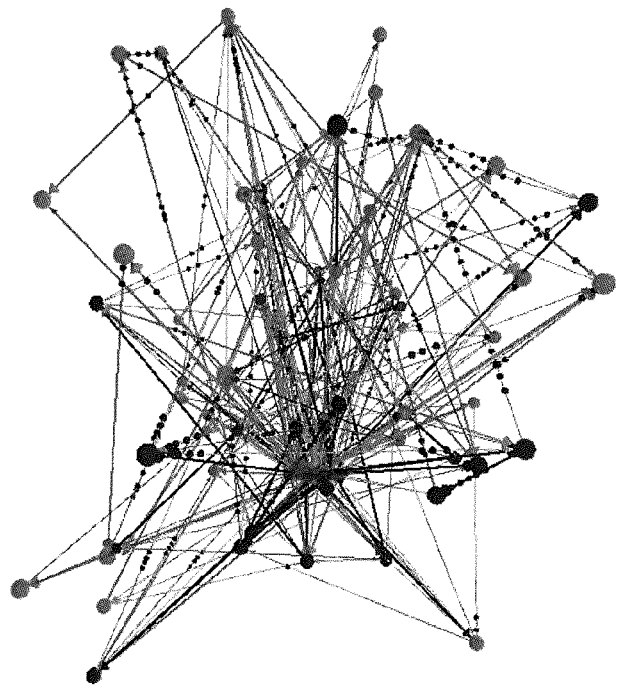
FIG. 18Q

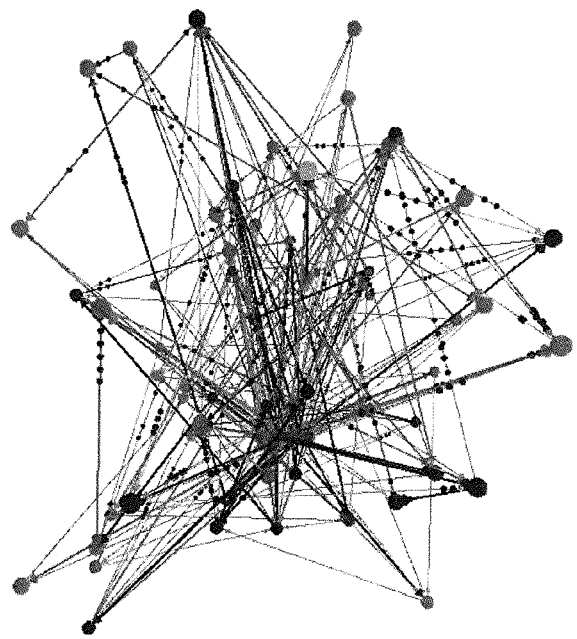
FIG. 18R

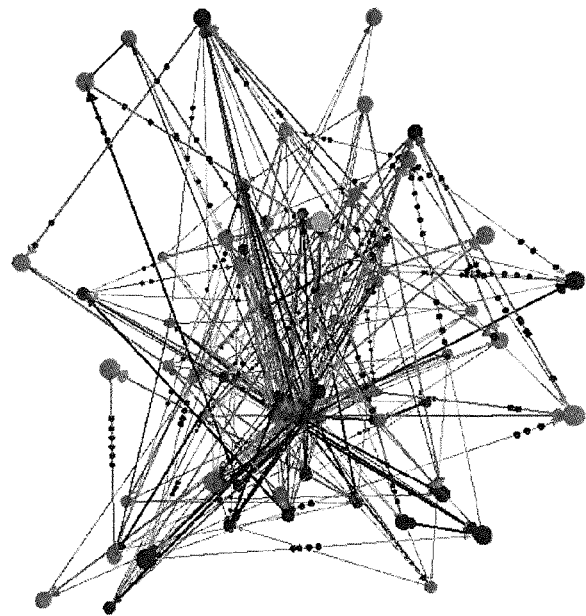
FIG. 18S

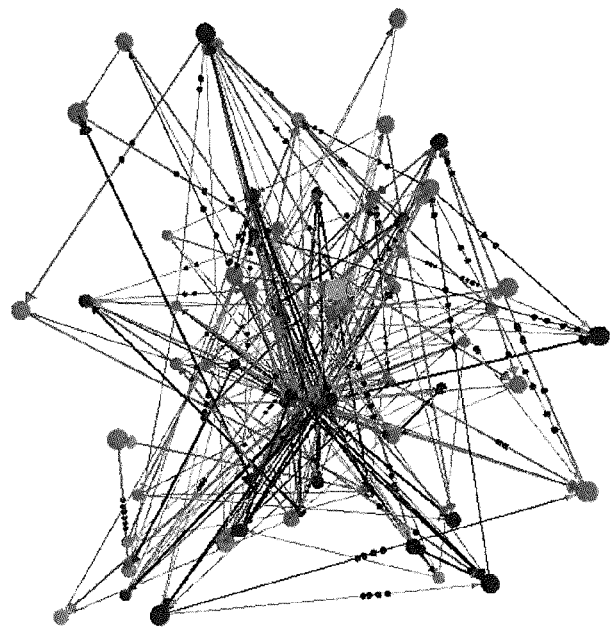
FIG. 18T

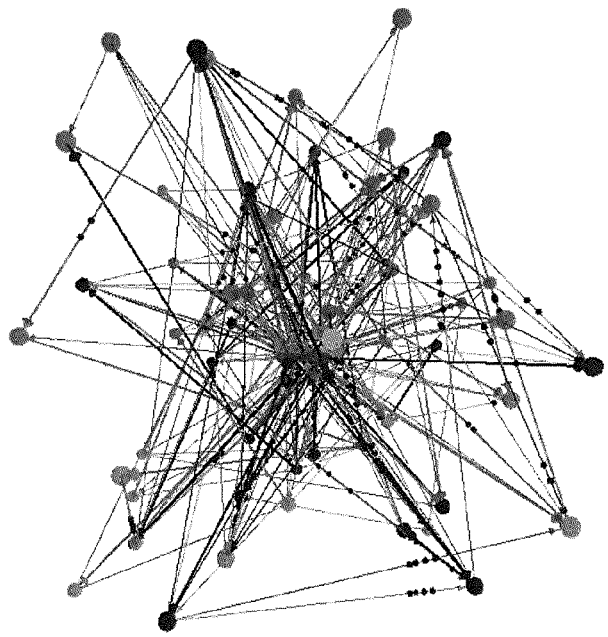
FIG. 18U
Running time: 384.6154

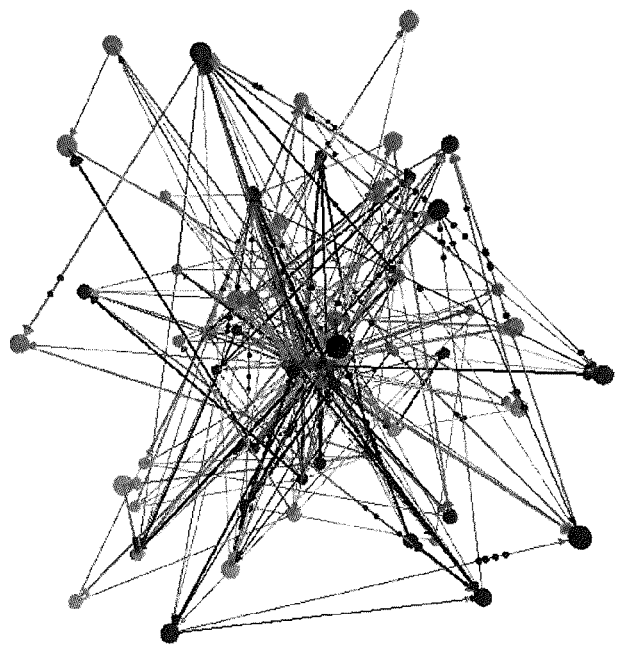
FIG. 18V

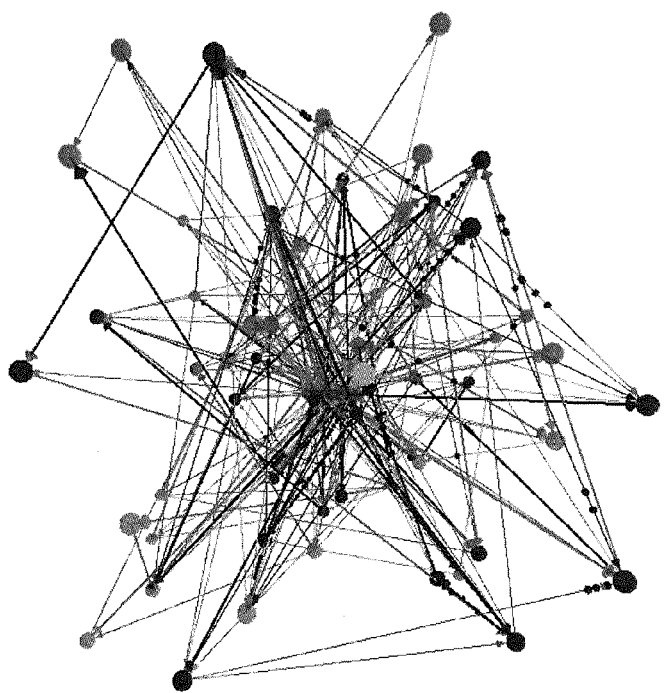
FIG. 18W

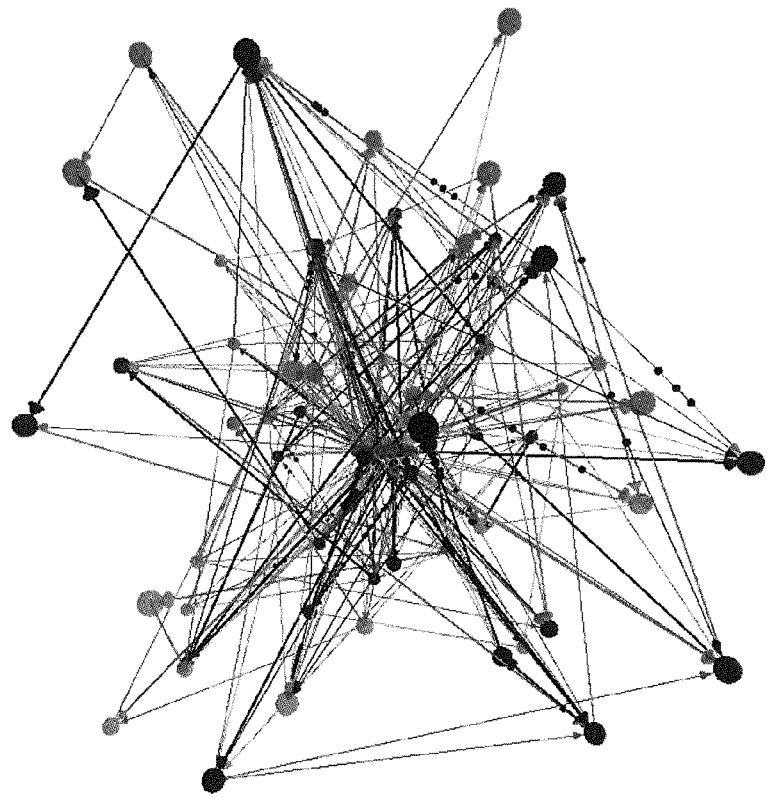
FIG. 18X

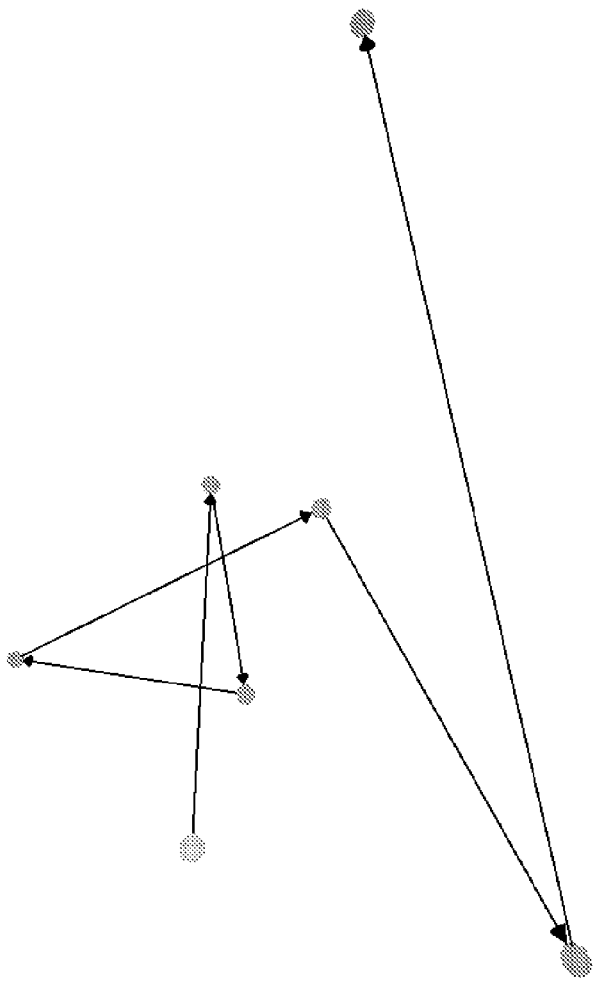
FIG. 21

0 Recognizer

1 Recognizer

2 Recognizer

3 Recognizer

4 Recognizer

5 Recognizer

6 Recognizer

7 Recognizer

8 Recognizer

9 Recognizer

Network hand-tooled to
recognize vertical lines.

Network repeated many times to
recognize vertical lines in an image.

Full Network

Subnetwork extracted
based on activity

METHOD AND APPARATUS FOR CONSTRUCTING A NEUROSCIENCE-INSPIRED ARTIFICIAL NEURAL NETWORK WITH VISUALIZATION OF NEURAL PATHWAYS

The present patent application claims the benefit of and right of priority to U.S. Provisional Patent Applications, Ser. No. 61/891,621, filed Oct. 16, 2013. Set. No. 61/934,052, filed Jan. 31, 2014; Ser. No. 61/946,179 filed Feb. 28, 2014; Ser. No. 61/951,690 filed Mar. 12, 2014, Set. No. 62/001,951, filed May 22, 2014, and Ser. No. 62/024,081, filed Jul. 14, 2015, all six U.S. provisional patent applications incorporated by reference herein as to their entire contents and is related by subject matter to U.S. patent application Ser. No. 14/513,280 filed Oct. 14, 2014, entitled "Method and Apparatus for Constructing a Neuroscience-Inspired Artificial Neural Network" of J. Douglas Birdwell and Catherine Schuman, to U.S. patent application Ser. No. 14/513,297 filed Oct. 14, 2014, entitled "Method and Apparatus for Constructing a Dynamic Adaptive Neural Network Array (DANNA)" of J. Douglas Birdwell, Mark E. Dean and Catherine Schuman, to U.S. patent application Ser. No. 14/513,334 filed Oct. 14, 2014, entitled "Method and Apparatus for Providing Random Selection and Long-Term Potentiation and Depression in an Artificial Network" of J. Douglas Birdwell. Mark E. Dean and Catherine Schuman, to U.S. patent application Ser. No. 14/513,388 filed Oct. 14, 2014, entitled "Method and Apparatus for Constructing, Using and Reusing Components and Structures of an Artificial Neural Network" of J. Douglas Birdwell. Mark E. Dean and Catherine Schuman, and to U.S. patent application Ser. No. 14/513,447 filed Oct. 14, 2014, entitled "Method and Apparatus for Providing Real-Time Monitoring of an Artificial Neural Network" of J. Douglas Birdwell, Mark E. Dean and Catherine Schuman, all five patent applications incorporated by reference as to their entire contents.

TECHNICAL FIELD

The technical field relates to a method and apparatus for constructing a neuroscience-inspired artificial neural network and, in particular, to a method and special purpose apparatus for visualizing neural pathways in an artificial or biological neural network for solving problems in the control, anomaly detection and classification arts.

BACKGROUND AND RELATED ARTS

Biological neural networks are known to have many desirable characteristics. For example, they are able to perform complex, nonlinear tasks using large numbers of relatively simple building blocks. Biological neural networks are robust, able to extrapolate information from a specific setting to apply to a more general setting, and adaptable to change. For these reasons and many others, it has been a goal of the machine learning community to produce networks with similar capabilities to the human brain.

In order to appreciate the neuroscience-inspired artificial neural network of the present invention, a brief introduction to the neural components of the human brain and the larger components of the human brain itself is provided. Biological neurons are the nerve cells present in the brain. The human brain consists of about $10^{11}$ neurons, each of which operates in parallel with the others. A typical biological neuron is shown in FIG. 1. A process in neuroscience usually refers to a physical feature. The various processes of the neuron are called neurites; henceforth, the term neurite will be used rather than process to avoid confusion with the computer science notion of process. The neuron receives information through neurites called dendrites 110, which also communicate the information to the neuron's cell body 120. The cell body 120 has a nucleus 130. The neurite that transmits information out of the neuron to other targets is called the axon 140 having axon terminals 190. A myelin sheath 160 comprises a Schwann cell 170. Signals between neurons are usually transferred across synapses, although direct connections that allow ion exchange have been observed. Typically, the communication is done chemically via neurotransmitters.

Dendrites 110 are usually shorter than axons 140 and arise from the cell body 120 of the neuron. They generally branch off into dendritic spines, which receive information from axons from other neurons. The dendritic spines are typically where the communication between neurons across synapses and from axons takes place, although sometimes communication is direct from cell body to cell body, or between dendrites.

Although information is transmitted from an axon 140 to a dendrite 110 in a typical synapse, there are also synapses between two axons, two dendrites, and synapses and from axons in which information travels from dendrite 110 to axon 140. Because of these differences, connections between neurons in the artificial neural networks defined herein will all be referred to only as synapses, with no distinction between dendrites and axons. The synapses in this work are directed in that information travels from one neuron to another, but not in the opposite direction along that synapse.

There are two ways for synaptic transmission to take place in the brain: electrical transmission and chemical transmission. Electrical transmission occurs when the current generated by one neuron spreads to another neuron on a pathway of low electrical resistance. Electrical synapses are relatively rare in the mammalian brain; evidence suggests that they occur in regions where the activities of neighboring neurons need to be highly synchronized. In chemical transmissions, neurotransmitters are transmitted from one neuron to another.

A neurotransmitter is a chemical substance that is synthesized in a neuron and is released at a synapse following depolarization of at least a portion of the neuron's cell membrane (typically near the synapse). The neurotransmitter then binds to receptors at a postsynaptic cell and/or postsynaptic terminal to elicit a response. This response may excite or inhibit the neuron, meaning neurotransmitters play a major role in the way the brain operates. Some of the known neurotransmitters are acetylcholine, glutamate, GABA, glycine, dopamine, norepinephrine, serotonin and histamine.

Neurotransmitters are released according to action potentials in the neuron. An action potential is a fluctuation in the membrane potential of the neuron, which is the voltage difference across the cell membrane caused by differences in ion concentrations between the outside and inside of the neuron. Neurons have a particular membrane potential in which they are at rest. Typically, a neuron is "at rest" when the potential inside the neuron's cell wall is approximately −70 mV compared to the outside of the neuron. When positively charged ions flow out of the cell, the membrane potential becomes more negative, while positive ionic current flowing into the cell changes the membrane potential to a less negative or positive value. Negative ions have an opposite effect. Each neuron has an associated threshold level. If the membrane potential rises above this threshold level, the neuron generates an action potential. The generation of the action potential is called a "firing" of the neuron.

The generation of an action potential relies not only on the threshold of the neuron but also on the recent firing history. Each neuron has an associated refractory period. For a short period of time after a neuron has fired, it is highly unlikely that that neuron will fire again. This period is called the absolute refractory period. For a slightly longer period of time after the absolute refractory period, it is difficult, but more likely, for the neuron to fire again. This period is called the relative refractory period.

In the central nervous system, multiple types of cells provide myelin sheaths 160 along axons 140. Myelin is a fat that provides an insulating layer for the axon 140. The thickness of the myelin sheath 160 controls the propagation delay of signals along the axon 140. Myelin sheaths 160 we separated along the axon by nodes of Ranvier 150. The action potential traveling along the axon is regenerated at each of the nodes of Ranvier. Having described a typical neuron, the parts of the human brain will now be discussed with reference to FIG. 2.

The basal ganglia (corpus striatum) 210 is one of the most important layers of the brain 200 for emotion processing and generation; it is also known as the reptilian brain. The basal ganglia connects the cerebral cortex and the cerebellum. The basal ganglia 210 is the portion of the brain that contains innate behavioral knowledge, including motor functions and primal emotions such as fear, anger, and sexuality. It is also responsible for motor integration in the cerebral cortex, i.e. it helps regulate movement. The next layer of the brain known as the limbic system or the visceral brain, is where many of the various social emotions are processed. It processes most affective knowledge, generating more sophisticated emotional responses. The limbic system also appears to mediate or control memory processes. Both the amygdala 220 and the hippocampus 230 are part of the limbic system. The hippocampus 230 plays an important role in memory formation in the brain, particularly short term memory (memory of new information and recent events). The amygdala 220 is important for learning associations between stimuli and emotional value (emotional responses and aggressive behavior). For example, the amygdala may associate fear with a stimulus that causes pain.

The neocortex 240 is the structure in the brain that is more evolved in human brains than in other mammal brains. The neocortex 240 is responsible for associating a diversity of sensations and innate ideas, such as a sense of causality and spatial referencing, into perception, concepts and attributions. This is the portion of the brain that contains what we think of as the rational mind and the imagination and the part of the brain that generates ideas (higher mental functions, general movement, perception and behavioral responses). The neocortex 240 in humans is organized in six layers, which are parallel to the surface of the cortex. The neurons in the neocortex are organized in cylindrical columns (cortical columns), which are perpendicular to the cortical surface. Axons 140 that traverse vertically in the neocortex 240 typically form connections to neurons within a column, but among the neurons in different layers. Axons 140 that traverse horizontally in the neocortex 240 allow communication between neurons in different columns.

There are two types of memory in the brain: declarative memory and non-declarative memory. Declarative memory is explicit memory and typically depends on the hippocampus 230 and other areas of the brain. Declarative memory includes episodic memory (memory of events from one's life) and semantic memory (general knowledge of the world). The hippocampus 230 retains context-dependent memories until they are consolidated in neocortical structures, but there is evidence that these memories are stored differently in the two structures. Non-declarative memory, on the other hand, is implicit, procedural memory and depends mostly on the basal ganglia 230 and parts of the cerebral cortex (including the neocortex 240). Non-declarative memory is needed to learn skills, such as swimming. For the most part, however, it is still unclear precisely how learning and memory work in the human brain. However, it is clear that in order for the brain to learn, the structure of the brain must be somewhat plastic; that is, the structure must be able to adapt. Synaptic plasticity dependent on the activity of the synapses is widely thought to be the mechanism through which learning and memory take place, hence, the concept of synaptic plasticity. The Hebb rule comprises the idea that if the action potential from one neuron causes another neuron to fire, then the synapse along which the action potential travels should be strengthened (or when a synapse is not used, a decrease in strength). These decreases take place when a particular synapse repeatedly fails to be involved in the firing of a neuron. This is supported by experiment.

The effects of these increases and decreases of strength in the synapses can be both short-term and long-term. If the effects last a significant period of time, they are called long-term potentiation (LTP) and long-term depression (LTD). Synaptic plasticity is seen as a slow process that occurs gradually over time, and the rate of the change can be specified by one or more time constant(s).

Now, the development of artificial neural networks will be discussed, for example, in the context of efforts to simulate the wonders of the human brain. Artificial neural networks can be thought of as directed weighted graphs, where the neurons are the nodes and the synapses are the directed edges. Known neural network architectures are typically made up of input neurons, output neurons and "hidden" neurons. The so-called hidden neurons are those that are neither input neurons nor output neurons. They lie in a space not occupied by input neurons and output neurons in such a network. The so-called hidden neurons may connect to one another or connect to input neurons or connect to output neurons. Types of network structures include feed-forward neural networks, recurrent neural networks and modular neural networks.

Referring to prior art FIG. 3, there is shown a fully connected food-forward neural network comprising input neurons 310-1, 310-2, 310-3, . . . , 310-N to the left and output neurons 330-1, 330-2, 330-3, . . . , 330-P to the right with hidden neurons 320-1, 320-2, 320-3, . . . , 320-M between input and output neurons. It is not shown but one hidden neuron may connect to another hidden neuron. In feed-forward neural networks, there is a layer of input neurons, zero or more layers of hidden neurons, and an output layer. Input layers only contain outgoing edges, and the edges of one layer are only connected to the next layer (whether it be a hidden layer or the output layer). Networks may either be fully connected as seen in FIG. 3, in the sense that every neuron in a layer has a directed edge to every neuron in the next layer, or they may only be partially connected, where some of these edges are missing.

Referring now to prior art FIG. 4, there is shown an example of a known recurrent neural network. Recurrent neural networks contain at least one loop, cycle, or feedback path. FIG. 4 shows the input neurons 410-1 to 410-N, output neurons 430 and hidden neurons 420-1, 420-2, . . . , 420-M with the same shading as in FIG. 3. Delay elements 440 are indicated with boxes labeled D. A loop in a directed graph is when there is an edge from a node to itself. Cycles in a directed graph occur when there is a path from a node to itself that contains other nodes. Feedback loops and paths typically involve delay elements D. Feedback allows for storage to take place in the neurons; it gives the network a sense of memory from one instance to the next. Recurrent neural networks can be divided further into discrete-time and continuous-time neural networks. Charge is applied periodically or after randomly spaced intervals at inputs at moments in time and propagates through the network, producing output no earlier than when the charge is applied. Continuous-time neural networks model behaviors such as spikes in the network at infinitesimally small time steps. These spikes are typically modeled using a differential equation rather than as discrete events and may not have a stable solution, especially for networks that contain loops.

A neural network is modular if the computation performed by the network can be decomposed into two or more subsystems that operate on distinct inputs without communication. The outputs of these modules are then combined to form the outputs of the network. A known modular neural network may be one of a recurrent neural network or a feed-forward neural network or other artificial neural network.

Neurons in neural networks are the information processing units of the network. Neurons usually accumulate, combine, or sum signals they receive from their connections, and an activation function is applied to the result. A neuron in the network is said to fire if the output value is non-zero. Several different activation functions are commonly used. There may be a threshold function when the charge reaches a threshold value, a piecewise-linear function sometimes called saturation of a neuron and a sigmoid function related to the slope of increase (or decrease) of charge.

Training in a neural network has canonically meant changing the weights of the connections and/or the threshold values. Relatively recently, training has also referred to changes in the architecture of the network. Neural networks with training algorithms that cannot change the architecture of networks may be considered fixed-structure. Similarly, networks with training algorithms that can change the architecture may be considered variable-structure.

There are two main methods of training: gradient-based methods and evolutionary methods. Back-propagation is the most widely used algorithm for training neural networks in a supervised way. The algorithm is supervised because it requires a set of inputs and their corresponding outputs, called a training set. Back-propagation has two distinct phases: a forward pass and a backward pass. In the forward pass, input signals are propagated through the network, to produce an output. This output is compared with the expected output, producing an error. The error signals are then propagated backwards through the network, where the weights of the networks are adjusted in order to minimize the mean-squared error. Back propagation is a gradient-based optimization technique. It makes use of the gradient of an error function, evaluated using a training data set, with respect to the weights in the network. That is, back propagation uses the gradient of an error to determine how the weights in the network should be changed to reduce the error.

One of the known limitations of back propagation and other supervised learning algorithms is that they typically do not scale well. Gradient-based optimization algorithms have several known limitations as well. Because the weights are changed so that the error follows the steepest direction (in the space of weights) of descent, the results of the optimization algorithm depend largely on the initial starting point. If the initial starting point is located near local optima and far away from the global optimum, the back-propagation algorithm will likely converge to one of the local optima. This is a drawback for the back propagation algorithm because complex systems often have many local optima with significantly different (poorer) performance than a global optimum.

Another known type of training artificial neural networks is Hebbian learning. Hebbian learning is analogous to long-term potentiation (LTP) and long-term depression (LTD) that occurs in the brain. In LTP, if the firing of one neuron occurs before the firing of a receiving neuron, then the synapse between these two is strengthened. That is, in LTP, the possibility of a causal relationship between the two neurons (i.e. that the firing of one directly leads to the firing of another), influences how synaptic changes are made. In LTD, the strength of the synapse is decreased when the firing of one neuron does not lead to the firing of its connected neurons, or when the firing of one neuron occurs while the receiving neuron is in a refractory state or has recently fired. In LTD, the possibility of a non-causal relationship between the two neurons influences how synaptic changes are made. For example, if a receiving neuron fired immediately prior to the firing of a transmitting neuron, it may be appropriate to decrease the strength of the synapse.

There are four characteristics of Hebbian synapses. Modifications to a Hebbian synapse depend heavily on time in that increases are made if neurons are activated at the same time, and decreases are made if two neurons are activated at different times. All information required to determine if a change to a Hebbian synapse should be made is local information. That is, the only information required to know if a synapse should change is the activities of the neurons that are connected by that synapse. Changes in the weight of a Hebbian synapse are determined by the firing patterns of the two neurons connected by the weight. Lastly, an increase in the strength of the synapse is caused by the conjunction of presynaptic and postsynaptic activity. Hebbian learning has been observed in biological neural networks. However, applying learning in biological systems to development of learning methods in artificial neural networks is significantly more complicated than these four characteristics imply.

So-called evolutionary algorithms are presently surpassing known, more conventional artificial network architectures. The evolution of the structure of the brain and evolution within the brain can be categorized in four forms. First, at the highest level, there is evolution via speciation, and the brain structure in particular, which has occurred over millions of years. This long-term evolution has affected every aspect of the brain, but most notably, it is the level of evolution where the gross structure of the brain has developed. Following typical evolutionary theory, the complex structures from the human brain evolved from simpler structures that underwent three evolutionary mechanisms: mutation, the introduction of new structures or pieces of structures; recombination, the combination or re-use of existing structures in novel ways; and natural selection, the dying off of unsuccessful structures.

The general structure of the brain does not differ greatly from person to person; there are certain parts of the brain that are present in nearly every individual, though as the evolution of species has occurred these structures have become more complex. These are the types of structures that are of concern at the level of long-term evolution.

A shorter term evolution of the brain, what will be referred to in this work as moderate-term evolution, has been recently discovered. This evolution, referred to as epigenesis, also affects the structure of the brain, but at a finer level. Epigenesis is caused by modifications to the structure of proteins that regulate the transcription of genes; these modifications are often caused by the environment, but unlike other environmental effects, these modifications can be inherited by future generations through methylation of DNA. The modifications can lead to changes in the structure of the brain and thus far, have been seen to primarily affect the social and affective aspects of the brain.

The evolution (or perhaps more aptly, development and adaptation) that occurs within a single human's brain over the course of a lifetime, from conception through adulthood, will be referred to in this work as short-term evolution. The morphology of the brain is shaped partly through genetics, influenced by both long-term and moderate-term evolution, but also through experience (or by environmental effects). Neurons proliferate and die over the course of an individual's development. One of the factors that affects the formation and survival of neurons in this stage is the way connections are formed, that is, the types of neurons that a particular neuron's axon connects during development. The connections of a neuron affect the way that neuron behaves and operates in the future, and these connections are initially determined during this short-term evolutionary stage. An example of this type of evolution is found in London taxi drivers (where London taxi drivers were found to have enlarged posterior hippocampi over time from their ability to visualize a road map of London).

There is a certain amount of plasticity during development that allows an individual to adapt the different parts of the brain (determined by long-term evolution) to his or her particular role. There are certain portions of the brain, such as the neocortex, in which the local structure (i.e. connection strengths) appears to mostly depend on the environment, rather than genetics.

Another major structural aspect of the brain that is evolved or developed over the course of single person's lifetime is myelination. Myelination affects the efficiency and rapidity of transmissions of signals in the brain. Myelination in humans continues well into the second decade of life.

Finally, very short term evolution (development or learning, in this case) occurs on a day-to-day basis in the brain. This evolution affects synapses; this type of evolution is what is typically referred to as plasticity in the brain. There are four known major types of synaptic plasticity: long term potentiation, long-term depression, sensitization, and axonal sprouting and formation of new synapses. Long-term potentiation and long-term depression were discussed above within the context of Hebb's rule. Long-term potentiation (LTP) is a permanent or semi-permanent change in the way a neuron fires and is caused by repeated activation with stimulation; it is associated with memory in the brain. Long-term depression (LTD) refers to any form of depression in synaptic transmission, such as the lowering of signal transmission efficacy. Long term potentiation (LTP) occurs only when a synapse is active, but long term depression can occur whether a synapse is active or inactive.

Sensitization refers to enhancement of a response as a result of applying a novel stimulus. Finally, axons can sprout, both during initial formation and after transection, in the brain. Axon sprouting occurs most commonly during neonatal development, but it also can occur in adulthood. Evolutionary algorithms are optimization algorithms that are often used in large, complex state spaces. Biological evolution is a method for searching a huge number of possibilities for solutions, where solutions are the organisms themselves. The biological inspiration of evolutionary algorithms is described in as follows:

Adaptation=Variation+Selection+Heredity.

In evolutionary algorithms, a population of potential solutions is maintained. The members of the population are usually distinct and maintain variety. Evolutionary algorithms are inherently random, and random influences contribute to the variety in the population. Selection is perhaps the most important component of the formula given above. Selection refers to the concept of "survival of the fittest." For evolutionary algorithms, some concept of fitness must exist, where fitness is typically a function or algorithm mapping members of the population to numerical values. It is worth noting that the fitness function can be based on simulated values, so it may generate different value each time it is applied to a member of the population. The fitness of a member of a population should represent the relative ability of that member of the population to perform a particular task. The fittest members of the population are those that are selected to reproduce and express traits that are kept over multiple generations. Members of the population that are the least fit are those that are allowed to die off. Heredity is emulated in evolutionary algorithms by producing "offspring" from existing members of a population. The offspring can be produced in a variety of algorithm-specific ways. The sequence of typical operations for producing offspring are reproduction, crossover and mutation.

For reproduction, one or more relatively fit members of the population are chosen to reproduce. Members of the population that have a higher fitness level are more likely to have offspring in the next generation of the population. The selection of these members of the population can be done in a variety of ways. One of the ways this is done is using Roulette selection. In Roulette selection, a member of the population is randomly selected, where the probability that a given member of the population is selected is based on that population member's fitness. That is, if a member has a high fitness, it is more likely to be selected. Another selection algorithm is tournament selection. In tournament selection, a fixed percentage of the population is randomly selected. From that smaller group, the member with the highest fitness is selected. The percentage selected from the original population is a parameter of this method. For example, if you select 100 percent of the population to be this parameter, then the fittest member of the population would always be selected. However, if you had a population size of 100 and selected one percent of the population, then the selection would be entirely random (i.e. not based on fitness at all).

In crossover, attributes of two or more members of the population are combined to form a new member of the population. (Parents share with their children, i.e. a child is not a clone of one parent.) Finally, mutation (for example, parameter changes) can occur, in which some attribute of the new member is randomly changed in some way. Different types of mutations can be employed, depending upon the complexity of the representation of each member of the population. Both crossover and mutation have associated rates in an evolutionary algorithm. The crossover rate is the percentage of time in which selected members of the parent population are crossed over to produce members of the child population, whereas the mutation rate is the rate at which members of the parent population are mutated to produce members of the child population. Assuming neither of these rates is 1, there may be some propagation of identical members of the parent population to the child population.

Neuroevolution algorithms use evolutionary algorithms to train neural networks. The first neuroevolution algorithms that were developed only evolved the strength of the connections between the neurons; they did not affect the structure by adding or deleting connections or neurons. They only dealt with one form of evolution described above: very short term evolution.

The training of the connection weights in neural networks is typically formulated as an optimization problem. In particular, some error is minimized, or equivalently, a measure of performance or a goal is maximized. These approaches are equivalent because if f(x) is an error function, then 1/f(x) and −f(x) are suitable candidates for goal functions, and vice versa. The error used can be either the mean squared error between the actual output and the expected output in supervised learning or the temporal difference error as used in reinforcement learning. An example goal function is the length of time of successful operation. The weights of the networks are then trained using algorithms such as back propagation or conjugate gradient. These algorithms rely on gradient-based optimization algorithms using steepest or gradient related descent directions. There are many drawbacks to using these gradient-based optimization algorithms. In particular, gradient-based algorithms rely on the differentiability of error or goal functions, and they are likely to converge to local optima.

Evolutionary algorithms had been applied in the field of optimization to similarly complex problems, as they are less likely to become trapped in non-optimal solutions. It was a natural extension to apply evolutionary algorithms to weight training in neural networks, as this problem can be formulated as an optimization problem through which an error is minimized. Xin Yao reviews (to date) works using evolutionary algorithms (EA) to evolve/train artificial neural networks (ANNs), including using EAs to find weights, structure, learning rules, and input features in his "Evolving Artificial Neural Networks." *Proceedings of the IEEE*. Vol. 97, No. 9, pp. 1423-1447, September 1999. Yao cites results that indicate the combination of EA and ANNs result in better systems than EA or ANNs in isolation. Yao presents a thorough overview of algorithms that use evolutionary algorithms to train the weights of neural networks in "Evolving Artificial Neural Network Ensembles," *IEEE Computational Intelligence Magazine*, pp. 31-42, 2008. Yao notes four advantages of evolutionary algorithms to gradient-based algorithms. First, evolutionary algorithms do not depend on gradient information, which may be unavailable or difficult to calculate. Evolutionary algorithms can be applied to any neural network architecture, whereas gradient-based algorithms have to be adapted for different architectures. Evolutionary algorithms are much less sensitive to initial conditions. Fourthly, evolutionary algorithms always search for global optima, rather than local optima. It is also important to note that evolutionary algorithms typically rely on a fitness function, rather than an error. This fitness function can often be easily translated to reinforcement learning problems, where the fitness function is the reward received. As noted previously, however, goal, or fitness, functions can be used to determine error functions, and vice versa. The most straightforward way to do this is to reverse the sign.

Many known evolutionary algorithms deal with only one form of evolution: very short term evolution. The structure of the network is fixed. The structure of the network includes the general architecture (i.e. feed-forward, recurrent, etc.), the number and layout of neurons (i.e. how many neurons should be included in a particular layer), and the number and nature of the connections (i.e. how the neurons should be connected). For these types of algorithms the structure of the neural network is mostly determined via experimentation. That is, a certain structure is tested, and if that structure does not work, more neurons or connections are added manually, increasing the complexity, until the network is able to handle the problem. This requires significant hand-tuning by the experimenter/researcher. Knowledge about the problem can be applied and intuition developed to decide what sort of structure is required by certain problems. For each problem, a new structure needs to be determined and the selection of this structure relies entirely upon the knowledge of the structure designer. Networks with and without bias parameters and networks with different numbers of hidden neurons performed very differently. Because the structure has such a large effect on the efficacy of the network, an algorithm that learns what structure is needed to solve a particular problem is much more attractive than an algorithm that relies on prior knowledge or hand-tuning to design a structure. Constructive and destructive algorithms are algorithms that attempt to deal with this drawback. Both constructive and destructive algorithms attempt to learn a network structure, rather than relying on the trial and error approach. Constructive algorithms start with very small networks and increase their size by adding neurons and connections as needed for a particular problem. Destructive algorithms such as pruning begin with overly complex networks. Connections and neurons are then deleted to yield a minimal structure. These constructive and destructive algorithms would seem to solve the problem of finding a neural network architecture to use. However, there is a fundamental issue with these algorithms. Constructive and destructive algorithms follow strict sets of rules; for example, a constructive algorithm may only be able to add a single neuron at a time to a hidden layer. These algorithms therefore only explore a strict subset of possible architectures.

There are several drawbacks to using conventional evolutionary algorithms. Although the final overall solution may be more optimal than the solution reached by a gradient-based algorithm, evolutionary algorithms typically take longer to find a solution. Applying evolutionary algorithms to neural networks in particular comes with a variety of issues. Important factors include how to represent the networks in the population, how to measure performance and how to create offspring in a population. Evolutionary algorithms usually work with strings of real or binary numbers. There has to be a performance metric to gauge how "fit" a member of the population is. Creating offspring is usually done through mutation, crossover (recombination) or both.

Representations of a network need to maintain a link to the functionality of the network; otherwise, operations such as crossover would have no meaning. Performance is a key metric and is a problem-specific issue. For example, supervised learning problems have an associated error, which would need to be converted into a fitness, while reinforcement learning problems have associated rewards, which would also need to be converted to fitness values. The mechanisms of offspring creation are usually closely related to the representation of the networks in populations.

If a network is not performing well enough using just beck-propagation (i.e. the error between the expected and produced value has not lowered significantly), simulated annealing can be used. Finally, if it is still not performing well, the architecture can be mutated. Yao referenced above (and Liu) used this approach to attempt to reduce the computational cost of the evolutionary algorithm. They successfully apply their algorithm to several parity tasks. This approach is similar to the proposed hierarchical evolutionary strategy discussed above, in that different types of evolution (very short term, short term, and moderate term) are tried. In particular, the combination of a genetic algorithm at a higher level and another algorithm, such as simulated annealing, numerical optimization methods such as non-linear programming, gradient, generalized gradient, and/or Newton's method, at a lower level can be used.

Montana and Davis in "Training Feedforward Neural Networks Using Genetic Algorithms," *Machine Learning*, pp. 762-767, 1989 use genetic algorithms to evolve the weights in a feed-forward neural network. They represent their networks as a list of real numbers and use mutation, crossover and gradient operators to create offspring. They successfully apply their algorithm to classification of sonar data, compare to back-propagation and incorporate domain-specific knowledge. However, their application to some real-world problems is hampered by the lack of a training algorithm for finding an optimal set of weights in a relatively short time.

D. B. Fogel et al. in "Evolving Neural Networks," *Biological Cybernetics* 63, pp. 487-493, 1990, use genetic algorithms (GA) to evolve the weights in a feed-forward neural network, but also note that GAs will also work for other models, such as recurrent neural networks. They represent their networks as a list of real numbers and use only mutation to create offspring. They apply their algorithm to exclusive-or and a blending problem and compare to back-propagation, with favorable results.

Xin Yao and Yong Liu introduce an evolutionary system called EPNet for evolving the architecture and weights of feed-forward artificial neural networks in "A New Evolutionary System for Evolving Artificial Neural Networks," *IEEE Transactions on Neural Networks*, 8, pp. 694-713, 1997. Yao and Liu attempt to maintain a behavioral link between parent and child by using node splitting rather than adding a fully connected node to a layer. EPNet also encourages simplicity in the network by always testing to see if a deletion will improve the network before testing an addition. They applied EPNet successfully to parity problems, medical diagnosis problems and time series prediction problems. They found that their networks generalized better than other networks developed or trained using other methods. This is one of the reasons a neuroevolution approach was selected in this work.

Yao and Liu introduce five mutation operations that, again, are chosen in succession to maintain simpler networks if possible. The five mutation operators they introduce (given in the order they are tried) are: hybrid training (train using a modified back propagation algorithm), neuron deletion, connection deletion, connection addition, and neuron addition.

Dario Floreano et al. in "Neuroevolution: from architectures to learning." *Evol. Intel.* 1, pp. 47-62, 2008, apply artificial neural networks to many real-world problems ranging from pattern classification to robot control. A generic architecture shown in their FIG. 1 is similar to that depicted in FIG. 3 wherein the external environment is connected to input neurons and output units impact the external environment. They describe a continuous-time recurrent neural network or CTRNN. These CTRNN's represent a first approximation of the time-dependent processes that occur at the membrane of biological neurons.

Randall D. Beer and J. C. Gallagher in "Evolving Dynamical Neural Networks for Adaptive Behavior," *Adaptive Behavior*, pp. 91-122, 1992, use evolutionary algorithms (EA) to train continuous-time recurrent neural networks (CTRNNs). They use dynamical parameter encoding in an artificial neural network and use both crossover and mutation operators. They apply their CTRNNs to a food-finding task and a locomotion task (with six-legged agents).

A. P. Wieland in "Evolving Neural Network Controllers for Unstable Systems," *Neural Network.* 2, pp. 667-673, July, 1991, uses a recurrent neural network model that learns weights and connections between neurons. A binary representation is used to represent the network, and mutation, crossover, and inversion operations are used to produce offspring. This method is applied to variations on the pole balancing problem (single pole, double pole, jointed pole, and two-legged walker).

S. Dominic et al. in "Genetic Reinforcement Learning for Neural Networks," *Neural Networks,* 2, pp. 71-76, 1991, compare genetic algorithms to reinforcement learning techniques. They use a feed-forward neural network, and real-valued strings are used to represent the networks. They apply their network and algorithm to the pole balancing problem and compare their results to a reinforcement learning method (Adaptive Critic Heuristic).

K. Stanley and R. Miikkulainen in "Evolving neural networks through augmenting topologies," *Evolutionary Computation*, 10(2):99-127, 2002, introduce Neuroevolution of Augmenting Topologies (NEAT), which has several innovations, including speciation to protect structural innovation and global innovation numbers to do historical tracking of network structure and help avoid the competing conventions problem. NEAT uses of incremental growth to avoid unneeded complexity in the networks. NEAT is applied to exclusive-or and to two pole balancing (with and without velocities). Stanley et al. demonstrate that NEAT performs better than other neuroevolution methods on these tasks and demonstrate that the improvement in performance is due to those innovations.

K. Stanley, et al. in "Evolving adaptive neural networks with and without adaptive synapses," *Evolutionary Computation*, 2003. *CEC* '03. *The* 2003 *Congress on*, 4:2557-2564, 2003, augment NEAT by including adaption of learning rules (such as local Hebbian learning rules) for each connection as part of the evolution. This allows for adaptation of networks to changes in the environment and is related to the ability to the network to do real-time learning. They apply this version of NEAT to a dangerous foraging example.

Jeff Hawkins et al. in "Sequence memory for prediction, inference and behavior." *Phil. Trans. Royal Soc. B*, pp. 1203-1209, 2009, describe a mechanism for storing sequences of patterns necessary for making predictions, recognizing time-based patterns and generating behavior. They suggest that the ability to store and recall time-based sequences is probably a key attribute of many, if not all, cortical areas. They propose that the neocortex may be modelled as a hierarchy of memory regions, each of which learns and recalls sequences.

Artificial neural networks are known implemented in "hardware" as may be distinguished from more "software" embodiments. For example, Glackin et al. in "A Novel Approach for the Implementation of Large Scale Spiking Neural Networks on FPGA Hardware," *IWANN* 2005, LNCS 3512, pp. 552-563, 2005, implemented a large scale spiking neural network on field programmable gate array (FPGA) hardware. A neuron, synapse, and spike timing dependent plasticity (STDP) blocks are implemented in FPGA logic, and neural network data are held in SRAM that is external to the FPGA device. Synapse weights are determined by spike timing dependent plasticity (STDP).

In 2007, Cassidy et al. in "FPGA Based Silicon Spiking Neural Array," *Biomedical Circuits and Systems Conference* (*BIOCAS* 2007), pp. 75-78, IEEE, 2007, present a FPGA based array of Leaky-Integrate and Fire (LIF) artificial neurons. Their neurons and synapses were fixed, and each synapse supported a "single" event and a delay function associated with the event. The synapses were able to implement STDP.

In U.S. Pat. No. 7,533,071, entitled "Neural Modeling and Brain-based Devices Using Special Purpose Processor" and issued to Snook on May 12, 2009, discloses a further FPGA hardware embodiment. Snook uses a special purpose processor and FPGAs to model a large number of neural elements. Each core of the FPGA could do presynaptic, postsynaptic, and plasticity calculations in parallel. It could also implement multiple neural elements of the neural model. The network was used to control a robot.

Sharp et al. in "Power-efficient simulation of detailed cortical microcircuits on SpiNNaker," *Journal of Neuroscience Methods*, 201, pp. 110-118.2012 simulate an anatomically-inspired conical microcircuit of ten thousand neurons and tour million synapses using four SpiNNaker chips and less than two watts. The neuron model was very basic but consumed little power. Each chip consisted of 18 homogeneous processors.

It is known to utilize central pattern generators with artificial neural networks. M. Anthony Lewis et al. in "Control of a robot leg with an adaptive a(nalog) VLSI CPG chip," *Neurocomputing*, 38-40, 2001, pp. 1409-1421 constructed an adaptive central pattern generator (CPG) in an analog VLSI chip, and uses the chip to control a running robot leg. A pacemaker neuron is used to control the firing of two motor neurons. Sensors are excited and inhibited the pacemaker, allowing the robot to adapt to changing conditions.

Thereafter, M. Anthony Lewis et al. in "CPG Design Using Inhibitory Networks," *Proc. of the* 2005 *IEEE International Conference on Robotics and Automation*, (ICRA 2005), pp. 3682-3687, 2005, implemented CPGs that are designed and optimized manually. A four-neuron, mutual inhibitory network forms the basic coordinating pattern for locomotion. This network then inhibited an eight-neuron network used to drive patterned movement.

It is also known to utilize analog circuitry for the construction of artificial neural networks. Simon Friedmann et al. in "Reward-based learning under hardware constraints—using a RISC processor embedded in a neuromorphic substrate," *Frontiers in Neuroscience*, 7, p. 160, 2013 proposed and analyzed in simulations a flexible method of implementing spike time dependent plasticity (STDP) in a single layer network on a wafer-scale, accelerated neuromorphic hardware system. Flexibility was achieved by embedding a general-purpose processor dedicated to plasticity into the wafer. It was possible to flexibly switch between synaptic learning rules or use different ones in parallel for different synapses.

U.S. Pat. No. 8,311,965 entitled "Area Efficient Neuromorphic Circuits Using Field Effect Transistors and Variable Resistance Material" issued to Breitwisch et al., Nov. 13, 2012, provides details for analog neuromorphic circuits using field effect transistors. Manually programmable resistances are implemented using phase change material.

U.S. Published Patent App. No. 2012/0109863 entitled "Canonical Spiking Neuron Network for Spatiotemporal Associative Memory," on May 3, 2012, to Esser et al. presents a layered neural net of electronic neurons configured to detect the presence of a spatiotemporal pattern in a real-time data stream, and extract the spatiotemporal pattern. The plurality of electronic neurons stored the spatiotemporal pattern using learning rules (STDP). Upon being presented with a version of the spatiotemporal pattern, they retrieved the stored spatiotemporal pattern.

U.S. Pat. No. 8,600,919 entitled "Circuits and Methods Representative of Spike Timing Dependent Plasticity of Neurons," to Poon et al., Dec. 3, 2012, describes a circuit and a method that could emulate STDP in a way that closely replicated biochemical processes, that could emulate all of the different types of STDP, and that could provide a relationship between the Bienenstock-Cooper-Munro rule and STDP.

U.S. Published Patent App. 2009/0292661 entitled "Compact Circuits and Adaptation Techniques for Implementing Adaptive Neurons and Synapses with Spike Timing Dependent Plasticity (STDP)" on Nov. 26, 2009, to Hass implements STDP using a simple analog circuit.

U.S. Pat. No. 8,510,239 entitled "Compact Cognitive Synaptic Computing Circuits with Crossbar Arrays Spatially in a Staggered Pattern" issued to Dharmendra S. Modha, Aug. 13, 2013, implements STDP using electronic neurons interconnected in a compact crossbar array network. Neurons could be implemented to include a "leak" function. The invention could be realized in an entirely hardware form, an entirely software form, or a hybrid software/hardware form.

U.S. Published Patent Application No. 2012/0036099 entitled "Methods and Systems for Reward-Modulated Spike-Timing-Dependent Plasticity" on Feb. 9, 2012, to Venkatraman et al. describes an area-efficient implementation of reward-modulated STDP. Three separate memories with entries for each synapse were used. The first two memories stored current and updated synapse weights, and the third was used to determine if the weight needed to be updated.

U.S. Pat. No. 8,433,665 entitled "Methods and Systems for Three-Memristor Synapse with STDP and Dopamine Signaling" issued to Tang et al., Apr. 30, 2013, proposes implementation of a three-memristor synapse where an adjustment of synaptic strength is based on Spike-Timing-Dependent Plasticity (STDP) with dopamine signaling. One memristor could be utilized for long-term potentiation (LTP), another for long-term depression (LTD), and the third as a synaptic connection between a pair of neurons with a variable strength.

U.S. Pat. No. 8,515,885 entitled "Neuromorphic and Synaptronic Spiking Neural Network with Synaptic Weights Learned Using Simulation" issued to Modha, Aug. 20, 2013, used computer simulation to determine synaptic weights which were loaded onto chips. Simulation was abstract and could be done using spike-timing dependent plasticity (STDP) or reinforcement learning. External learning allowed for small, efficient neuromorphic hardware systems.

U.S. Published Patent App. No. 2013/0073497 entitled "Neuromorphic Event-Driven Neural Computer Architecture in a Scalable Neural Network" on Mar. 21, 2013, to Filipp Akopyan et al. presents a spike event driven network where axons are connected to neurons by a synapse array. It uses a scheduler to deliver spike events to axons. Each neuron maintains a STDP variable that encodes the time of the most recent fire. It is used to implement LTP/LTD.

B. V. Benjamin et al. in "Neurogrid: A mixed-analog-digital multichip system for large-scale neural simulations." *Proceedings of the IEEE*, 102, pp. 699-716, 2014 created Neurogrid, an entirely clockless system with sixteen mixed-analog-digital chips that simulated a million neurons with billions of synaptic connections in real time using sixteen Neurocores integrated on a board that consumed three watts. STDP was possible, but at a high cost to area, time, and energy efficiency.

Giacomo Indiveri et al. in "Neuromorphic silicon neuron circuits." *Frontiers in Neuroscience*, 5, 2011 described "the most common building blocks and techniques used to implement" silicon neuron circuits and "compare[d] the different design methodologies used for each silicon neuron design described, and demonstrate[d] their features with experimental results, measured from a wide range of fabricated VLSI chips."

Cassidy et al. in "Cognitive Computing Building Block: A Versatile and Efficient Digital Neuron Model for Neurosynaptic Cores," *IBM Research*, 2013, presented TrueNorth, a scalable neurosynaptic computer architecture, which used leaky integrate-and-fire neurons. The input, the state, and the output were implemented with configurable and reproducible stochasticity. The invention has four leak modes that bias the internal state dynamics, deterministic and stochastic thresholds, and six reset modes for rich finite-state behavior.

Preiss et al. in "Compass: A scalable simulator for an architecture for cognitive computing." *Proceedings of the International Conference on High Performance Computing, Networking, Storage and Analysis*, p. 54. IEEE Computer Society Press, 2012 presented Compass, a multi-threaded, parallel functional simulator of the TrueNorth architecture. It successfully simulates $10^9$ neurons and $10^{12}$ synapses at 388 times slower than real time. It is event driven, not clock driven.

WO Patent App. 2004/027704 published Apr. 1, 2004, entitled "Spiking Neural Network Device," by Dario claims a device which stores a genotypic representation of a spiking neural network. Evolutionary algorithms are used to tailor networks to be used in control systems.

Gomez et. al. in "Efficient Non-linear Control Through Neuroevolution," *Machine Learning: ECML* 2006. LNCS 4212, pp. 654-662, 2006, introduce CoSyNE, a neuroevolution method that evolves recurrent neural networks at the weight-level. Networks are represented as a vector of real-valued weights, children networks are created using crossover and mutation, and networks are co-evolved by permuting subpopulations to allow for an increase in diversity. CoSyNE is compared with a large number of reinforcement learning and neuroevolution methods on the one and two pole balancing task. In their follow-up "Accelerated Neural Evolution through Cooperatively Coevolved Synapses," *J. Mach. Learn. Res*, 9: pp. 937-965, 2008, Gomez et al. discuss CoSyNE in detail, as well as compare it with several reinforcement learning and neuroevolution methods. This work presents results for sixteen methods in total (including CoSyNE) on one pole and two pole balancing tasks, with and without velocities provided as input. The results demonstrated that neuroevolution methods perform better than reinforcement learning methods, and that CoSyNE performed the best of the neuroevolution methods tested.

Notwithstanding the advances in evolutionary artificial network architectures and algorithms, there remains a need for a visualization tool for a neuroscience-inspired network architecture or biological system or DANNA which overcomes the problems exhibited by any known visualization tool.

SUMMARY OF THE PREFERRED EMBODIMENTS

In accordance with an embodiment of a method and apparatus for constructing a neuroscience-inspired artificial neural network or a dynamic adaptive neural network array with visualization of network paths upon stimulus that overcomes the deficiencies of the prior art, the embodiment exhibits five characteristics which differentiate over the prior art. Firstly, it is desirable that a neural network structure evolve over time. Evolution over time means that the learning algorithms of the prior art may not evolve in accordance with data (events) received at input neurons compared with the evolution achieved in accordance with the present invention and the present learning algorithms disclosed herein. Secondly, it is desirable that neural networks may be embedded into a geometric space. This characteristic suggests that the present invention seeks confinement, for example, to a geometric space in a similar manner that it is believed that the human brain and its sensory inputs and outputs are confined to a geometric space. Thirdly, it is desirable that neural networks comprise dynamic elements and operate on a continuous time scale. By dynamic elements is intended the opposite of static elements such as dynamic neurons and dynamic synapses. Also, the concept of continuous time scale means an intention to differentiate from a discrete time scale or one only capable of one input at a time. Clearly, it is desirable for an artificial neural network to receive two inputs at the same time; that is, all inputs may be continuously occurring, and the network is continuously learning and making decisions with the expectation that the artificial neural network will adapt to its environment. Fourthly, it is desirable if useful substructures in neural network structures can be recognized and reused in larger network structures for solving a particular problem such as in the control or classification arts. That is, for example, the present invention is capable of identifying in a visualization those structures that are acting in response to a given input or continuous series of inputs. Then, these same structures that have been identified may be reused to respond to a similar set of inputs for solving a larger problem utilizing a plurality of useful substructures and visualizing pathways from input to result. Fifthly, it is desirable if special-purpose emotion-related substructures and neurotransmitters can be incorporated into artificial neural networks. As suggested above, emotions such as fear or anger have been artificially simulated in the prior art individually but not collectively as to the collection of many emotion-related substructures.

An artificial neural network according to an embodiment of the present invention initially comprising a two or three dimensional structure in space comprises input neurons, hidden neurons and output neurons connected by synapses. Input neurons receive stimulus (data) from the environment. Output neurons cause a result in the environment. Thus, an "output neuron" may be defined as a circuit element in a NIDA or a DANNA as the circuit element that drives a signal external to the array (DANNA) or NIDA such as to provide an output to an external process. In a DANNA, the element that drives a signal external to the DANNA is typically a synapse. This synapse has a weight where the weight communicates a value or strength of signal to the external device, system or process.

Hidden neurons are connected by synapses and exist at a location in a space (two or three dimensional space) not occupied by either input neurons or output neurons (where the space may be virtual, simulated or constructed as a hardware array in space. Desirably, no affective system or at least one affective system is coupled to the artificial neural network for regulating a function of at least one parameter associated with a neuron or a synapse and, preferably, may adjust that same parameter for each impacted like element in the network, neuron or synapse of a selected subset of such elements. In particular, a demonstrated affective system may change the thresholds of neurons in the network, which is analogous to a neurotransmitter in the brain making neurons more or less likely to ire. Consequently, a neuroscience-inspired artificial neural network architecture may comprise, for example, three such networks, coupled in simulated three dimensional space. An artificial neural network may comprise one of a neuroscience-inspired dynamic architecture (NIDA) comprised of a computational network and first and second affective networks which may provide a simulation of LTP and LTD and a dynamic artificial neural network array (DANNA) or a combination of these or an ANN known in the art or combination of any of these. An embodiment may be simulated on a well-known von Newman computer processing system so as to comprise a special purpose processing system for solving problems in control (a pole balancing problem by way of example), anomaly detection (data arrival rates at a node in a data network by way of example) and classification (recognition of handwritten numbers by way of example). The present special purpose visualization tool may be applied to any of these, for example, to gain insights into neural pathways for solving specific problems that are not used in solving different problems.

Moreover, simple neuron and synapse elements have been constructed in "hardware" to build two dimensional artificial networks and arrays (DANNA) for performing the same control, anomaly detection and classification problems. These simple elements utilize the same or similar parameters as those of the simulated networks. Both the simulated and hardware embodiments are continuously evolving over time under the influence, for example, of the affective networks and learning.

Visualization of neural pathways may be provided by outputting neural pathways over run time units at varying speeds using color, spheres, lines, arrows or other symbols to represent neurons and synapses, and the outputs analyzed for causality paths as will be defined herein and to identify useful substructures from which larger artificial network structures may be constructed for solving, for example, problems in the control and classification arts.

The present visualization tool is not limited to application with artificial neural networks. Data may be acquired and modeled from biological neural networks. For example, deep brain stimulation devices can acquire spike or firing data from collections of biological neurons a model of these collections may be made, as can arrays of electrodes placed on or near the surface of a portion of the brain such as the cortex or on or in other reachable structures within the brain. The outputs of these collections of neurons may provide sufficient input as they fire in three dimensional coordinate space to output visualizations in accordance with the visualization tool of the present invention in real time or, having been stored in data memory in time units or so as to slow the visualization of the neural firings in lengthened time units. Electrodes can also be used to measure neural or neuromuscular signals within biological tissues such as muscles with extremities (arms, legs), hips or within and around organs such as the heart and lungs. Such data collection and visualization can provide information to better understand biological neural system behavior or, for example, to improve implementations of implants or prosthetic devices.

These methods and special purpose apparatus and other embodiments of visualization of neural pathways in an artificial neural network (NIDA, DANNA, combination of these or other special purpose artificial neural network known in the art) will be discussed in some detail in the Detailed Description section and are introduced in the Brief Description of the Drawings section which follows.

BRIEF DESCRIPTION OF THE DRAWINGS

Embodiments of a method and special purpose apparatus for visualizing neural pathways in an artificial neural network will be discussed in the context of the following drawings wherein:

FIG. 9 shows example hand-written digits used in a classification application and scanning of a hand-written digit 0 by row, by column or by row and column.

FIG. 17 being adapted from a color copy found as FIG. 5 in IEEE 2014.

FIG. 21 shows an event path from a network shown in gray scale trained to recognize the hand-written digit 7 from input stimulus to output neuron when the digit 7 is correctly classified adapted from a color copy found as FIG. 9 in IEEE 2014.

FIG. 23A through FIG. 25J show utilization of the visualization tool to isolate specific substructures or sub-networks of networks utilized in the recognition of each of the hand-written digits 0 through 9.

The figures introduced above will now be discussed in the detailed description of embodiments of a special purpose visualization tool for visualizing neural pathways in an artificial neural network which follows.

DETAILED DESCRIPTION

Embodiments of a method and apparatus for visualizing neural pathways in, for example, a neuroscience-inspired artificial neural network (NIDA) or other artificial neural network will be described with reference to FIGS. 1-26. One embodiment of an artificial neural network may comprise a computational network and no affective system, at least one affective system and/or a learning system (optional). One embodiment of an artificial neural network in which the present special purpose visualization tool may be applied comprises a NIDA, another a DANNA and another a combination thereof as discussed in related patent applications by subject matter of a subset of the inventors and incorporated by reference as to their entire contents. Moreover, one embodiment of a visualization tool may be adapted to generally provide visualization of neural pathways and related analysis for artificial neural networks known in the art and to biological neural networks.

The design of the artificial neural networks described herein draws inspiration both from biological neural networks and from traditional artificial neural networks from machine learning. It is important to note that a goal is not to directly simulate a biological network, and the simulations described herein are not intended to represent what occurs in the brain. A model of a neuron may be extremely simplified. Even with the relatively simple neural implementation used herein, complex behavior may be generated by trading off complexity of the neuron for complexity in the network.

Figure 8:
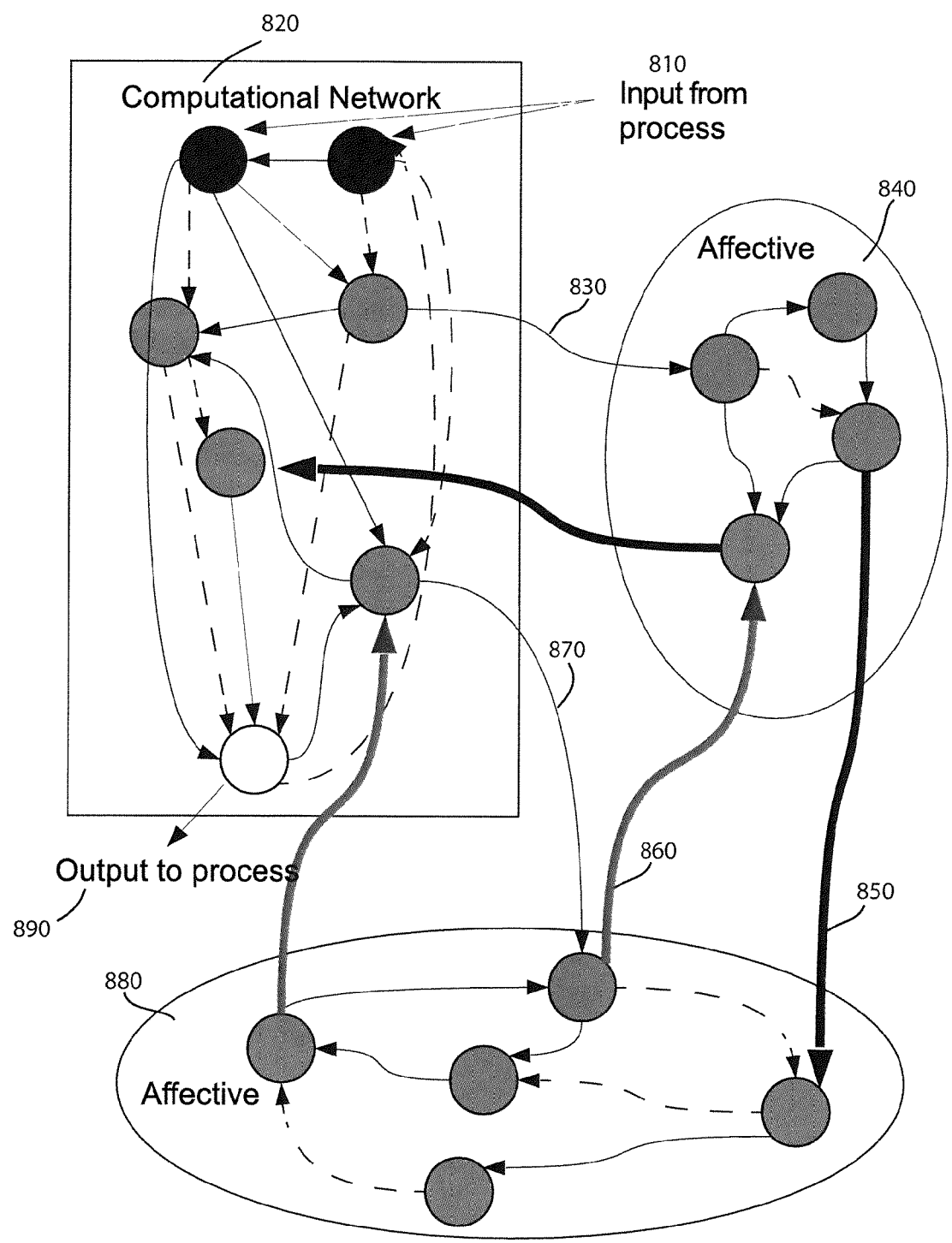
FIG. 8 shows coupled, simulated neuroscience-inspired neural networks comprising a computational network and at least one affective network (two affective networks shown).

In one implementation of an artificial neural network (ANN), each neuron is located at a point in three-dimensional space. Referring briefly to FIG. 8, neurons can be input neurons, output neurons, both types, or neither type, depending on the requirements of the network. For example, an input from a process 810 is input to computational network 820 having two input neurons shown by way of example. Each neuron has an associated threshold and refractory period. In implementations of ANN's, both of these values may be fixed for the network (i.e., every neuron in the network has the same threshold and refractory period). Neurons may be connected to other neurons via synapses. Moreover, synapses may be connected to other synapses. These synapses may be directed, so each neuron has a set of synapses to other neurons and a set of synapses from other neurons. The primary actions of a neuron are changes in charge and in firing. Charge is received by a neuron from its synapses. The charge on a neuron may be accumulated until that neuron's threshold is reached.

When the threshold is reached, if the neuron is not in its refractory period, the neuron fires, and the neuron's charge is reset to zero (or neutral, as the charge may also be negative). If the neuron is within its refractory period, then, the neuron maintains its charge but does not fire. Thus, a neuron can accumulate charge during its refractory period, but it may not fire during this period. As soon as a neuron fires, it enters its refractory period. This model of a neuron is inspired by the Hodgkin-Huxley model. In the present model discussed, the charge values and threshold values of the neurons may be bounded between $-1$ and $+1$.

Neuron thresholds and refractory periods, and synaptic propagation delays all introduce dynamic behaviors in the present network. Unlike most proposed ANN architecture, but similar to natural neural processes, these dynamic effects may be distributed throughout an artificial neural network and are directly influenced in the generated ANN's by evolutionary programming methods used to construct and adapt the ANN's for specific purposes.

Synapses in an implementation discussed briefly herein may be defined by the neurons they connect. Specifically, each synapse goes from one neuron to another neuron. Each synapse may have a distance between two neurons and a weight (or strength) of the synaptic connection. The distance between the two neurons may affect how long it takes for charge to travel along the connecting synapse.

The weight of the synaptic connection determines how much charge arrives at the second neuron after the first neuron fires. One of the NIDA and DANNA artificial neural network model discussed herein may not currently include the concept of myelination; if two synapses are each of length d, then, it takes the same amount of time for charge to travel from one end of each synapse to the other. However, in alternative embodiments, first and second synapses may connect a source and destination neuron, doubling the delay parameter, or the delay parameter of different synapses may be made to be different form one another or variable.

The major actions associated with synapses are processes similar to long-term potentiation (LTP) and long-term depression (LTD). LTP and LTD occur in biological brains. It is speculated that they play a major role in learning. If charge traveling along a synapse from neuron A to neuron B causing neuron B to fire, then, the weight of that synapse increases. In one implementation discussed herein, LTD occurs at that synapse if charge is received by neuron B during its refractory period. LTP increases the weight of the synaptic connection by a fixed value (specified for the entire network), and LTD decreases the weight of the synaptic connection by the same fixed value. Synapses have a refractory period associated with LTP and LTD, which prevents changes to the weights from occurring too rapidly.

It is important to note that, for many purposes, LTP and LTD may be omitted altogether in ANN's. However, a goal of a NIDA and a DANNA and perhaps other ANN's is to use an affective system to control or to modulate the behavior of an artificial neural network that is learning to perform a certain task. Learning for such networks may cause not only the synapse weight values to change, but also the structure of the network to change. To demonstrate that an affective system can, in fact, control a learning network's behavior, some form of learning is included in the network. In a simple control or classification example discussed herein, learning is more complex because the structure of the network also changes over time. Anomaly detection and classification may be discussed herein after a control application.

The networks used for a control problem may be defined as a grid in three-dimensional space. Maximum x, y, and z (called $M_x$, $M_y$, $M_z$) magnitudes are defined below by way of example, as well as the granularity $\delta > 0$ of the grid. Neurons may be located at coordinates in the grid, (x, y, z), where $-M_x \leq x \leq +M_x$, $-M_y \leq x \leq +M_y$, and $-M_z \leq z \leq +M_z$, and the values of x, y, and z may be integral multiples of the granularity $\delta$. The granularity parameter specifies how close two neurons in the grid can be.

Simulations may take place at the network level and are discrete-event simulations. Artificial neural networks may have associated event queues, in which different event types are specified to occur at some time in the simulation. A unit of simulation time is the amount of time it takes for charge to travel one unit in space. For example, if two neurons are connected and are located one unit apart (i.e. a neuron at (0,0,0) and a neuron at (0,0,1)) then one unit of simulation time is the amount of time required for charge to travel from one of the neurons to the other.

Five event types are defined: addition of (or reduction of) charge to a neuron, firing a neuron considering a refractory period, adjustment of thresholds, an input pulse event, and a change in the desired firing rate. The addition of charge to a neuron and the firing of a neuron are internal events, which are caused by other events within the network. Input pulse events are events in which the network interacts with its environment. The adjustment of thresholds event is an interaction of the network with the simulated affective system (or systems). The change in the desired firing rate event is an interaction between the environment and the simulated affective system. Output events, in which the network gives information to the environment, can be defined for applications, such as a control category of applications. A pole balancing problem is discussed in the NIDA and DANNA patent applications related by subject matter and incorporated herein by reference of a subset of the present inventors.

The adjustment of thresholds event type applies a network-wide change to the threshold of every neuron in the network. The amount to change the threshold is determined by the affective system. The current firing rate of the network and the desired firing rate of the network are inputs to the affective system. The output of the affective system is the amount to change the thresholds by in the network.

An affective system 840 (FIG. 8A) may be used and receive an input 830 and provide an output to computational network 820 as well as provide an input 850 and receive an output 860 from a second affective system 880 which may also receive an input 870 from and provide an output to computational network 820 (which in turn provides an output to a process 890). An affective system may be determined by the following equations, which could be replaced by a second neural, or discrete-event, network. $f_t$ is the firing rate of the network, measured over a certain window, at time t. This is the input provided to the affective system from the network. $d_t$ is the desired firing rate at time t. This desired firing rate is provided by the environment and can be changed by a desired firing rate event. The error at time t, $e_t$, is calculated:

$$e_t = f_t - d_t \qquad (1)$$

There may be two affective systems: a simple affective system with two parameters and a slightly more complex affective system with three parameters. The simple affective system is used in all tests below, unless otherwise noted. Both affective systems have the parameter w>0, which is the window size of the system and specifies how often the error is recalculated. In the simple affective system, the change in the threshold at time t is calculated:

$$\Delta \tau_t = \alpha e_t \qquad (2)$$

The parameter $\alpha$ is a weighting term, and the change in the threshold at each time step is proportional to the firing rate error. $\Delta \tau_t$ is the amount that every threshold in the network is changed at time t. This result is passed back to the network, and the change is applied to all of the neurons in the network; since all of the neurons have the same initial threshold value of 0.5, all neurons in the network maintain the same threshold value throughout the simulation (except in the pole balancing task). The threshold is bounded to be in the interval [−1, +1] and equation (2) has no effect if it would cause either bound to be violated.

In the more complex affective system, a second parameter, $\lambda$, is added. A geometrically averaged error at time t, $E_t$ is calculated:

$$E_t = \lambda E_{t-w} + (1-\lambda) e_t \qquad (3)$$

The parameter $\lambda$ is a decay rate. It defines how much errors at times 0 through t−1 will affect the change in the threshold at time t. With this second affective system, the change in the threshold at time t is calculated:

$$\Delta \tau_t = \alpha E_t \qquad (4)$$

where, again, $\alpha$ is a weighting term. In both cases, the result $\Delta \tau$ is passed back to the network, and the change is applied to all of the neurons in the network. Note that the first and second systems are equivalent if $\lambda=0$. The same boundary logic applies as with equation (2).

A goal is to demonstrate that a simple affective system interacting with an artificial neural network can have a noticeable effect and can stabilize the average firing rate at desired levels. All networks discussed in the related NIDA and DANNA patent applications (except for those trained to complete the pole balancing task) may have sizes up to 1000 neurons and 10,000 synapses, where $M_x = M_y = M_z = 100$. This is a relatively large artificial neural network, but compared to the human brain, this is a very small network. It is important to note, however, that the inventors are not attempting to model a biological neural system with their artificial neural networks; the artificial neural networks suggested here are merely motivated by biology. The tasks these special purpose artificial networks are applied to are specific and well-defined. As such, they can be thought of as analogs to the small portions of the neocortex that implement specific functionalities. Networks with different numbers of neurons and synapses yield similar results, though they are not shown or discussed in the present application in detail but are described in the literature, for example, with reference to the attached Bibliography.

The initial neuron placements in an artificial neural network are random, and the distribution of the synapses is random, but with a higher likelihood of connectivity between spatially close neurons than neurons that are farther apart. In one network structure, there are 200 possible x-coordinate values, 200 possible y coordinate values and 200 possible z coordinate values, resulting in $8 \times 10^6$ possible locations for neurons in this exemplary network. A specific instance or realization of an exemplary network may have neurons at 1000 of these locations, randomly selected according to a uniform distribution, except no two neurons are allowed to occupy the same location in space.

A typical special purpose artificial neural network (except the networks trained to complete a control task such as pole balancing) may have a single input neuron that receives information from the environment. The special purpose control, for example, a pole balancing network may have many input neurons. The "environment" may consist of two types of input: pulses sent to the input neuron at exponentially-distributed random intervals, with a mean firing rate of 0.1 firings per unit time, and an input to the affective system that sets the current desired firing rate. These inputs play the role of a persistent external excitation used to initiate and promote firing events in the network. This is an extremely simple environment; more complex tasks have richer environments that provide meaningful information to the network and receive signals produced by the network (see, for example a pole balancing example discussed in some detail in the NIDA patent application). The affective system may monitor the behavior of the network and applies the threshold changes to the network every w (the window size) units of simulation time. For the tests in one special purpose artificial network and, by way of example, w=10.

All neurons in an artificial neural network may have a refractory period of one, which means that there is an upper limit on the firing rate of the network; since each neuron can fire at most once in a single simulated time step, the maximum firing rate of the network per time step is 1000. This assumes that the network is fully connected, which is not a requirement placed on the random initialization of the networks. There may be neurons that have no incoming synapses or neurons with no outgoing synapses, which would further limit the maximum firing rate of the network, and the network is not necessarily connected.

In preliminary experiments, the parameters of the affective system may be set to be $\alpha=0.001$ and w=10. The long term potentiation/long term depression refractory periods may be set to be 10, and the weights may be adjusted up (for LTP) and down (for LTD) by 0.001.

Figure 5:
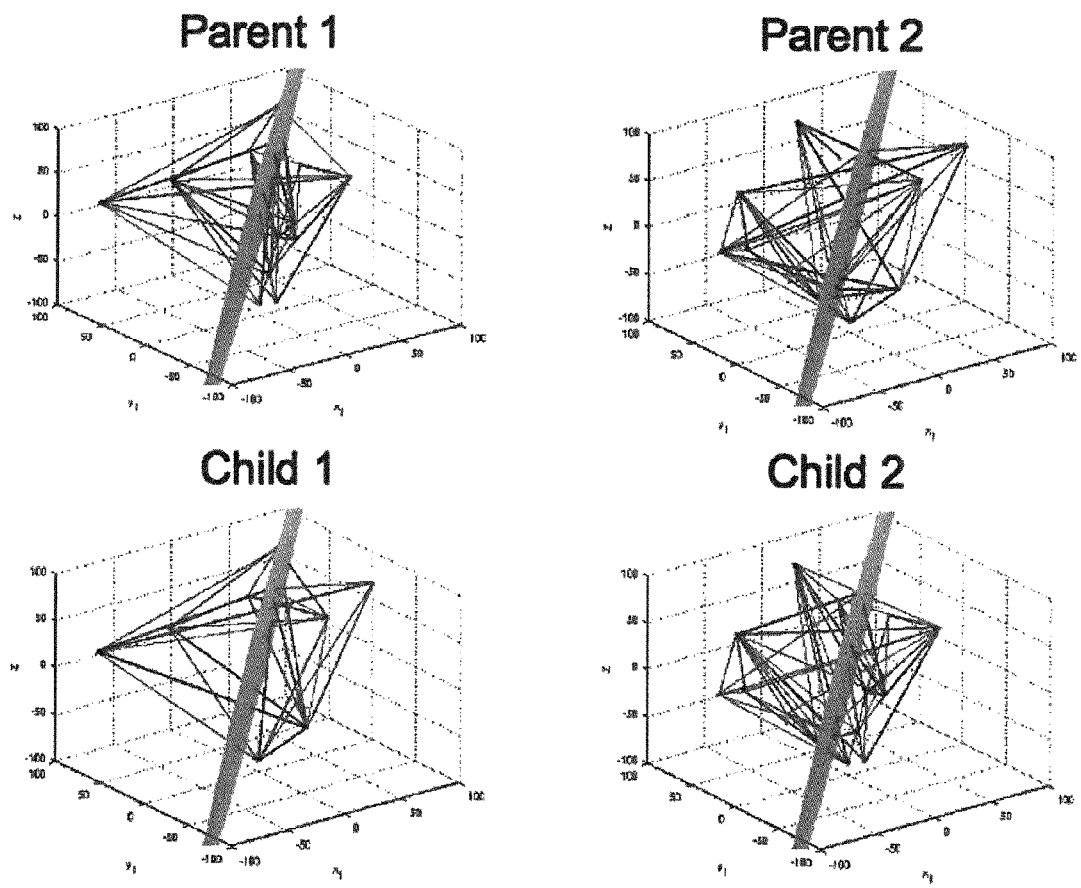
FIG. 5 is a pictorial representation of crossover with three dimensional representations of Parent 1, Parent 2, Child 1 and Child 2.
Figure 6:
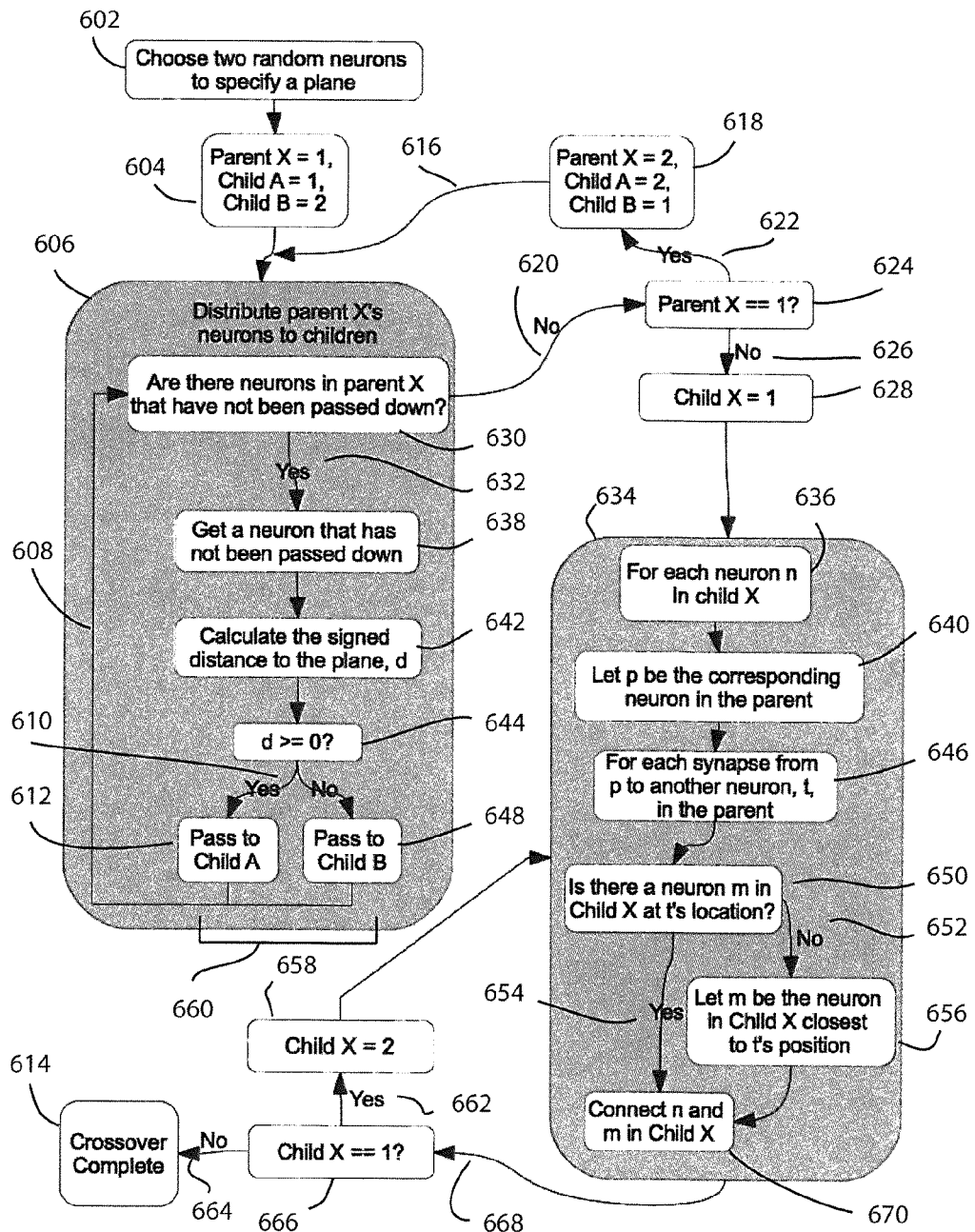
FIG. 6 is a flowchart showing a process of crossover which is related to Parent 1, Parent 2, Child 1 and Child 2 crossover FIG. 5.

A fitness function is defined for each special purpose application (for example, among control, anomaly detection and classification applications), and parents may be selected using tournament selection. Networks may be represented and manipulated directly in this implementation. Both crossover and mutation operations may be applied with some probability to the parents selected. An example of crossover is shown in FIG. 5 and a corresponding flowchart in FIG. 6. Details about the crossover and mutation operations as they apply to NIDA and DANNA network structures without affected systems are discussed with reference to FIG. 6.

At 602, there is a choice made of two random neurons to specify a plane (for example, a point and a second vector defining a point orthogonal to the plane; (see lines defining a plane in each of the networks of FIG. 5). At 604, let parent X be 1, child A be 1 and child B be 2. Process 606 distributes parent X's neurons to children. Step 630 asks are there neurons in parent X that have not been passed down. If Yes, at 632, a neuron is identified that has not been passed down at 638; otherwise, if No at 620, Parent X is set to =1 at 624. From 638, the signed distance to the plane, d, is calculated at 642. If d is greater than or equal to 0 at 644, and so Yes at 610, then, the neuron passes to child A at 612, and if No to child B at 648 and the path 608 from one of 612 or 648 returns to 630 for determining more neurons of parent X not passed down to children; therefore, both conditions 660 are properly handled.

From 624, if Yes at 622, the parent X=2, Child A=2 and Child B=1 at 618 and by arrow 616, the process returns to process 606 to distribute parent X's neurons to children. On the other hand, if the answer is No at 626, then Child X=1 at 628 and, at 636, process 634 begins with respect to child X. For each neuron in child X, at 640, let p be the corresponding neuron in the parent. At 646, for each synapse from p to another neuron, t, in the parent, at 650, is there a neuron m in Child X at t's location at 650? If Yes at 654, then connect n and m in Child X at 670. If No at 652, let m be the neuron in Child X closest to t's position at 656 and connect n and m in Child X at 670. From 670, 668 leads to 666 which asks is Child X=1 and if not at 664, the crossover is complete at 614. If Child X is 1 and Yes is returned at 662, then, Child X=2 at 658 and the process for child X 634 begins again at 636.

Both crossover and mutation operations are altered slightly to compensate for the inclusion of the simple affective systems. In particular, the desired firing rate may be included as part of network training. An example of a training algorithm is described by way of example with reference to FIG. 7.

Figure 7:
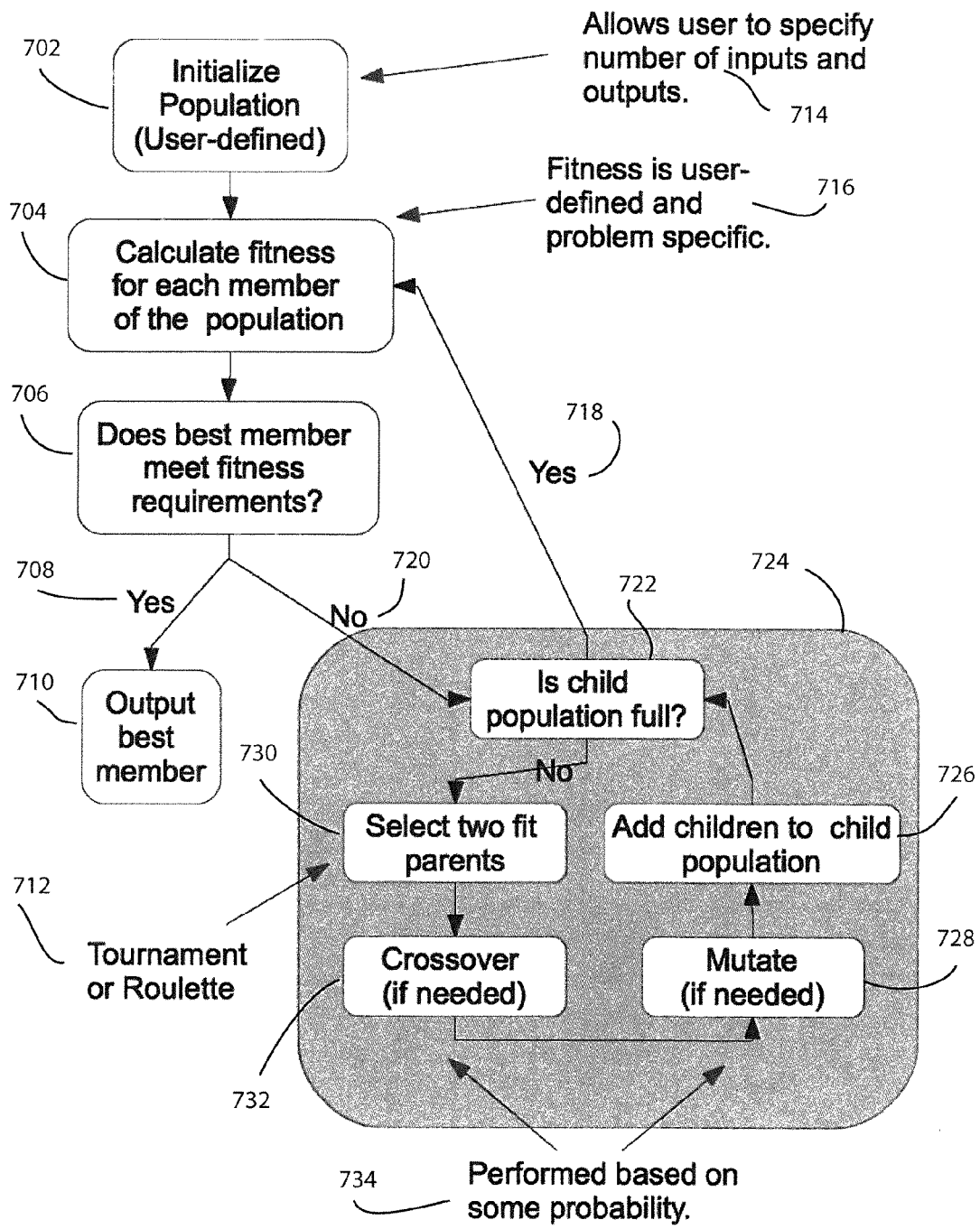
FIG. 7 is a flowchart showing a training algorithm using tournament or roulette processes.

Referring to FIG. 7, there is provided a flowchart of an exemplary training algorithm utilizing tournament or roulette processes 712. At 714, the training permits a user to specify a number of inputs and a number of outputs. This leads to 702 where a user may define and initialize a population. Then, at 716, a user may define fitness and a specific problem. Steps 702 and 716 lead to calculating fitness for each member of the initialized population at 704. At 706, does the best member meet the fitness requirements? If Yes at 708, the best number is output at 710. If No at 720, the crossover/mutation process 724 begins by asking at 722, is the child population full? If Yes at 718, there is a return to fitness calculation 704. If No, then, two fit parents are selected at 730 and a roulette or tournament selection begins at 712 and is input to 730 for the selection process. After parents are selected, a crossover is performed at 732 if needed. Also, a mutation is performed at 728 if needed. At 734, crossover 732 and/or mutation 728 are performed based on some probability at 734. At 726, children are added to the child population at 726 and the crossover/mutation process 724 begins again at 722 asking if the child population is full which continues until the answer is Yes at 718.

Classification (Hand-Written Number Classification)

Referring to FIG. 9-22, NIDA (or DANNA) networks or other special purpose artificial neural networks or combinations thereof may be applied to the MNIST handwritten digit classification task or for the special purposes, for example, of control, anomaly detection and, in classification, visualizing neural pathways in a sub-network structure for defining a line in order to build and visualize a larger network or combination of such substructures to visualize neural pathways in such a larger network. In the digit classification task, 28 by 28 pixel images of handwritten digits (0-9) are given as input to a digital data receiver and received as neural network data, and the goal of the task is to produce the correct digit corresponding to the image as output. FIG. 9 shows a sample handwritten digit and use of the input data receiver, for example, comprising a camera or an image scanner for scanning by row, by column and by row and column. In a further embodiment, entropy-based scanning is applied for receiving network data.

This task may be entirely static; there may be no time component. Thus, simply feeding the image as input network data to a NIDA (DANNA) network does not take full advantage of the dynamic components of a NIDA/DANNA network. To take advantage of the information content that can be stored in a network via synaptic delays and neuronal charges, we chose to add a time component to the task. In particular and referring to FIG. 9, rather than feeding the entire image into the network at once, the network may scan the image in one of at least three ways: (1) a row at a time, (2) a column at a time, or (3) both a row and a column at a time. This allows the task to take advantage of the inherent dynamical properties of NIDA networks. This approach also significantly reduces the size of the network (by reducing the number of input neurons from 784 to 28 or 56). There are several ways one might use our networks to solve this task. A single network could be trained that takes the image as input (in the scanning way as described above) and has 10 output neurons (one corresponding to each digit). Then, based on the activity of the network a guessed digit or digits can be produced, for example, by choosing the digit that corresponds to the output neuron that fires the most during simulation. This is the most straightforward approach; however, because the network is required to recognize each digit type, the resulting networks may be very complex. We instead use many small networks that contribute to the final solution results of these networks can then be combined via a winner-take-all (WTA) scheme to produce the guessed digit for any given test case. There are multiple fitness or scoring functions that can be defined for this task. We explored two different fitness functions.

The first fitness function takes 500 randomly selected images at a time from the training set (50 representing each digit type). Then, of those 500, the fitness function takes 10 at a time (one for each digit type), and simulates the network on each of those images. Suppose we are training a network to recognize images of the digit d (where $d \in \{0, \ldots, 9\}$). If the network correctly classifies an image of typed and correctly identifies that the other nine are not of digit type d, the network's score is increased by 10. If the network fails on any of those ten classifications, its score is unchanged. The goal of this fitness function is to produce networks that are able to identify a particular digit and only digits of that type.

The second fitness function is based on entropy. Again, suppose we are training a network to recognize images of digit type d. For each network, we evaluate that network on all of the training set images to produce a listing of the number of times that network fires (in some window or over the course of the entire simulation).

The EO attempts to find the network (and associated threshold 7T) that minimizes the fitness function.

In both fitness functions, rather than training over the entire set of training images at a time, 5,000 of the 60,000 are randomly chosen, where 500 of each digit type are represented in the 5,000. This reduces the chance of over fitting to the training set. Then, rather than using only one network for each digit, many networks are chosen. Using one or both of these fitness functions, we assume that the networks that are being produced are recognizing particular features of each digit type, but not necessarily recognizing every feature of a particular digit.

Figure 10:
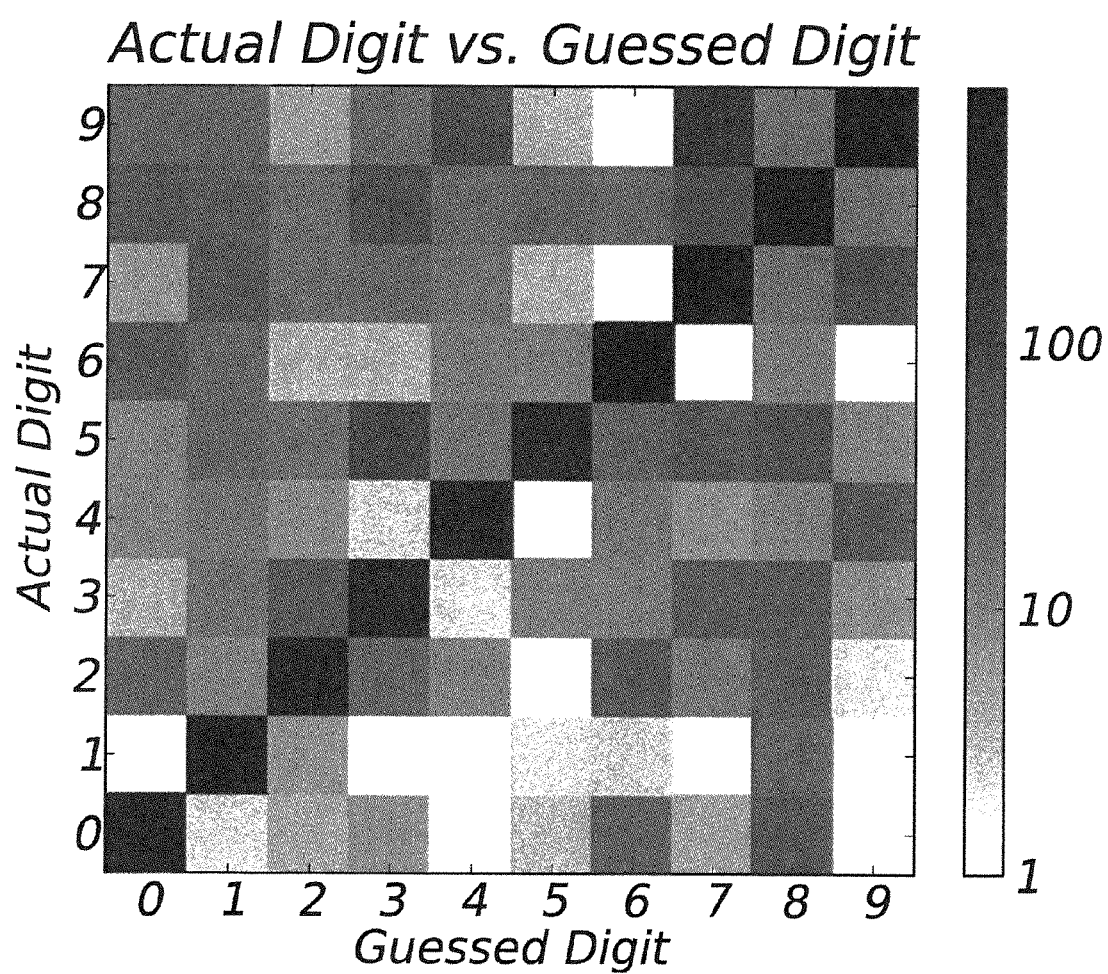
FIG. 10 shows classification results in gray scale for the first fitness function as actual digit versus guessed digit on a logarithmic scale of 1 to 100+ adapted from published color version, FIG. 2, of C. D. Schuman, J. D. Birdwell and M. E. Dean, "Spatiotemporal Classification Using Neuroscience-Inspired Dynamic Architectures," *Biologically Inspired Cognitive Architectures*, pp. 1-9, 2014, (hereinafter, BICA 2014).

The first fitness function produced an ensemble of networks that resulted in 83.7 percent accuracy on the testing set of handwritten digits. This results ensemble was made up of 600 networks, 20 for each digit for each scanning type. The accuracies for each scanning type were as follows: 72.1 percent accuracy by row, 79.6 percent accuracy by column, and 76.0 percent accuracy for both row and column. FIG. 10 shows the results for each digit type. This figure gives some insight as to how the networks are operating. For example, nines were often mis-classified as either fours or sevens, which we categorize as a valid mis-guess, as some nines may often appear very similar to fours or sevens. Similarly, threes are often mis-classified as fives or eights. Again, threes have many similar features as fives and eights, so the mis-guess makes sense within the construct of the problem. It also indicates that this fitness function may be inadvertently producing networks that recognize features, rather than the entire digit, so the second, more complex fitness function may not be required.

Figure 11:
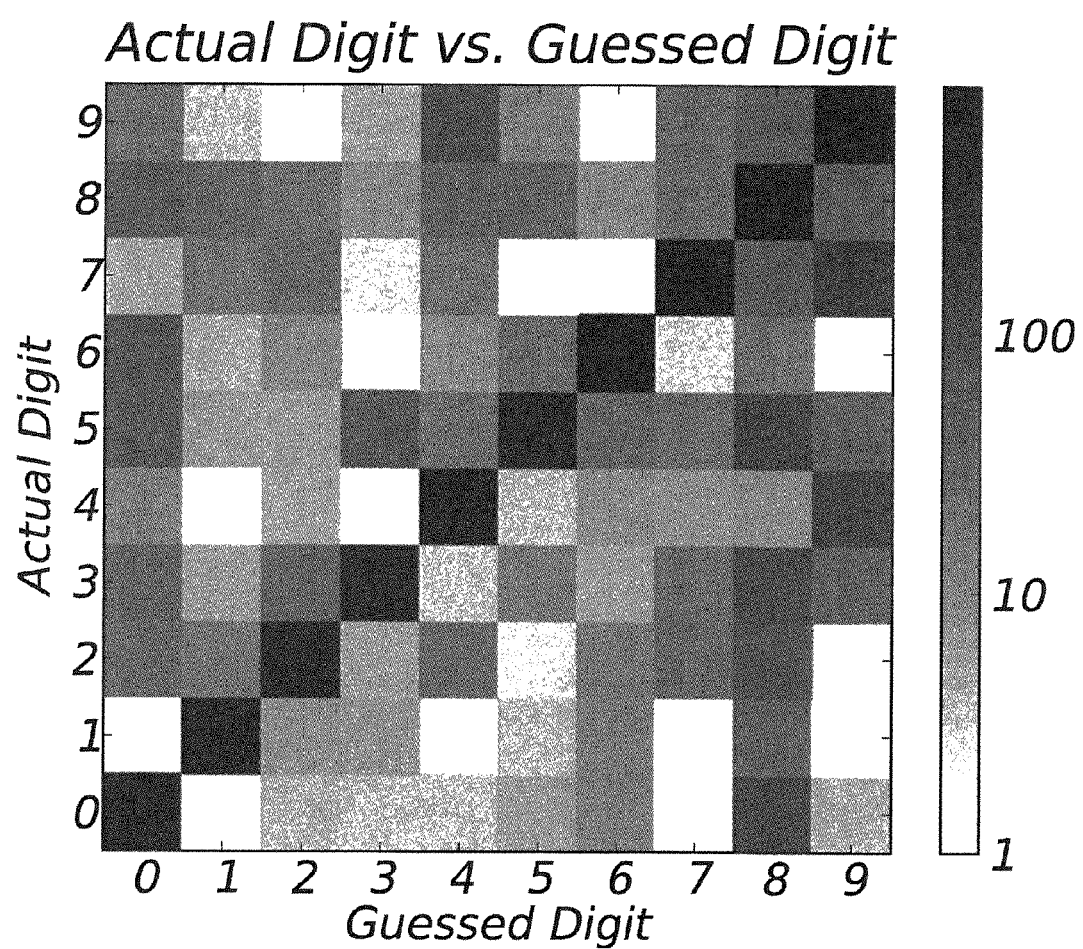
FIG. 11 shows classification results in gray scale for the second fitness function as actual digit versus guessed digit on a logarithmic scale of 1 to 100+ adapted from published color version, FIG. 3, of BICA 2014.
Figures 12A, 12B, 12C, 12D:
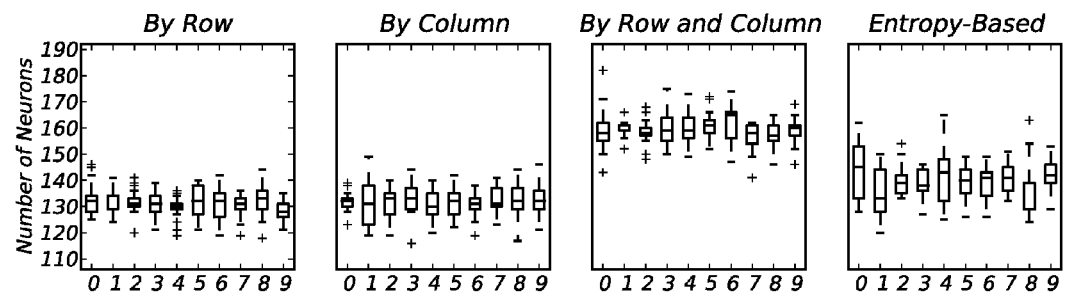
FIGS. 12A through 12H show box and whisker plots showing in a horizontal coordinate, numbers of neurons and numbers of synapses, across an X axis, the digit type from 0 to 9, and across the scale for 12A to 12D the scan type by row, by column, by row and column and entropy-based.
Figures 12E, 12F, 12G, 12H:
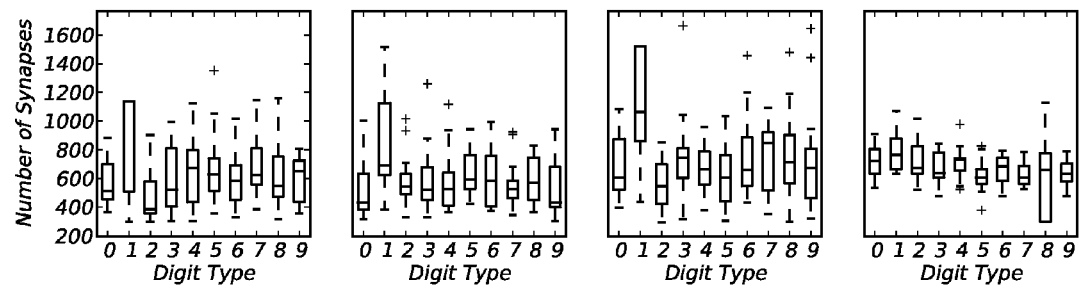

The second fitness function produced an ensemble of networks that results in 83.2 percent accuracy on the testing set. An important feature of the second fitness function is that it is just as likely to produce networks to recognize a particular digit type that fire when the image is not of that digit type. For example, if the network is supposed to recognize threes, this fitness function may produce networks that fire when an image is not of a three, rather than firing when recognizing a three. We tested each network's classification accuracy on the training set to determine if the network fired when recognizing the digit it was supposed to classify or if the network fired when it determined the current image was not the digit it was meant to recognize. The results ensemble was made up of 200 networks, 20 for each digit. For this fitness function, only networks scanning by column were produced, as those networks resulted in the best individual accuracy. FIG. 11 show the results for each digit type. Two anomalies occurred with the set of networks produced. Similar to the results for the first fitness function, sevens and fours were often mistaken for nines, and zeros, threes and fives were often mistaken for fives. Eights, lives, threes, and zeros share many features, such as a backwards C-like shape on the bottom. We are interested in this type of fitness approach because it admits the possibility of unsupervised learning, finding classifiers that efficiently segregate input streams into dissimilar collections, with the possibility of later using these networks as feature extractors in more complex classifiers or controllers.

We also combined both sets of ensembles to produce one large ensemble of 800 networks (80 for each digit type). This ensemble produced a testing classification accuracy of 87.1. The sizes of the networks for each digit type are shown in FIG. 12A through FIG. 12H. Most of the networks were very similar in size, with networks scanning both by row and column being larger in number of neurons. This inflation is mostly due to the fact that these networks had 56 input neurons rather than 28 as the other network types did. An interesting point to note about the sizes of the networks produced is that the networks that recognized ones had noticeably more synapses than other networks for those trained with the first fitness function. Classification of ones was also the most accurate of any digit for the ensemble of networks produced using the first fitness function (97.2 percent classified correctly). The second fitness function produces networks with more neurons than those scanning only by row or by column using the first fitness function, but the number of synapses was comparable.

Each of the networks produced by the first fitness function was generated in two hours and those produced by the second fitness function were generated in 24 hours. No pre-processing was done on the handwritten images. Pre-processing of images can also improve performance. These results are not yet comparable with the state-of-the-art results on classification of handwritten digits, which are available in [6], which have less than 1 percent error in classification of the testing set. However, many of the other methods used in solving this problem are tailored specifically for problems such as this one, whereas NIDA networks are meant to perform relatively well on a wide variety of problem types, including those with temporal components.

Referring now to FIGS. 13-22 and FIG. 26, apparatus and a method for visualizing events having been received at firing input neurons of an artificial neural network passing through so-called hidden neurons and synapses and being output at output neurons for actuating a display are described. The present visualization tool may be applied to biological neural networks, for example, to visualize involuntary spasm activity, (spiking that may be detected by electrodes placed on or near the surface of the cortex), a symptom of Parkinson's disease. Neural data may be collected from probes of, for example, biological neural networks. The input in the present example is most conveniently a hand-written numeral and an output may be a classification of the hand-written numeral as one of the digits of a decimal system 0-9.

Figure 26:
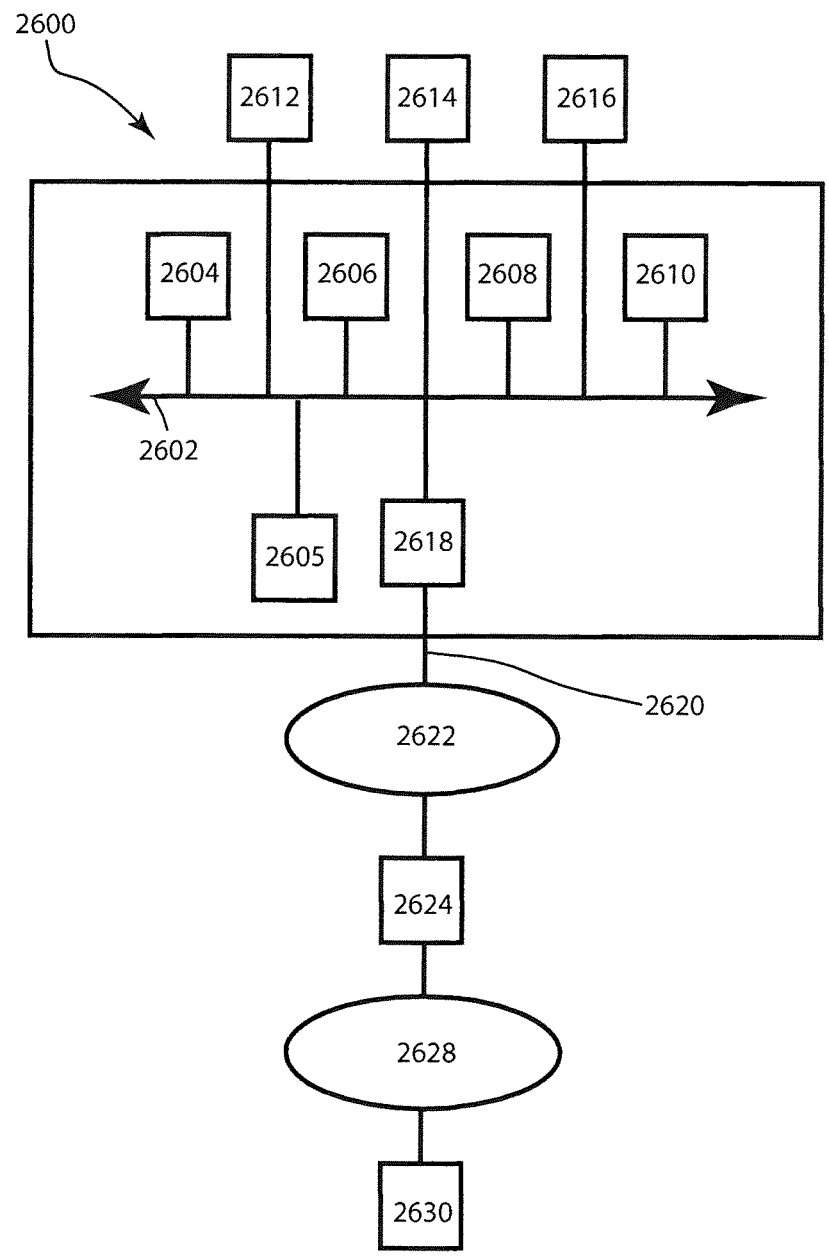
FIG. 26 is an overall schematic block diagram of a special purpose processor for executing an embodiment of the neural pathway visualization tool of the present invention.

Referring first to FIG. 26, there is shown an overall schematic block diagram of a special purpose computer processor system 2600 on which an embodiment of the visualization tool may be executed. FIG. 26 illustrates an overall system block diagram of a special purpose processor architecture and environment 2600 that may be used according to an illustrative embodiment of a NIDA and/or for controlling a DANNA, combination thereof or combination of substructures thereof for performing at least one of a control, detection and classification program application. The processor may comprise but not be limited to comprising a computer or an intelligent device such as a smart telephone, personal computer, server, client, or other processing device. The special purpose processor features a neural data collection and identification software application for receiving data from one or more various input devices (electrodes, camera, scanner, keyboard, touchscreen, analog to digital converters, modulators and other known input devices) and includes but is not limited to including a communications interface or interfaces, a program controlled computer and/or a computer bus and output devices such as human body implants, radio frequency data transmitters, computer displays, and other output devices known in the art.

Comparison of one or more neural network's performance against a desired performance or the behavior of a device or process may be done manually or automatically and may include learning in a learning environment prior to application, using special purpose or customized hardware or a separate computer or processor, or, according to a computer-implemented algorithm on a computer system 2600 according to FIG. 26. At least one input device receives a neural event or spike that may, for example, comprise an analog to digital converter or a modulator such as a modulator using pulse width modulation or another modulation method known in the art for encoding varying signals or sampled signal values as discrete or digital values or events, and, as appropriate, a neural event simulator or hardware device. Methods of a first embodiment and subsequent embodiments of a system 2600 may be utilized in connection with computer readable media which may be provided for temporary or permanent storage in a personal computer, an intelligent communications device or other computer or computer system 2600 comprising one or more parallel processors known in the art. Two or more computer systems 2600 may be employed to operate neural networks and implement interfaces between neural network simulations and their environments or operating neural networks in real time in a cooperative manner in order to address large-scale applications in the control, detection and classification arts. In this case, the two or more computer systems 2600 may communicate using communications devices within or attached to each computer system 2600 such as a network adapter, a radio transceiver, a cellular telephone or a device that interfaces to a packet-switched network or a telephone line. For real-time applications of control, detection and classification, computation speed is important, and communication and external processor delays may be preferably avoided.

FIG. 26 is a block schematic diagram that illustrates a computer system 2600 upon at least one embodiment of a NIDA, a DANNA, a substructure thereof or combination of any of these with other functioning neural networks known in the art. Computer system 2600 may include a bus 2602 or other communication mechanism for communicating information, and at least one device 2604 such as an input device that may be an analog to digital converter, at least one electrode, a modulator or an event data receiver coupled with the bus 2602 for receiving, processing and forwarding collected event data information for local use or remote transmission to a remote server. Other devices 2604 may comprise an are not limited to a camera, a GPS system, a scanner, an event simulator, an environmental data sensor, real-time of day and date stamping, interfaces to mammalian (human or otherwise) tissues including neural tissues or cells, muscular tissues or neuromuscular biological systems, robotic systems, location and movement sensing of a simulated human body, reporting devices and other known devices, for example, of a typical personal computer and/or medical devices for collecting data. Further such devices may comprise a computer, a graphics processor, a FPGA or another digital device having a configuration or program and simulating the behavior of a physical system such as a mechanical linkage, an engine, a compressor, a motor, a power generation system or a biological organism.

Computer system 2600 also includes a main memory 2606, such as a random access memory ("RAM") or other dynamic storage device, coupled to bus 2602 for storing information and instructions to be executed by controller processor 2605. Main memory 2606 also may be used for storing temporary variables, parameters or other intermediate information during execution of instructions to be executed by processor 2605 such as a neural network event data collection, image and identification software application or human identification software application. Memory may also be used as a communications medium or device to effect the transfer of information between computer system 2600 or its components and substructures such as another computer system 2600, a computer peripheral (for example, a keyboard, touchscreen, printer or display) or another type or category of processor such as devices within a supercomputer or implemented using a FPGA, a graphics processor or other device configured to operate as a neural network. Computer system 2600 may further include a read only memory ("ROM") 2608 or other static storage device coupled to bus 2602 for storing static information and instructions for processor 2605. A storage device 2610, such as a magnetic disk, optical disk, solid-state memory, or the like, may be provided and coupled to bus 2602 for storing neural event information, neuron and neural network image or visualization data and computer command data and instructions. Such stored information may optionally be modified by the execution of a stored program on a processor 2605 in computer system 2600 or located in another system or device. For example, such stored information may be accessible to other computer processors, devices or peripherals via a direct memory access (DMA) protocol and hardware or by using a communications channel. A storage device or any device coupled to the bus 2602 may be removable using a coupling mechanism such as a universal serial bus (USB) or other hardware specific to the type of storage hardware, such as a CompactFlash, SD or microSD card reader or p[ort (or the port may be local such as a wireless LAN). A removable storage device may be utilized to transfer information to or from computer system/intelligent device 2600. Information may also be transferred using a computer network or other communications network. Any of memories 2606, 2608, 2610 may retain program instructions according to any embodiment of data collection software and analysis hypothetically related to a simulated or real neural network, for collecting measurement data from, for example, a chemical, electrical, environmental, energy, vehicle system or transportation system or infrastructure. Measurement data may be collected in the form of events, as in, for example, events that correspond to the transmission of packets of data in a communications or communication network or through a communications device such as a network switch or amplifier.

Computer system 2600 may optionally be coupled via bus 2602 to a display 2612, such as a cathode ray tube ("CRT"), liquid crystal display ("LCD"), plasma display, television, small intelligent mobile telephone display or the like, for displaying information about the neural network and its modification from program execution or command instructions from the neural team or predetermined command instructions to a trained computer user. Display 2612 may provide a virtual keyboard for data input, a real keyboard (touchscreen), a joystick, a mouse and selector, a neural network reader or a one or two dimensional bar code reader via a camera or a touch screen. Display 2612 may provide a screen image comprising a whole or portion of a neural network configuration, optionally including at least one input neuron, an output neuron, neurons connected between input and output neurons by synapses and a visual representation of the structure of the neural network, for example, by displaying icons representing neurons and lines or arcs, with or without arrows or other designations indicating directions and coloring or shading or dash/dotted lines indicating activities or portions of the neural network. The screen image in one embodiment may be split to display multiple views, including, for example, a display of a neural network configuration or status and a visual camera image section for showing the environment of the control, detection or classification application. There may be a section of the image providing an ordered command set selectable for different possible neural stimulation events, showing a causality path, tracing a neural pathway from a particular input neuron and a display of information about an external or monitored process.

Alternatively, displayable information may be delivered to or collected from a computer user or another computer system or computer program using a communication interface 2618 or removable storage device. Communications interface 2618 can function as an interface between computer system 2600 and additional devices for collection of information, such as a neural stimulator for simulated senses, one or more affective systems, a neural probe for receiving electrical or magnetic signals corresponding to neural events in living tissue. The analog to digital converter, modulator or other devices 2604 as are well-known in the field in addition to a neural network event input device. Devices 2604 can include a digital to analog converter or a demodulator or a relay or other device capable of responding to events generated by a neural network during its simulation or real-time activity to affect an output of information to another device or system.

Communication interface 2618 can enable communication using wires, wireless methods (e.g. Bluetooth or WiFi), optical fiber, infrared light-emitting diode and photo reception, carrier wave, electromagnetic waveform or other technologies known in the art. There may be more than one communication interface 2618 (for example, satellite and land-based RF). An input device 2614, which may include a physical or virtual keyboard including alphanumeric and other keys, may be coupled to bus 2602 for communicating information and command selections to processor 2605 and for storage in memory. An optional type of user input device is cursor control 2616, such as a mouse, trackball, stylus, or cursor direction keys, for example, as may be found on some personal data assistants (PDA's) for communicating direction information and command selections to processor 2605 and for controlling cursor movement or the display on display 2612. The input device typically has two degrees of freedom in two axes, a first axis (e.g., x) and a second axis (e.g., y), that allows the device to specify positions in a plane. This input device may be combined with a display device such as a LCD with a touch screen, commonly found on mobile telephones or other telecommunications or presentation devices such as the Apple iPad or a computer tablet using the Android operating system. Alternatively, information and command selections may be communicated to processor 2605 using a communication interface 2618. Optionally, separate communication interfaces (for example, a WLAN) may be used to deliver information to a computer user or another computer system 2600 or computer program, and to communicate information and command selections to processor 2605.

The invention is related to the use of computer system 2600 for local and remote and automated neural network support with respect to a particular neural event or collection of sequential events. Such neural event data may be read into main memory 2606 from another computer-readable medium, such as storage device 2610 or via a keyboard. Execution of the sequences of instructions contained in main memory 2606 causes processor 2605 to perform the process steps described herein. In alternative embodiments, hard-wired circuitry may be used in place of or in combination with software instructions to implement the invention. For example, a field-programmable gate array (FPGA), VLSI or application-specific integrated circuit (ASIC) may be used. Such a device can, for example, implement associative memory to aid in indexing, search, and retrieval of neural network information or substructure or component information stored in memory or a database or library thereof to, for example, identify an event and provide a response. Thus, embodiments of the invention are not limited to any specific combination of hardware circuitry, computer systems 2600 and software. For example, one processor 2605 may be a control processor and optionally implement an evolutionary optimization algorithm and another processor 2605 may implement one or more neural networks (NIDA's or substructures thereof or related neural networks such as a DANNA) and include interfaces to and form a process, device or neural network for one of a control, anomaly detection and classification application.

The term "computer-readable medium" as used herein refers to any medium that participates in providing instructions to processor 2605 for execution or for storing information in a form that can be accessed by a processor. Such a medium may take many forms, including but not limited to, non-volatile media, volatile media, and transmission media. Non-volatile media includes, for example, optical or magnetic disks, solid state memories, and the like, such as storage device 2610. Volatile media includes dynamic memory, such as main memory 2606. Such a medium is non-transitory, i.e., it is intended to store data and computer instructions and does not output data to transmission media unless requested. Transmission media includes coaxial cables, copper wire and fiber optics and antennae. Transmission media can also take the form of acoustic or light waves, such as those generated during satellite and land-based radio wave and telecommunications data communications.

Common forms of computer-readable media include, for example, a floppy disk, a flexible disk, hard disk, magnetic tape, or any other magnetic medium, a CD-ROM, any other optical medium, solid-state memory, punch cards, paper tape, any other physical medium with patterns of holes, a RAM, a PROM, and EPROM, a FLASH-EPROM, any other memory chip or cartridge, a carrier wave, or any other medium from which a computer, controller or processor can read. Various forms of computer readable media may be involved in outputting one or more sequences of one or more instructions to processor 2605 for execution.

Computer system 2600 may include one or more communication interfaces 2618 coupled to bus 2602. Communication interface 2618 provides a two-way data communication coupling to a network link 2620 that may be preferably connected, for example, to a local area hospital network, a manufacturing site network or a chemical or energy process measurement network 2622 for one of control, anomaly detection or classification. The network 2622 may be used to affect the control of or take other automated actions within the hospital, manufacturing site network, chemical or energy process or other systems, sites or processes with similar networked communications infrastructure. For example, communication interface 2618 may be an integrated services digital network ("ISDN") or digital subscriber line (DSL) card or a modem to provide a data communication connection to a corresponding type of telephone line or wireless link. Preferably, communications transmitted over such a link are encrypted or otherwise protected according to known encryption schemes and/or watermarking algorithms to uniquely identify a source, for example, of a neural network event capture device or camera or scanner or neural network imager or graph or other input source. As another example, communication interface 2618 may be a network card (e.g., an Ethernet card) to provide a data communication connection to a compatible local area network ("LAN") or wide area network ("WAN"), such as the Internet or a private network. Wireless links may also be implemented in an example of running neural event simulation algorithms for improving an artificial neural network via an intelligent telecommunication device using, for example. WiFi, Bluetooth, or third generation (3G) or fourth generation (4G) wireless technologies such as WiMax or LTE. In any such implementation, communication interface 2618 sends and receives electrical, electromagnetic or optical signals that carry digital data streams representing various types of information between an artificial or real neural network and a neural event data collection device (such as an analog to digital converter). For example, a neural event may require a data communication connection to an information database comprising, for example, an artificial neural network for performing control, anomaly detection or classification, substructure thereof, component or a real neural network of millions of neurons. Portions of the computations associated with the collection and identification of neural event data and improvement of the artificial neural network through learning, the use of affective systems and evolutionary optimization as described herein may be distributed across multiple computer systems 2600 which may communicate using one or more communication interfaces 718.

Network link 2620 typically provides data communication through one or more networks to other data devices. For example, network link 2620 may provide a connection through local network 2622 to a host computer 2624 or hospital server or manufacturing site, chemical or energy process or other systems, sites or processes or to data equipment operated by an Internet Service Provider or private network service provider ("ISP"). Such a service provider may operate in a "cloud" computing environment such that it is a web accessible service for, for example, an artificial neural network. The "cloud" may provide a NIDA for one of control, anomaly detection or classification or a component such as a visualization tool. An ISP in turn provides data communication services through a packet data communication network such as the worldwide network commonly referred to as the "Internet" 2628, an extranet, an intranet or other private or public network. An example of a private network is a secure data network used for transmission of information, commands and data. Local network 2622 and Internet 2628 both use electrical, electromagnetic or optical signals that carry digital data streams. The signals through the various networks and the signals on network link 2620 and through communication interface 2618, which carry the digital data to and from computer system 2600, are exemplary forms of carrier waves transporting the information.

Computer system 2600 can send messages, commands and receive messages, commands and data, including program code, through the network(s), network link 2620 and communication interface 2618. In the Internet example, a server 2630 might transmit a requested code for an application program through Internet 2628, host computer 2624, local network 2622 and communication interface 2618 to a local intelligent device and apparatus.

Server 2630 may have associated clients, not shown, for assessment, analysis, artificial neural network control, and retrieval of stored simulated or real neural events and networks or substructures or components.

The received code may be executed by processor 2605 as it is received, and/or stored in storage device 2610, or other tangible computer-readable medium (e.g., non-volatile storage) for later execution. In this manner, computer system 2600 may obtain application code and/or data in the form of an intangible computer-readable medium such as via a carrier wave, modulated data signal, or other propagated signal. Special purpose hardware or hardware combined with a computer processor and memory may be configures and used to assess the performance of the neural network or the computer system 2600. Device 2630 may comprise an identical or very similar range of components as system 2600 located at a remote site. For example, display screen 2612 of a remote site or local intelligent device 2600 may be a screen split into four (or more) or comprise four (or more) different screens or components. A similar screen may be associated with device 2630 not shown (device 2620 may have keyboard entry, a camera, a scanner, a neural probe, an analog to digital converter, a modulator, a memory of various types and the like connected by a bus). The screen 2612 on either system 2600 or device 2630 may show views from input device 2604, a section showing commands displayed at either end and views and data inputs from other data collection devices coupled to a console of system 2600 which may be remotely operable by neural network operators.

Computer system 2600 can be configured using the methods of this invention to provide services across a network or via a so-called cloud of servers to personnel or automated systems having client computers or intelligent telecommunications devices capable of connection to a network or other communication interface. These services can also be provided to other software, located in either computer system 2600, the cloud or a separate computer system such as a remote server or a cloud service connected by a network, network link, or communication interface to computer system 2600. The services can be protected using methods of authentication and/or encryption that are known in the fields of computer science and computer security in order to ensure data are neither compromised nor disclosed and to trace all accesses to the data. The computer system 2600 and other associated information storage and communication components can be protected using devices and methods that are known in the fields of computer science and computer security, such as with firewalls, physical access controls, power conditioning equipment, and backup or redundant power sources. The protection devices and methods, embodied as hardware, software or a combination of hardware and software, may be incorporated in computer system 2600 or exist as separate components typically connected by a network or other communications hardware. The information stored by computer system 2600 and computer-readable media can be further protected using backup or redundant information storage systems, such as those that are well-known in the art. Examples include tape storage systems and RAID storage arrays.

Neuroscience-inspired dynamic architecture (NIDA) (or DANNA) networks can be viewed as graphs representing the interconnections among two types of components: neurons (nodes) and synapses (edges). Neurons may have two parameters (threshold and refractory period) and exist in a bounded three-dimensional space. They accumulate charge or lose charge from a neutral state and fire when the charge exceeds the threshold; upon firing, neurons enter a refractory period, during which they may still accumulate charge but may not fire, even if the charge exceeds the threshold. Input neurons receive information from the environment, output neurons send information to the environment, and hidden neurons do not interact with the environment. Our synapses are directed connections between two neurons and carry charge from one neuron to another. In this sense, the synapses of a NIDA correspond to the axons and synapses in a biological network. Synapses are defined by two parameters: delay and weight. Delay is governed by the length of the synapse (distance between the two neurons the synapse connects) and determines how long it takes for a fire event at the sending neuron of the synapse to affect the charge of the neuron at the receiving end of the synapse. The weight of the synapse determines how much the synapse charge increases or decreases at the destination neuron. (We note that this architecture is generalized in the DANNA hardware implementation.)

Unlike many traditional artificial neural networks, the operation of the network is governed by a discrete-event simulation, where event types include fire events in neurons and change in charge events in synapses. One simulated time unit in the discrete-event simulation corresponds to the time it takes for charge to travel one distance unit in the network.

NIDA (and DANNA) networks may be designed for a particular task using evolutionary optimization. The design process determines the structure of the network (the number and placement of the neurons and synapses), the parameters of the network (such as the thresholds of the neurons and the weights of the synapses), and the dynamics of the network (the delays of the synapses). We note advantages and some disadvantages to the use of evolutionary optimization to design NIDA networks (and networks in general). It is important to note that many of the network structures produced by evolutionary optimization may have equivalent behavior. A superficial example of this is that the same network rotated or translated in the three-dimensional space will behave exactly the same way as the original network. However, because of the varying parameter values, there are many other structures that are not as easily recognizable as equivalent that may still behave very similarly. This is one reason a visualization tool to explore the behavior of NIDA (or DANNA) networks is important.

In order to examine the behavior of the NIDA networks, NIDA was applied to create a three dimensional (3D) network model as a special purpose software embodiment that may be executed on the special purpose processor of FIG. 26. Special purpose processing was used to represent the structure of a given special purpose network to scale (for example, in the classification arts). Visualization of spatial information is particularly important for NIDA (or DANNA) networks, since their structures are not pro-defined, but rather evolve over generations to better suit the given task (for example, control, anomaly detection and classification). An embodiment of a special purpose visualization tool of the present invention supports zoom and rotate so that the user can efficiently observe and explore the entire network or substructures within it. Neurons are preferably represented as spheres, all of the same size, while different colors may be used to differentiate between input, hidden, and output neurons. Colors may be chosen to be the same or time-varying. Alternatively, size, shape, or other distinguishing features of the visual representation of the neuron can be used in place of color. Synapses may be depicted as lines between neurons with cones (arrow heads), for example, at the output end to indicate direction of the synapse. Shading or variation in visual line thickness over time could also be used to indicate direction. Synapse color differences may encode positive versus negative weight, and stroke weight represents magnitudes of synapse weight (discretized to one-pixel increments). Multiple color schemes are available to suit various media. Two modes of operation, interactive and image rendering for video, allow a user to either interactively examine the network throughout the simulation or define preset interactions to be rendered for high frame rate videos and visualize development of neural pathways of a special purpose network over time.

Animated highlighting of activity and modifiable visibility modes leverage pre-attentive processing to facilitate the identification of patterns in network behavior. One visualization tool embodiment simulates the activity of a network on a specified input by highlighting elements in a contrasting color as events occur on them. During the event time window, the size of an element (neuron radius or synapse stroke weight) may increase for further emphasis. A clock displays runtime (in network time units) throughout the simulation, and the user may interact with the simulation using play (run), pause, and clock reset buttons. Alternatively, a time line may be used and/or displayed. Time unit duration is preferably adjustable so that the user can shift from an overview of network activity to a finer-grained examination. Detail views within the visualization may also depict charge propagation along each unit of the synapse using, for example, highlighted spheres that are smaller in size than the spheres representing neurons. When visualization of charge propagation is enabled, a longer time unit duration (for example, at least 100 ms per time unit) is enforced so that the visualization is comprehensible.

Three visibility modes—invisible, "ghost" (FIG. 14) and full visibility—allow the user to eliminate visual clutter and draw attention to elements of interest. Invisible elements may not be rendered at all, for example, to reduce clutter and expose neural pathways of interest. Ghost elements are rendered at an opacity of 20% and fully visible elements are rendered with 100% opacity. Other opacities can be used for a ghost feature, and it is possible to provide user interface elements to allow the user to adjust visualization parameters such as opacity, color scheme, and visual simulation rate. In one embodiment of the special purpose visualization tool, the user may adjust the default visibility of elements (visibility at the beginning of a simulation) to any of the three modes. The simulation may be set to retain the default visualization mode for all elements throughout the simulation, to set elements to be invisible if they are not active within the simulation timeframe, or to transition the elements from default to full visibility as they become active ("visibility upon activity"). In other embodiments of the visualization tool, the tool may allow users to toggle visibility of any element at any point during a simulation.

Figure 13:
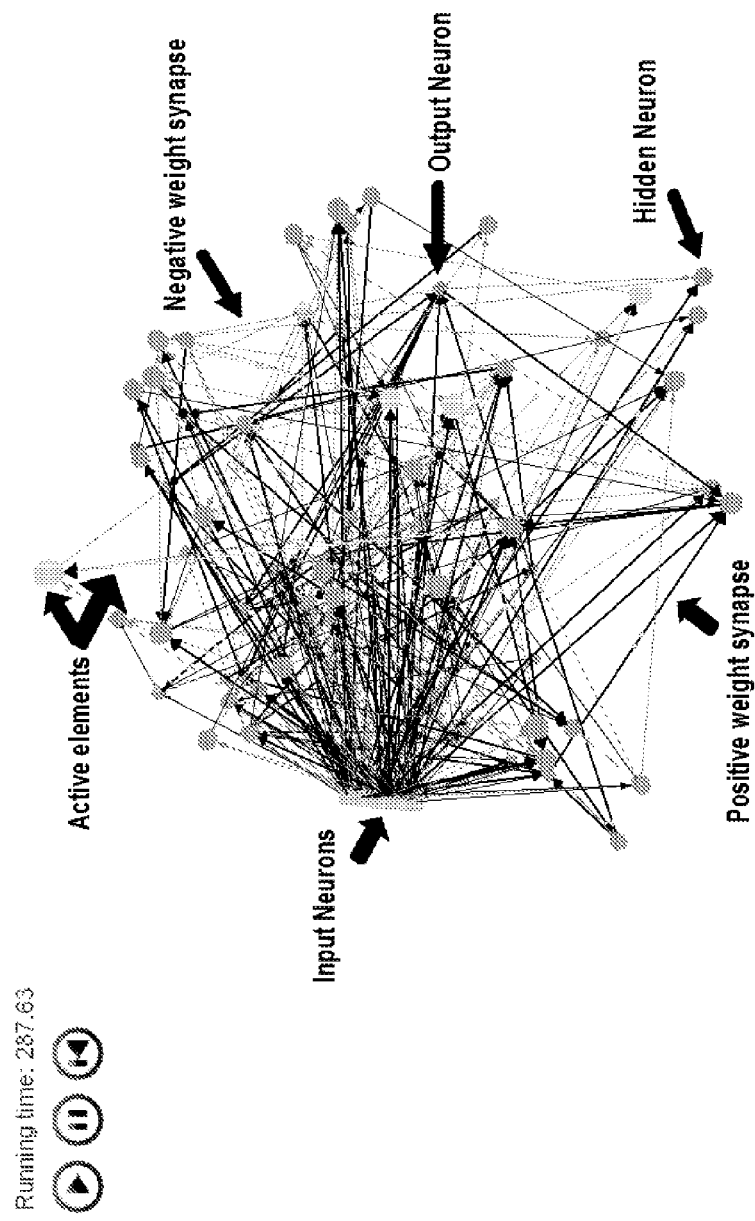
FIG. 13 is an example in gray scale of a NIDA network using visualization at running time 287 where input neurons have been actuated and active paths are shown through a network to an output neuron where the input is a scan of a hand-written numeral 7 adapted from a color copy found as FIG. 1 in Drouhard, Margaret, Catherine D. Schuman, J. Douglas Birdwell, and Mark E. Dean. "Visual Analytics for Neuroscience-Inspired Dynamic Architectures," *IEEE Symposium Series on Computational Intelligence*, 2014, (hereinafter, IEEE 2014).

Some of the features available in a simulation are depicted in FIG. 13. The runtime (in simulation time units) and buttons for interactivity are at the top left-hand corner of the image in this view, and the view of the artificial neural network at a given point in time absorbs the center of the screen. Other locations for user controls may be utilized. The distinctions between different types of synapses and neurons are more readily apparent in color but are shown in gray scale. The elements have been labeled for ease of identification. A column of, for example, green spheres at the left side of the network (shown in gray scale) are the input neurons, and the single orange sphere at the far right of the network (shown in gray scale) is the output neuron. The hidden neurons may be teal-colored spheres between the input and output neurons (shown in gray scale). Positive weighted synapses are lines that may be colored blue, while negative weighted synapses may be in red-orange. The colors chosen are optional but, preferably, no two colors are used for the same feature. The active elements (a neuron and synapse indicated) may be labeled or other known means may be used to differentiate elements such as dotted lines, dashed lines of varying size, dash/dotted lines and the like.

Figure 14:
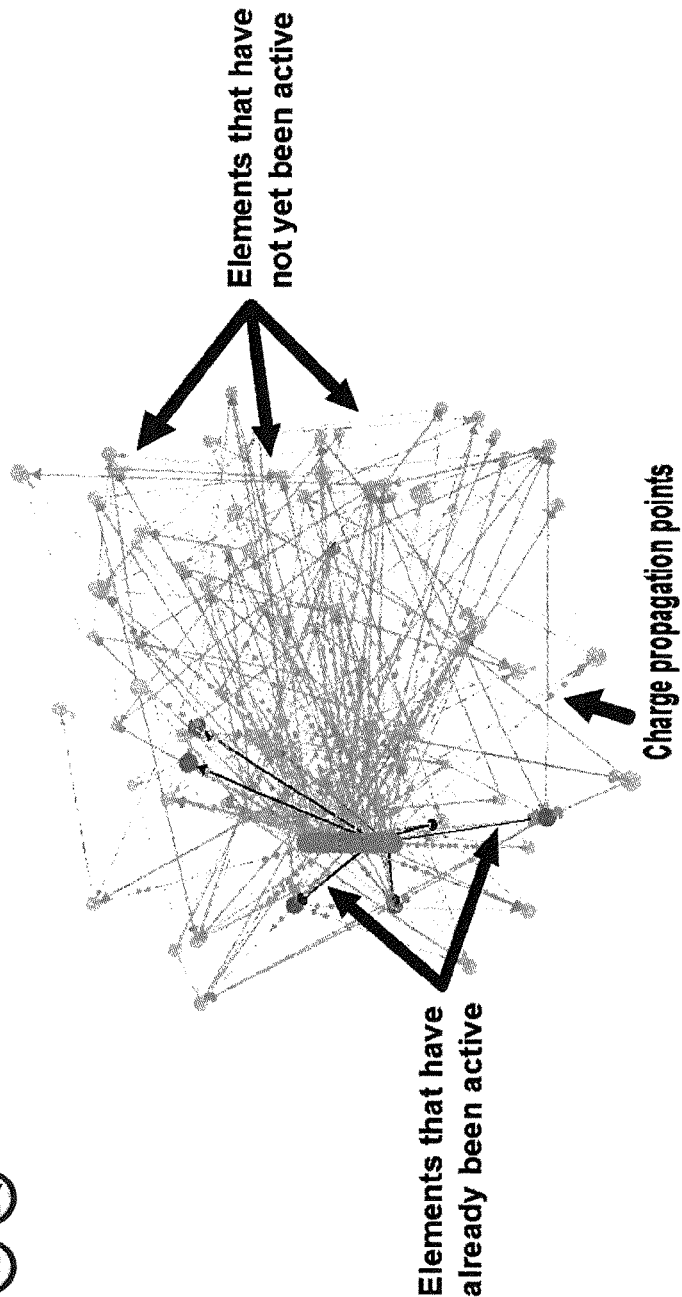
FIG. 14 is an example network in gray scale set to use visibility upon activity with a default visibility of ghost as discussed herein for all elements and running time is 118 adapted from a color copy found as FIG. 2 in IEEE 2014.
Figure 15:
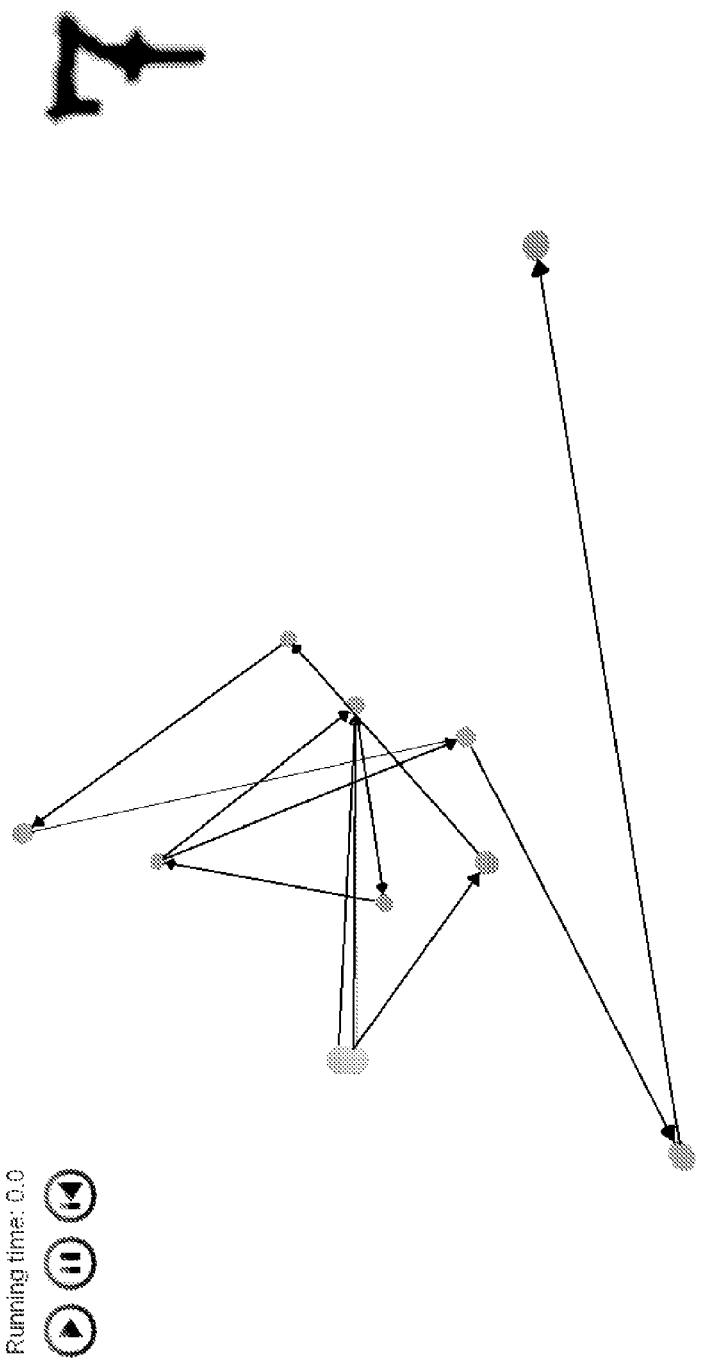
FIG. 15 is a gray scale example of extracting a path from the activity of a network trained to recognize the handwritten digit 7, the path being traced back to input pulses from the firing of the output neuron at run time 0 adapted from a color copy found as FIG. 3 in IEEE 2014.

Other visibility settings are shown in FIG. 14. This simulation has a default visibility of "ghost" for hidden neurons and synapses, so the full opacity lines and teal spheres (shown in gray scale) represent network elements that have already been active during the simulation—synapses that have transferred charge to neurons and neurons that have fired. The lines and spheres with, for example, 20% opacity depict elements that have not yet been active during the simulation. Elements highlighted in bright yellow (shown in gray-scale) are those that are active at the current time step—synapses at the point when the charge they have transferred reaches the receiving neuron and neurons currently firing. The smaller yellow highlighted spheres along various synapses (shown in gray scale) may stand for the points of charge propagation along the given synapses. Each charge propagation point results from a distinct event, the firing of the neuron from which the synapse originates. Should the charge propagate to the receiving neuron within the timeframe of the simulation, it will effect a unique event of addition or reduction of charge in the receiving neuron. For consistency, all network figures in this embodiment use the same color scheme but other color schemes may be used in other embodiments, and as described above, labels may be used, dashed lines, dotted line and dashed/dotted lines and other known means may be used to distinguish elements and neural pathways. In the Brief Description of the Invention, references are given for locating color copies of the gray scale drawings (incorporated by reference as to their entirety).

Figure 1:
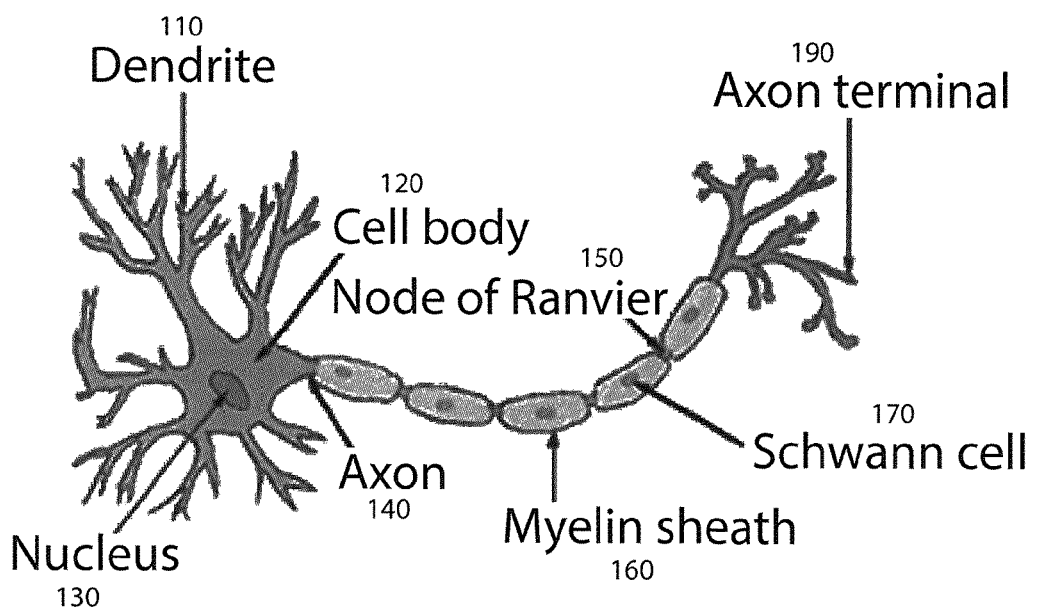
FIG. 1 is a prior art diagram showing selected features of a typical neuron and its components.
Figure 2:
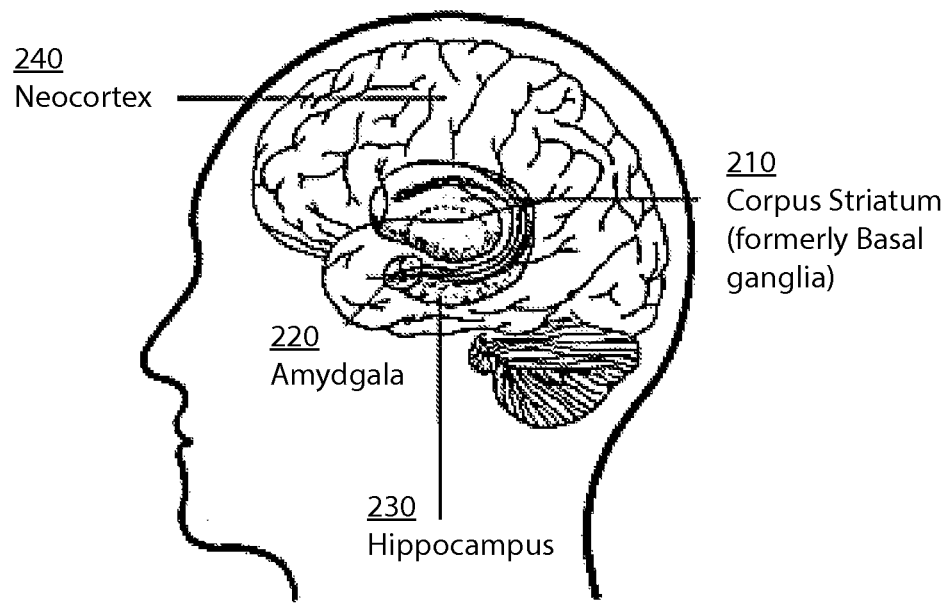
FIG. 2 is a prior art diagram of the human brain and some of its components.
Figure 3:
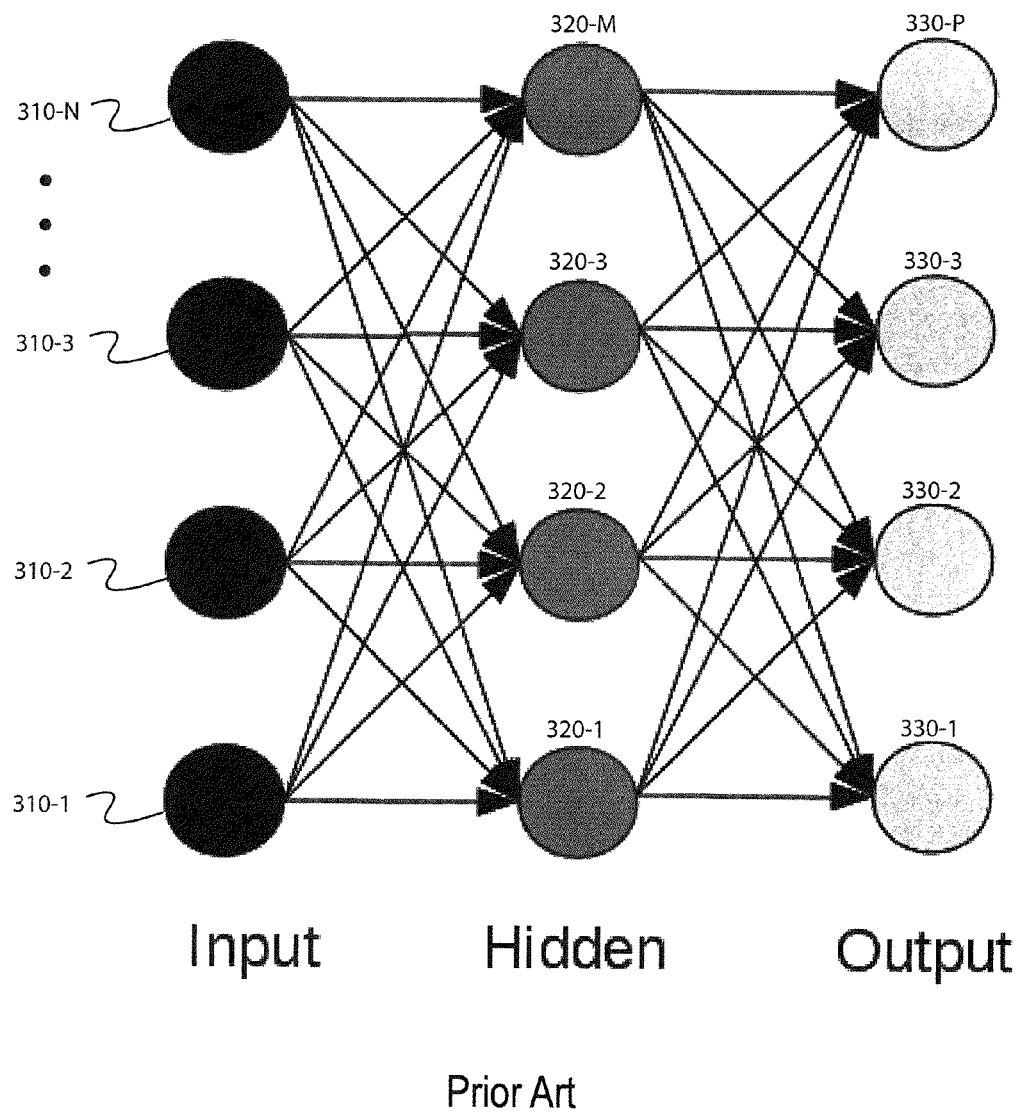
FIG. 3 is a prior art representation of a fully-connected feed-forward neural network showing input neurons, so-called hidden neurons and output neurons.
Figure 4:
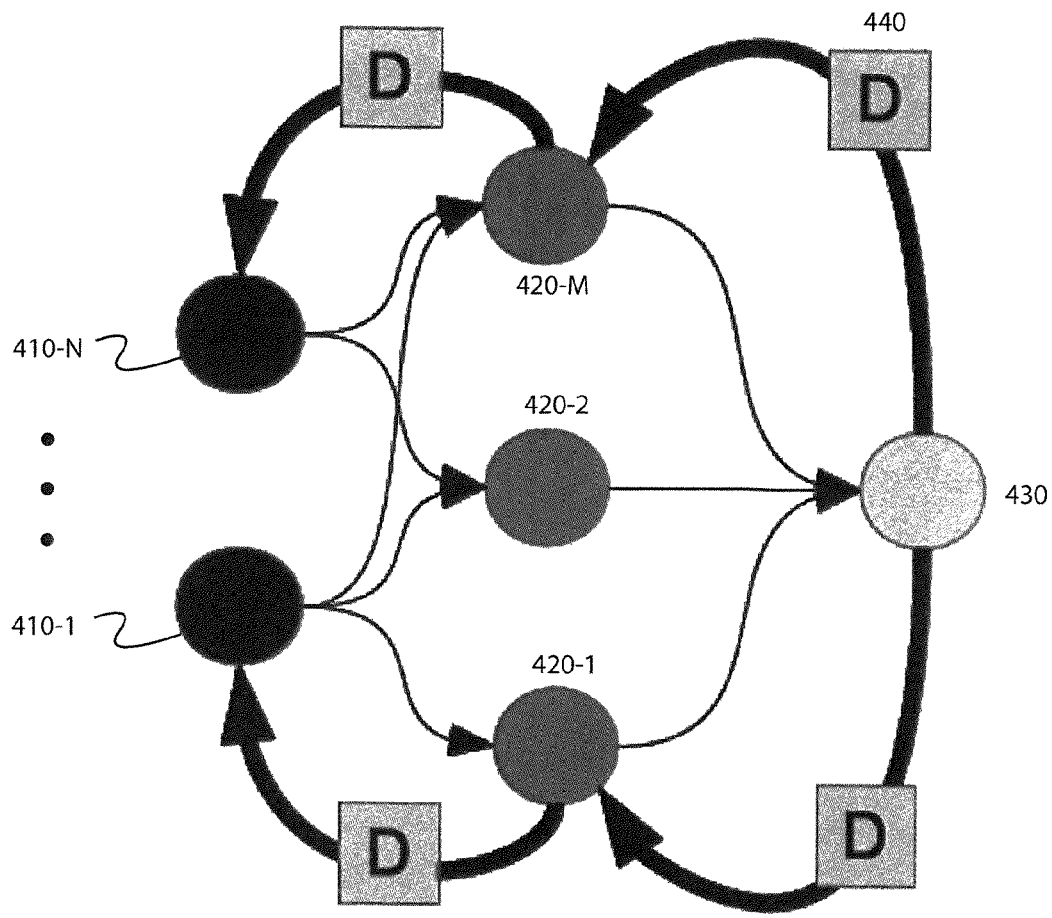
FIG. 4 is a prior art representation of a recurrent neural network with input neurons, hidden neurons and output neurons, the representation having delay elements labeled D.

In addition to animating all of the activity of the network on a given input, the visualization tool has an alternate mode that allows for the isolated viewing of specific events and the activity that leads to them. This mode requires the compilation of detailed event summaries for each element (neuron and synapse) on the network. Such event summaries, for example, for a specific problem, may be stored in one or more memory files, memory areas or databases for comparison with event summaries of similar networks, comparisons or contrasts of behavior using the same network and across multiple scenarios and/or multiple networks. An event summary consists of every event e that occurs on a given element, along with other events throughout the simulation that contribute to the occurrence of e and those events triggered in part by e. For example, a neuron fire f is defined as being affected (and eventually triggered) by every synapse charge event that reaches it after the previous firing and before the occurrence of f. A synapse charge event is defined as a single event that incorporates delay by virtue of the synapse's length. Synapse charge events are caused by the firing of the neuron from which the synapse emanates and affect the subsequent firing (or absence of firing) of the neuron to which the synapse connects. Using the event summaries created, we are able to create timelines of causes and effects for each event e. We can also visually trace from e back to the initial input neuron pulse(s) that trigger(s) them or forward through all of the events to which e contributes during the simulation timeframe. This functionality enables the user to identify portions of the network's structure that participate in computations leading to a particular outcome, as well as portions of the network's structure that are affected by a particular event. It also enables comparison or contrast across multiple networks and/or network input events, types or classes. A sample path extracted from a network is shown in FIG. 3.

Figure 16:
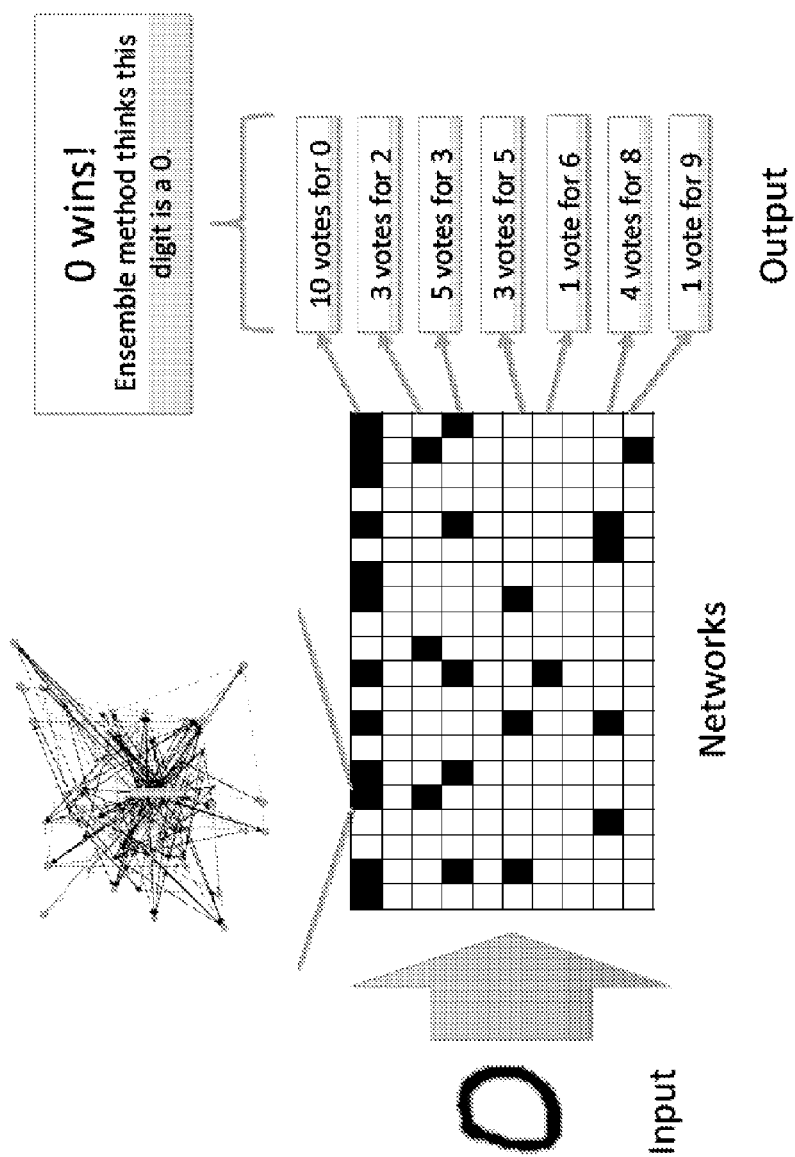
FIG. 16 shows exemplary utilization of a voting scheme for a scan of a handwritten digit 0 via an artificial neural network in gray scale showing that, of digits 0-9, 0 receives ten votes and the closest runner-up is 3 with five votes adapted from a color copy found as FIG. 4 in IEEE 2014.

The NIDA networks appearing in this section of a discussion of the present visualization tool were designed as part of an ensemble method used in the classification of handwritten digits described above with reference to FIGS. 9-12. Each network is designed (using evolutionary optimization) to identify a particular digit d by firing its output neuron in a pre-defined time window (the last 50 time steps of a 500 time step simulation: other timings can be used) if the image is of the digit d and not firing in that time window if the image is of a digit other than d. The fitness function may be described in more detail above and in the NIDA patent application incorporated by reference herein. Each network may have 28 input neurons (for 28 pixel row or column scanning) and one output neuron. Each image of a handwritten digit is 28 by 28 pixels. The NIDA networks "scan" the image, receiving one row or one column (or in a 56 input neuron embodiment one row and one column) at a time. Each network in the ensemble receives each image as input. If the output neuron of a network associated with digit d fires during the last 50 times steps of simulation, that network "casts a vote" for digit d for that image. The digit receiving the most votes is the decision of the ensemble (see, for example, voting scheme FIG. 16). In FIG. 16, each network in the ensemble of networks is represented by a square on the grid. Each network for digits 0-9 receives an image on input and simulates activity within the representative network. Based on that activity, the network may or may not cast a vote in favor of a given digit. Casting a vote is represented by shading in a square in the grid. The digit with the most votes is the guessed digit for the ensemble. The evolutionary optimization may produce a single special purpose network that may be trained to recognize a particular digit on a set of training images and then applied to classify real world images. Based on the performance of all resulting networks on the training images, the top ranking networks for each digit are assembled to produce the ensemble. For example, an ensemble of 800 networks produced a classification accuracy of 87 percent on the testing set of images (real world images that were not used during training).

Figure 17:
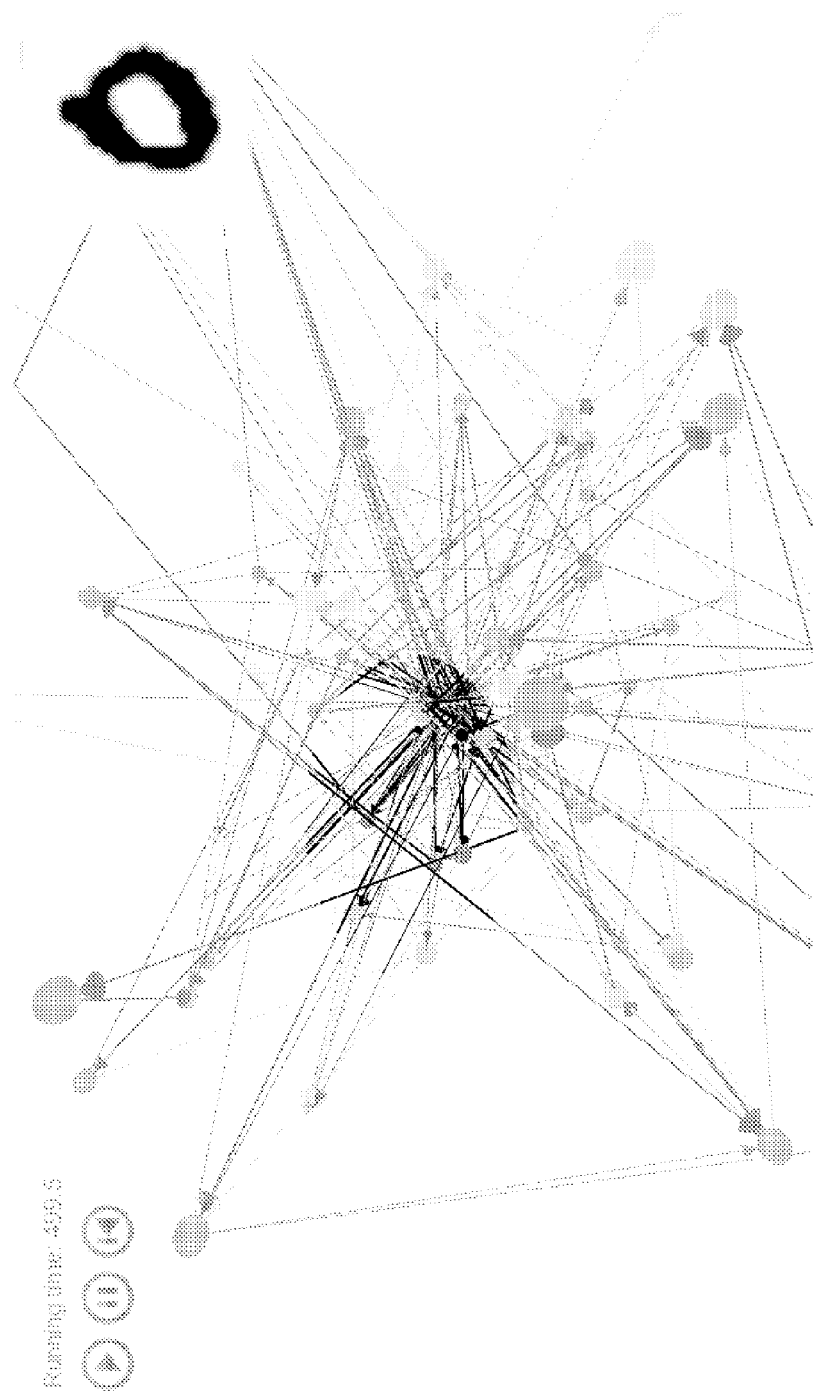
FIG. 17 shows a three-neuron substructure highlighted within a network shown in gray scale trained to recognize the digit 0.
Figure 17E:
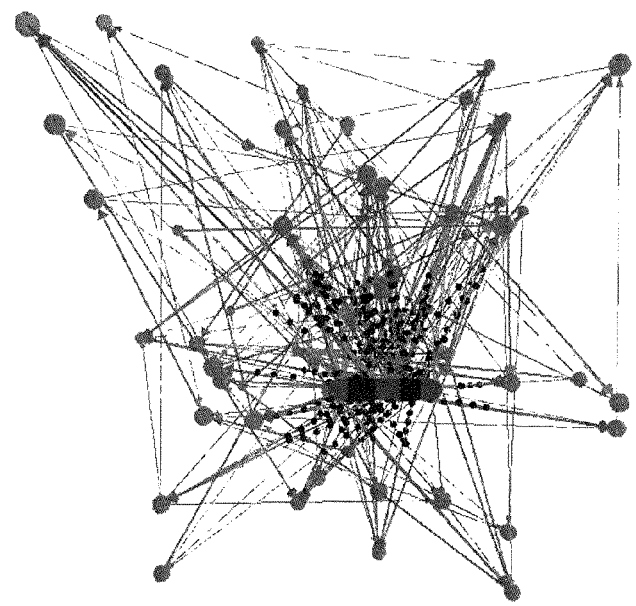
FIGS. 17A-17Z show a sequence of gray scale images showing a progression in time from initial stimulus to time 480 adapted from a color copy found as FIG. 5 in IEEE 2014.
Figure 17N:
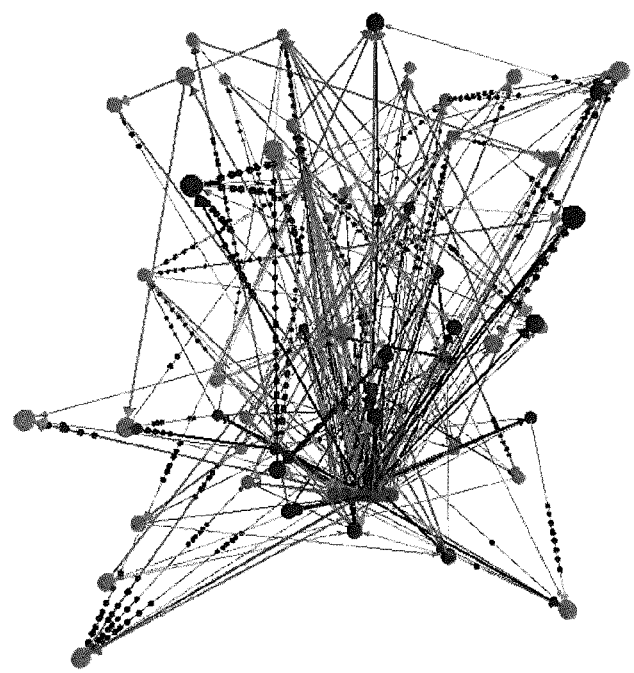
Figure 17U:
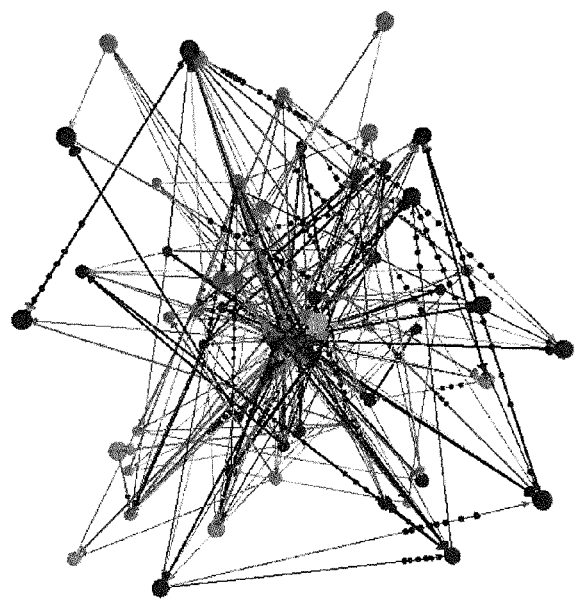
Figure 17Z:
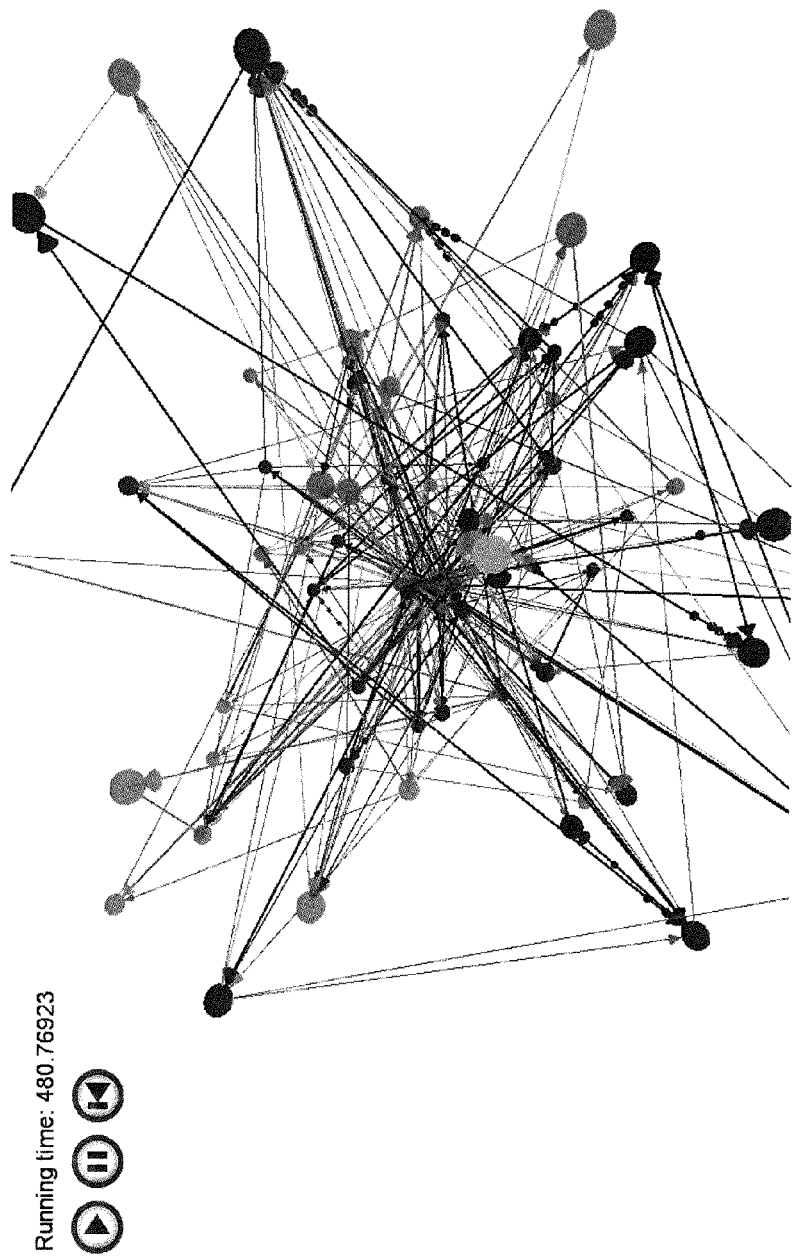
Figure 18:
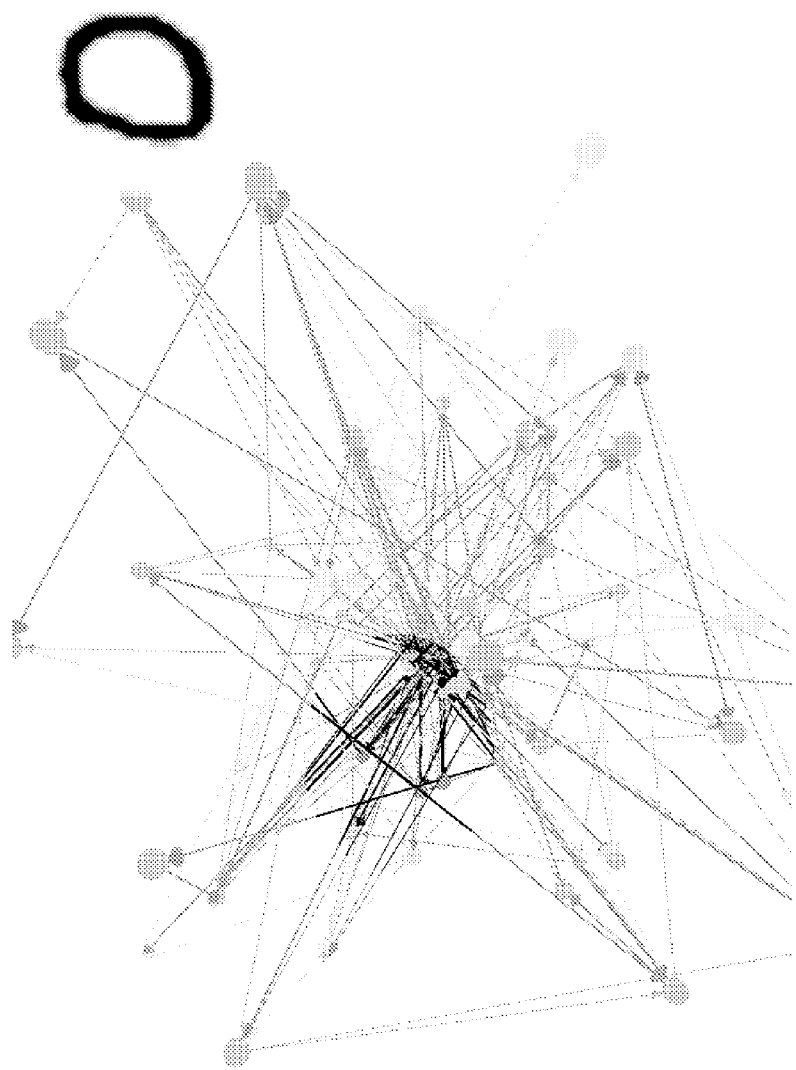
FIG. 18 shows a network in a gray scale including a similar three-neuron substructure within the same network shown in FIG. 17 processing a different hand-written numeral 0 image but showing the similarities in substructure, FIG. 18 being adapted from a color copy found as FIG. 6 in IEEE 2014.
Figure 18A:
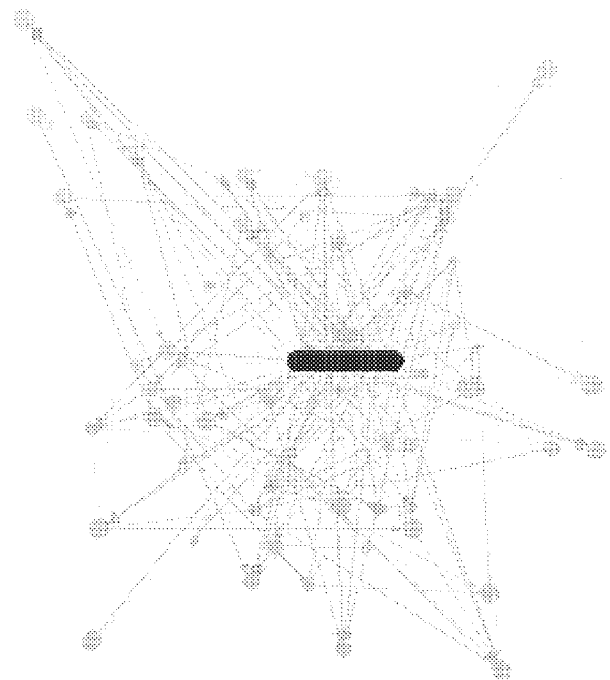
FIGS. 18A-18Z show a sequence of gray scale images showing a progression in time from initial stimulus to run time 480 adapted from a color copy found as FIG. 6 in IEEE 2014.
Figure 18D:
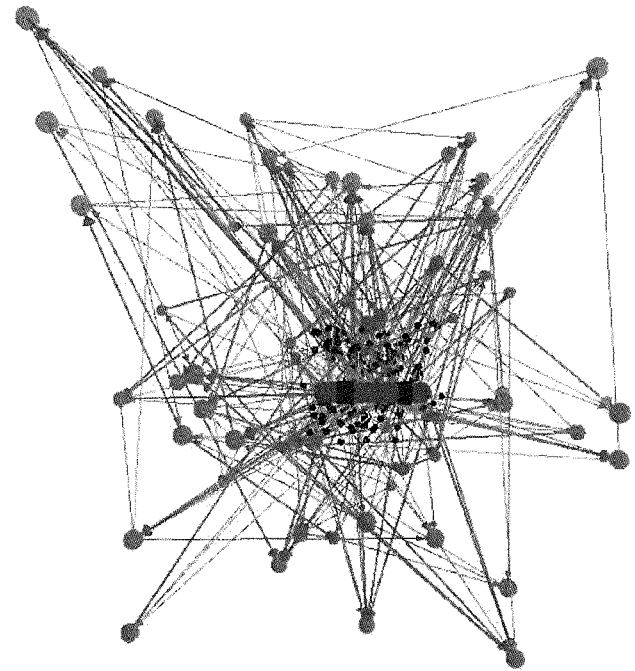
Figure 18H:
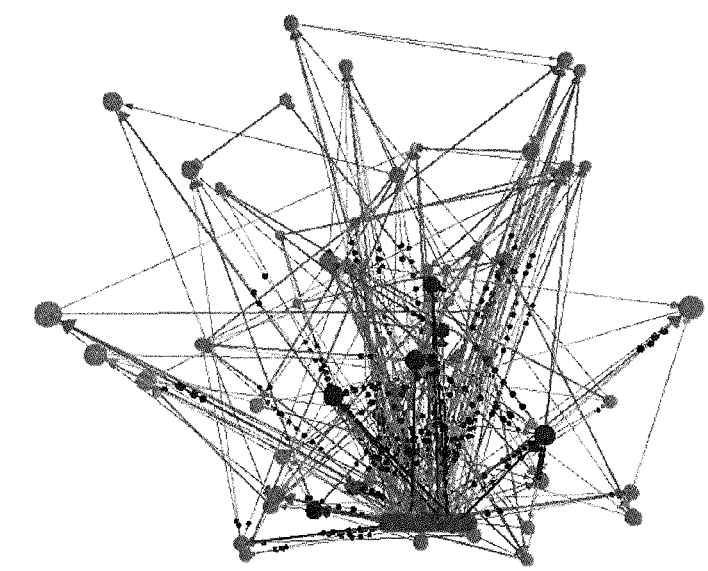
Figure 18Y:
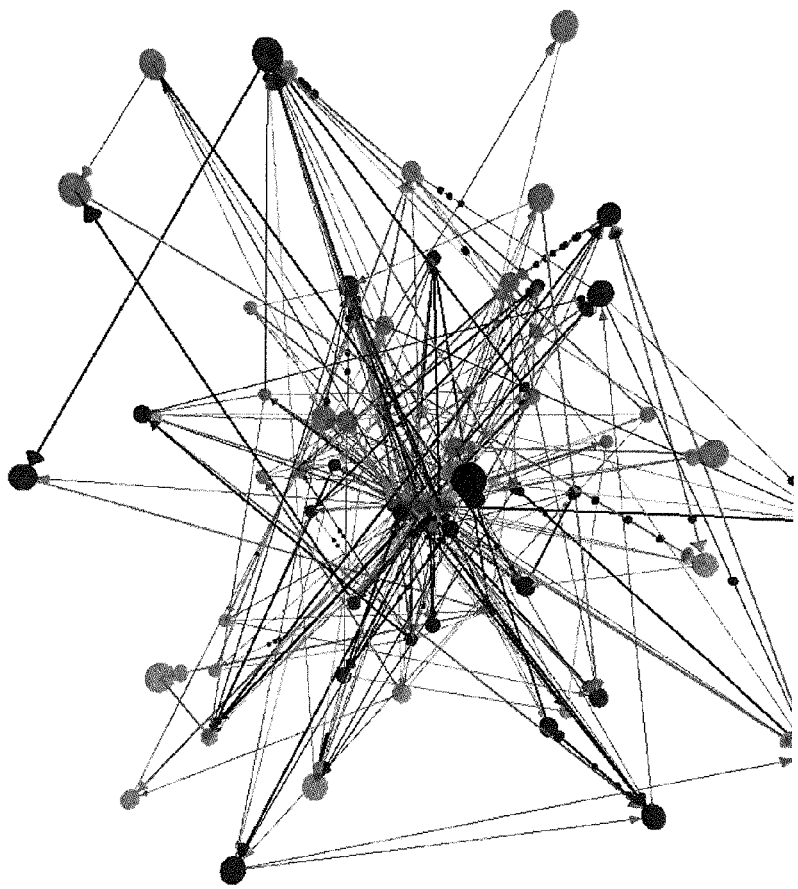
Figure 18Z:
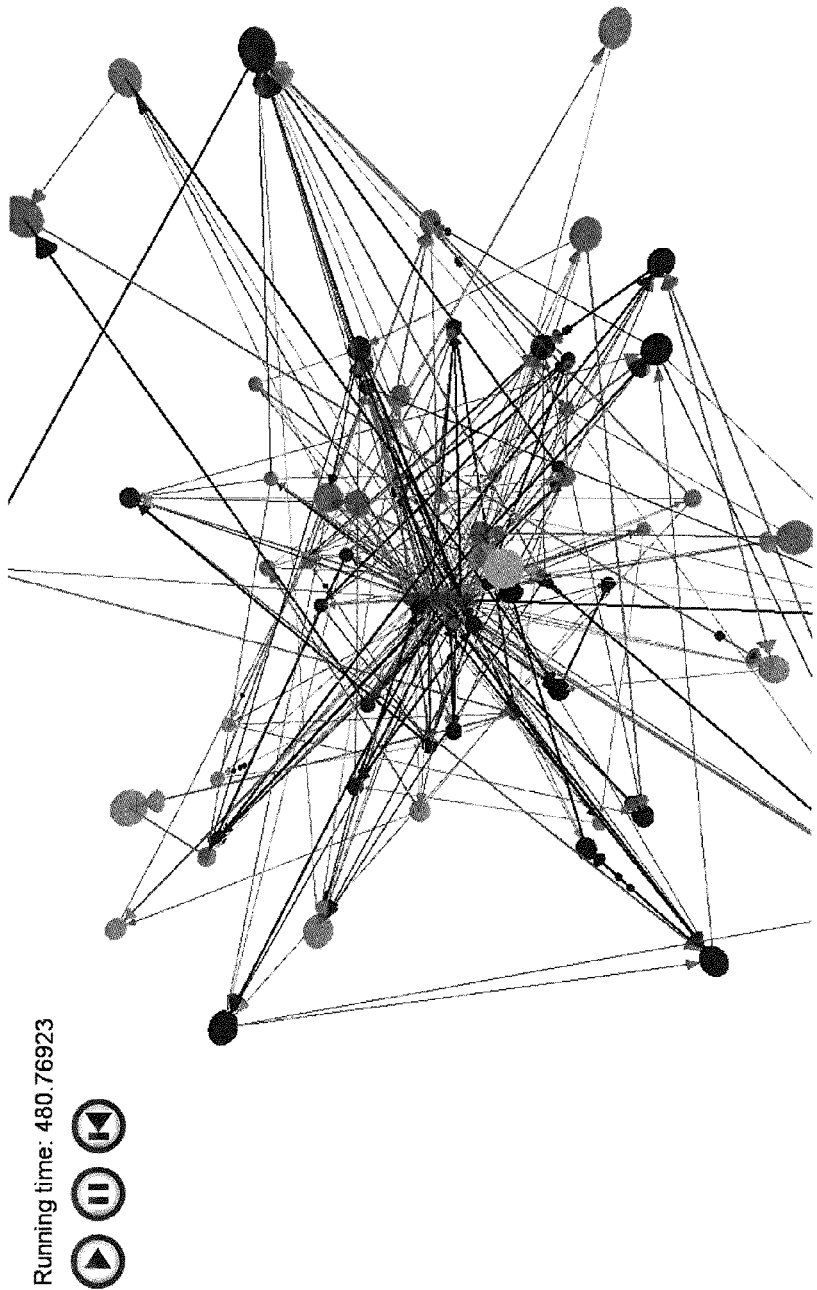
Figure 19:
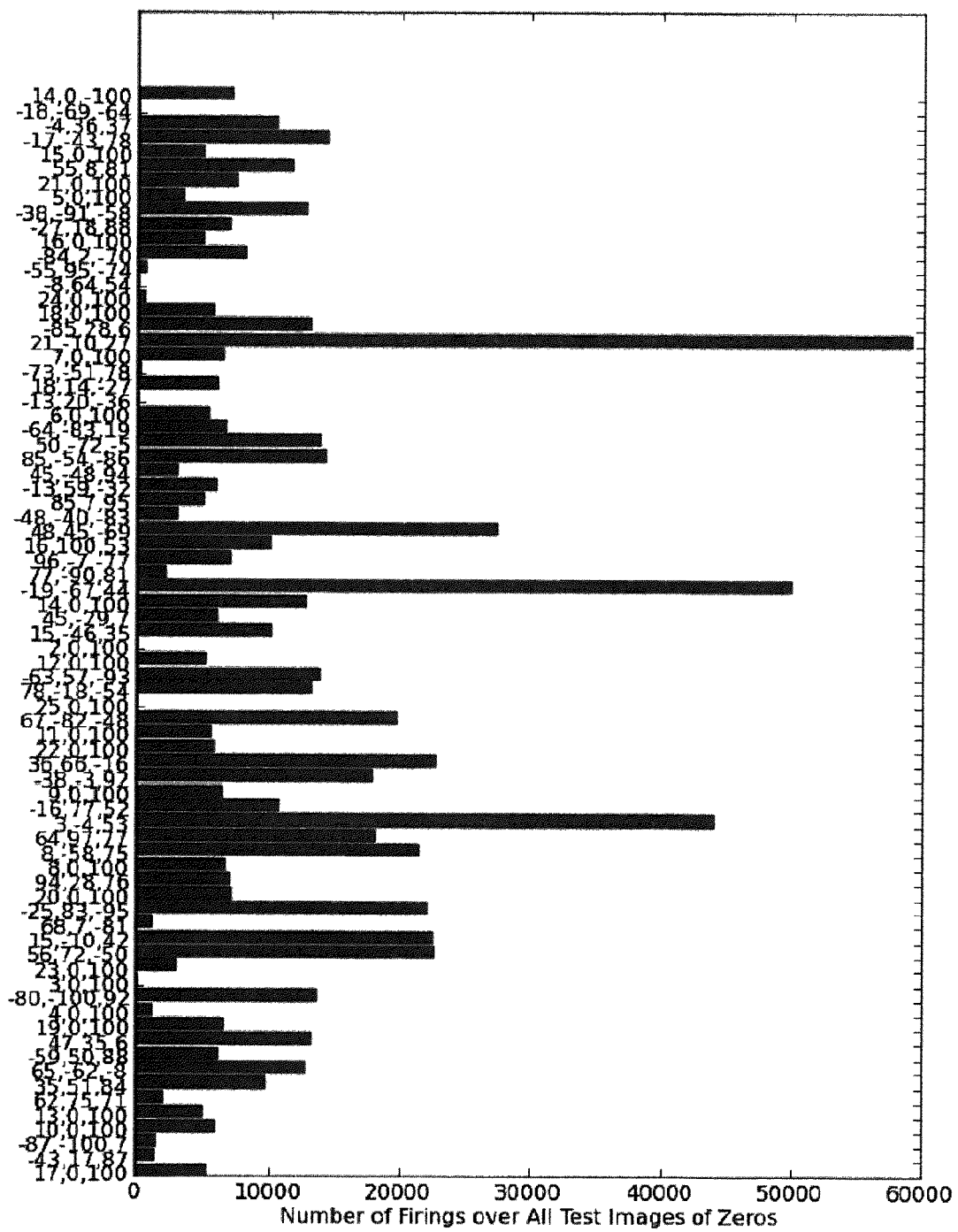
FIG. 19 shows the activity of all neurons depicted in the networks of FIGS. 17 and 18.
Figure 20:
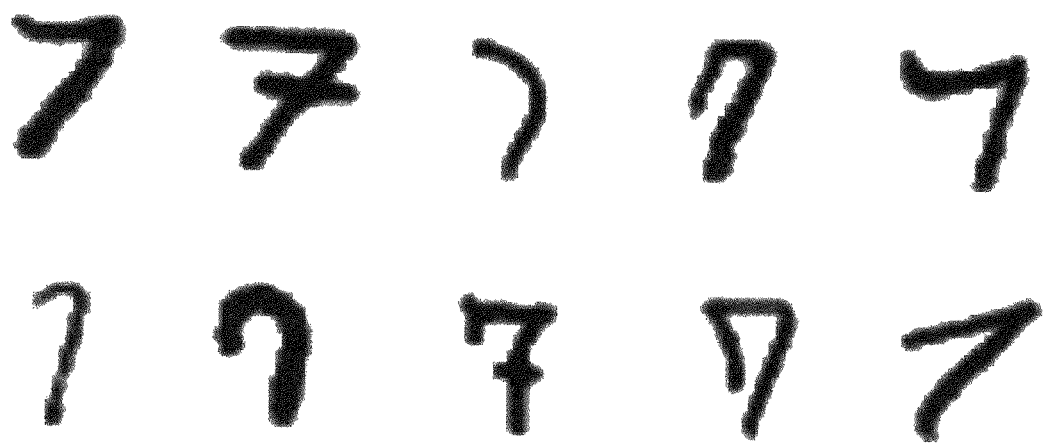
FIG. 20 shows exemplary hand-written digits 7.

One insight gained from the visualization tool is an understanding of which substructures (if any) within a particular network are critical to that network's performance. The identification of such substructures, particularly when similar substructures are observed in different networks, can be used to facilitate the efficient evolution of high-performing networks comprising a plurality of special purpose substructures. Visual simulations on a handwritten digit network trained to recognize the digit 0 yielded the discovery of one such interesting substructure. The three-neuron substructure s shown as the three active (yellow) neurons in the highlighted region in FIGS. 17 and 18 was observed to be highly active throughout the processing of multiple input images of the digit 0. FIGS. 17A-17Z show the full processing of the digit 0 shown in FIG. 17A, as processed by the same handwritten digit recognizer shown in FIG. 17. The shading used in FIGS. 17A-17Z was selected to best represent the NIDA networks using only grayscale values, so the neurons and synapses are depicted in varying shades of gray, while the highlight color for active elements is pure black. This visualization simulation had a default visibility of ghost for all elements and used visibility upon activity to make elements fully visible after they were first active. Similarly, FIGS. 18A-18Z, show the full processing of the digit 0 shown in FIG. 18A, as processed by the same handwritten digit recognizer shown in FIG. 18. The shading used was similarly selected as with the visualizations of FIGS. 17A-17Z and the highlight color for active elements in FIGS. 18A-18Z is again pure black. Also, the visualization simulation had a default visibility of ghost for all elements and used visibility upon activity to make elements fully visible after they were first active. To better understand the activity of s in relation to other neurons within the network, an analysis of the activity of all neurons in the network over all input images of the digit 0 was performed and the results are shown in FIG. 19. The three neurons contained in s were more active than all other neurons in the network by a wide margin. Substructures such as this one can be identified easily by determining the most active neurons in the network. Automatic identification of causal, input/output or more active neurons in best or highly performing networks and replication of those neurons and optionally their associated substructure in other networks may be used to improve the performance of the evolutionary optimization method for designing networks.

By applying a feature of the visualization tool described herein as finding a "causality path." a substructure for recognizing the digit 0 may be differentiated from a substructure for recognizing the digit 1. Referring to FIG. 23A through FIG. 23J, there are shown sub-networks of networks trained to recognize various digits 0-9 in hand-written digital images. In these sub-networks, the neurons and synapses may be sized based on the number of times they appear in a causality path for a firing event, for example, in the last 50 (range of 25 to 100's) of time steps of a simulation which signifies a detection of a particular image. In practicality, neural pathways that are not utilized at all will not appear and those that are used the most appear. Taking this process to its conclusion, a large network comprising a plurality of such sub-networks may be used to recognize the range of digits 0-9. Similarly, the same process has been used to hand-tool a network to recognize a vertical line and that sub-network repeated many times to recognize vertical lines in any location in a large grid containing vertical lines. This process is shown in the visualization produced as FIG. 24A and FIG. 24B.

Figure 24A:
FIG. 24A shows in gray scale an example substructure, hand-designed to recognize a vertical line.
Figure 24B:
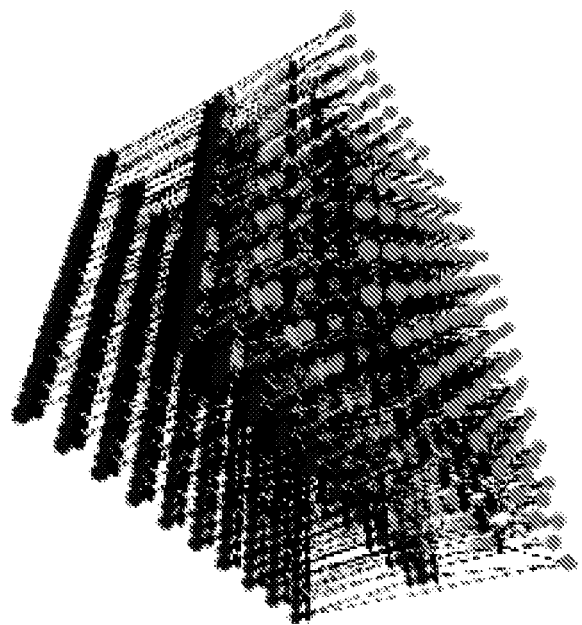
FIG. 24B shows a network in gray scale comprising the hand-tooled substructure repeated many times that recognizes vertical lines in a large grid image.

Referring to FIGS. 24A and 24B, an example substructure, hand-designed to recognize a vertical line is given in FIG. 24A. In FIG. 24B is shown a network built from a plurality of these substructures so that it will detect a vertical line in any location in a large grid or image comprising one or more vertical lines within the large grid or image. This process may be extended to recognizing horizontal lines and then to recognizing horizontal lines in a grid image containing same. These networks for vertical lines and horizontal lines, in turn, may be combined to recognize horizontal and vertical lines in grid images. Right angles, squares and rectangles, by way of example, may each be another project or special purpose network comprising substructures for recognizing components (horizontal or vertical lines) of images.

In exploring useful substructures, the visualization tool thus may trace important events in the network back to the initiating events on input neurons. We refer to these paths as "causality paths." The activity along the path can be animated in the same way as standard network activity in order to trace the precipitating actions from input neuron pulse to the occurrence of the event itself. One experiment with these paths explores the differences in the network activity between input images of the digit d that a network has been trained to recognize and input images of digits other than d. Of particular interest are images of non-d digits that share certain characteristics with d.

Figure 22:
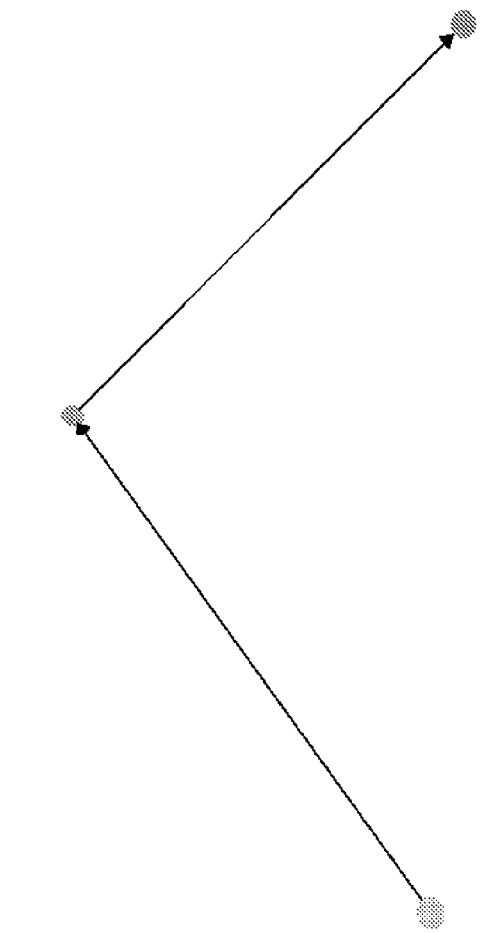
FIG. 22 shows an event path for a network trained to recognize the digit 7 in gray scale showing that the network does not recognize the input image of the digit 2 as a 7 adapted from a color copy found as FIG. 10 in IEEE 2014.
Figure 23A:
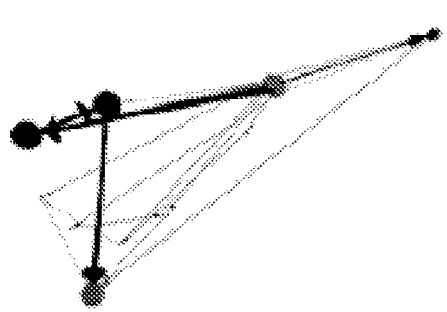
Figure 23B:
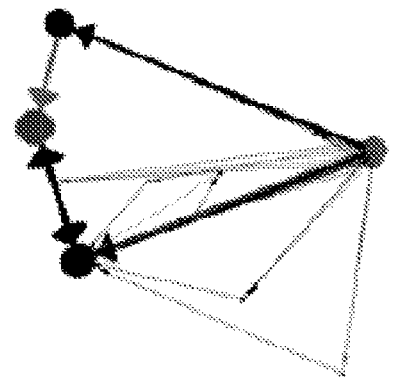
Figure 23C:
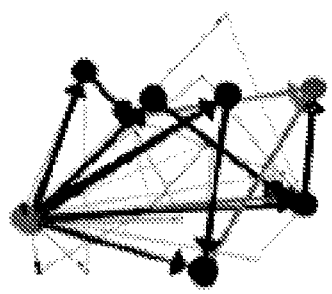
Figure 23D:
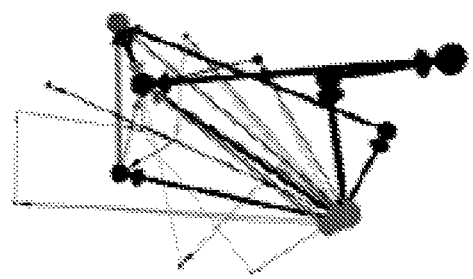
Figure 23E:
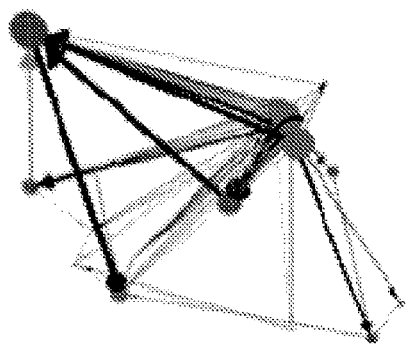
Figure 23F:
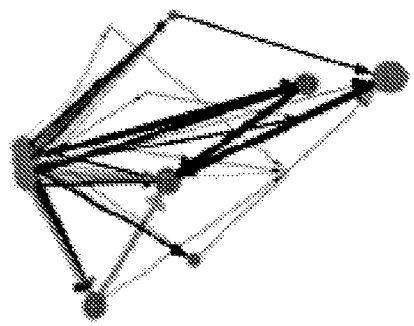
Figure 23G:
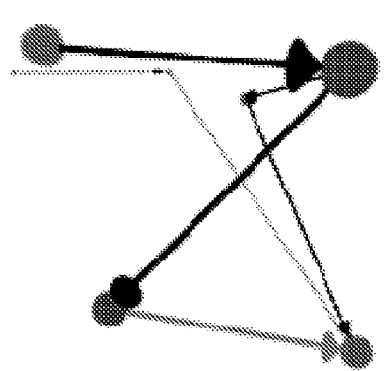
Figure 23H:
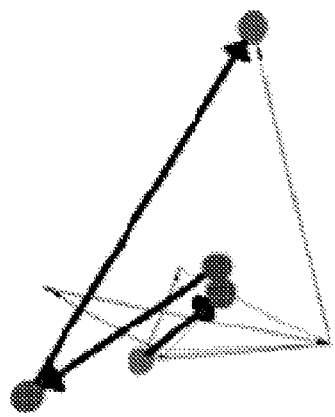
Figure 23I:
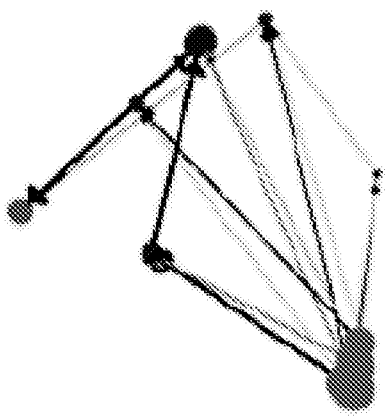
Figure 23J:
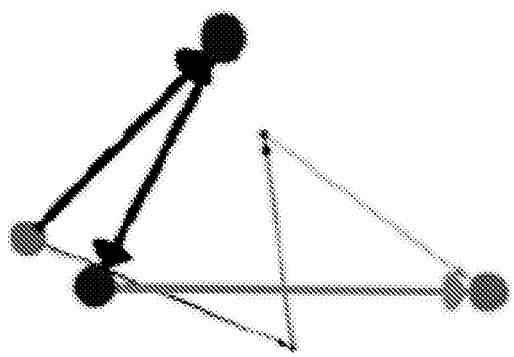

FIG. 21 is a path extracted from the activity of network N, a handwritten digit recognizer trained to recognize the digit 7 during the processing of an input image of a 7. The figure shows the first firing of the output neuron during the final time window, signaling recognition of the digit 7. In contrast, FIG. 22 shows a path drawn from the same network during the processing of an input image of the digit 2, which has similar features to images of sevens. The path in FIG. 22 includes the final firing of the output neuron at time 391.389. The occurrence of this last fire prior to the beginning of the final time window indicates that the network recognizes that the input image is not a 7. The network behavior was similar for multiple input images of the digit 2. The final firing of the output neuron could be traced back to the input pulse along the same relatively short two-segment path. The final firing propagated charge along inhibitory synapses. Other input images, such as those of the digit 1, triggered different activity, but the paths to the final firing tended to be short and to trigger more inhibitory behavior. The paths for correct recognition of the digit 7 tended to vary more, but were longer overall, as could be expected since the fire to indicate recognition of d, as discussed above, may be programmed to occur within the final 50 time units. Some of these paths were cyclical, unlike the paths observed for non-d digits. The variation in paths for images of 7 may be attributable to the variations in ways 7's can be written, as shown in FIG. 8.

The causality paths appearing in FIGS. 21 and 22 provide further intuition about how networks of this type operate. Based on these results, we can speculate that shorter paths to the final firing of the output neuron result from the relative ease of identifying an image as a non-d digit as compared to the paths that result when identifying an image as a d digit. That is, it is easier (and requires less complicated structure) for the network to determine that an image is not of a d than it is for the network to definitively say that the image is of a d. Table I below gives the classification results of one of these networks in isolation (a network trained to recognize hand-written images of 7's). In particular, this Table I shows that for non-7 images of digits other than 9's, the network achieves higher than 90 percent accuracy (that is, the network does not fire in the last time window for these images), whereas it only achieves around 80 percent accuracy for images of sevens. The low accuracy rate for 9's may be attributed to the similarities in the ways 7's and 9's are written.

TABLE I

Accuracy Breakdown for a Network Trained to Recognized Images of the Digit 7

| Digit | Accuracy |
| --- | --- |
| 0 | 99.4898 |
| 1 | 99.9119 |
| 2 | 97.6744 |
| 3 | 90.8911 |
| 4 | 97.4542 |
| 5 | 92.9372 |
| 6 | 99.791 |
| 7 | 79.3574 |
| 8 | 94.5585 |
| 9 | 77.106 |

Causality paths are helpful in understanding what structure in the network is important in producing the functionality of the network. They are another automated way to track useful substructures that may be exploited during the evolutionary optimization method.

It is important to note that much of the network's behavior is governed by inhibition of activity (that is, keeping neurons from firing rather than causing neurons to fire). This is true in many different task types, but it is especially true in this task example, in which the network must not fire in approximately 90 percent of the input cases (because the network is only recognizing one digit type of 10 possible digit types). This type of activity is much harder to track using conventional analysis methods, but it is clearly vital to understanding how each network operates. A major advantage of our existing visualization tool is that it allows us to observe the propagation of charge along the synapses, which are clearly either excitatory or inhibitory, and to see precisely how different input events affect the behavior of the rest of the network.

NIDA networks may solve tasks in a variety of domains, including control, anomaly detection, and classification. However, in the development of a new architecture and associated design method, it can be difficult to identify what characteristics of the architecture and the method are important, as well as how to improve the overall performance of the architecture and design method. The present visual analytics tool has been developed in several embodiments to address this issue by facilitating the understanding of both the structure of the NIDA/DANNA/biological networks respectively produced or used for different tasks and the behavior of these networks on different tasks and for different input types.

The visual analytics tool presented herein motivates analysis that can occur in real-time during the training process of the networks. For example, a substructure in one of the networks produced during training seems to be more active than other neurons in that network and that this substructure is active for several different input images (of numerals). This structure may be active in general, and motivated the statistical analysis that confirmed that hypothesis. Without the visualization tool, there would be no hypothesis and such a substructure not be found. Moreover, the idea of extracting a substructure based on highest activity may be included as part of evolutionary optimization.

Another feature of the visual analytics tool of an embodiment of the present invention is that it allows us to view causality paths to trace through the events that led to a particular fire or change in charge event. This is a more complex computational operation, so it may not be a real-time tool we can use to extract substructures for re-use during evolution. However, these causality paths provide a greater understanding to the user of the behavior of the network. As noted in the results section, in most cases, inhibition of firing in the network is essential to the operation of the network, but it can be difficult to see the full effect of inhibition on the network's behavior without the aid of a visualization tool. The ability to see the network's full structure gives the user an intuitive feel for not only how many inhibitory synapses there are in the network, but also bow active these synapses are (through highlighting of the synapse) and how many events are propagating along them (through charge points along the synapse).

The visibility settings and color encodings can be expanded to give a more accurate representation of the network's current state. Specifically, in addition to the option to make network elements become visible (visibility upon activity), the tool can include a setting to reduce the visibility of elements to ghost or invisibility after a period of inactivity ("fade alter inactivity"). The combination of visibility upon activity and fade after inactivity allows users to comprehend more efficiently the propagation of activity through the network and will highlight the most active elements and substructures. Color encodings provide users with an up-to-date view of neuron charge level. Neuron hues can differentiate between input, hidden, and output neurons, while saturation levels can be used to encode charge. Neuron charge level falls within the range −1.0 to 1.0, but individual neurons have varying thresholds. The visualization tool can normalize the charge level of a given neuron n with respect to the threshold of n and discretize it within a set number of bins. When a neuron receives charge (positive or negative) from a connected synapse, its saturation may be adjusted to the discrete level that best indicates its current proximity to the firing threshold.

Interactivity and flexibility are the highest priorities for the visualization tool. The visualization tool allows the user to modify all of the currently adjustable features from within the graphical user interface at any point during a simulation. Adjustable features include visibility settings as described in previous sections, color scheme, mode of interaction (interactive vs. image rendering for video), and event selection for causality path trace. Other interactivity features allow users to explore the networks more freely. In addition to allowing visibility settings to be modified by rule (visibility upon activity, fade after inactivity, etc.), users can toggle the visibility of a selected neuron n or synapse s, along with the visibility of any other elements directly connected to n or s. Users also may have interaction controls to define thresholds to suppress or highlight particular events. For example, the user could visualize only neurons that fire more than N times over a specified time interval, or that have fired within the last K time units. These features allow users to eliminate visual clutter and examine critical substructures of the network in-depth. The interactivity of causality path tracing also accommodate reverse animation in time, facilitating the exploration of causality in both directions. Interactive scaling within the network allows examination of the relationships in more compact networks and substructures thereof. The exploration of dense networks requires scaling in addition to zooming because some networks allow for neurons to overlap within a single unit of space. In order to view relationships between neurons so closely situated, the space that each neuron occupies may be reduced in proportion to the space of the network overall. In other words, synapses may be represented at a greater scale than neurons, but in proportion to their true length in order to view connections between closely packed neurons.

An extension to the evolutionary optimization software was added to accommodate the ability to reuse structures based on activity. Each time a new best network is found for a given task, the simulations required for the task are completed and firing statistics for each neuron in that network are recorded (not all of these records are maintained during normal simulations). Based on these results, the most active hidden neurons in the network are recorded (the input and output neurons are not included because they exist in every network in the population). A user-specified percentage (an exemplary default value is 5 percent) of these neurons are extracted from the network to be included in the useful substructure.

Causality paths have been discussed above. For a given artificial neural network with specified input and output connections, three different types of similarity may be defined: 1) Input/output similarity: Given similar input event sequences, the two networks produce similar output event sequences. Such input/output similarity is not a measure of graph structure similarities or parameter values of the two compared networks; 2) Structural similarity: Here, the two compared networks have similar graph structures. Optionally, similarities in parameter values may be considered as well. Structural similarity may not be a measure of input/output behavior similarity; and 3) Information flow similarity: Here, there is substantial structural similarity and, moreover, there is substantial information flow similarity, for example, a function of the time sequences of events occurring on synapses and neurons of identified neural pathways. The degree of information flow similarity may be defined by the number of levels of behavioral similarity that exist between compared networks.

Figure 25A:
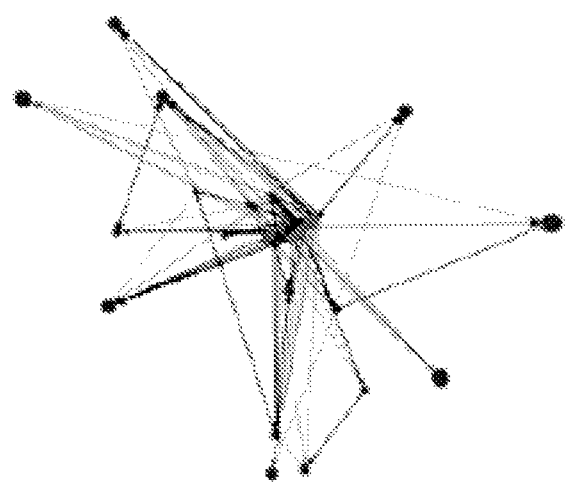
FIG. 25A provides an example network while FIG. 25B provides a visualization of the useful substructure extracted from the network based on activity N for that network.
Figure 25B:
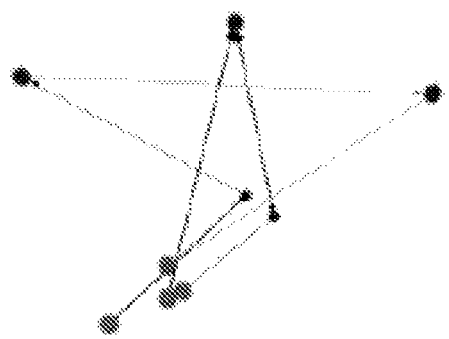

Let us denote the set of active neurons in a network as N. Any synapses that connect neurons in N are also included in the useful substructure. A minimum-hop path from each neuron in N from an input neuron in the network is also included (where a path includes both neurons and synapses along that path, but we do not include the input neuron). These paths go from the input neuron to a neuron in N. Similarly, a minimum-hop path from each neuron in N to an output neuron in the network is also included in the substructure. FIG. 25A and FIG. 25B provide examples of a network and respectively of the associated useful substructure that is extracted from the network of FIG. 25A using this method. FIG. 25A provides an example network while FIG. 25B provides a visualization of the useful substructure extracted from the network based on activity N (set of neurons) for that network.

Figure 27:
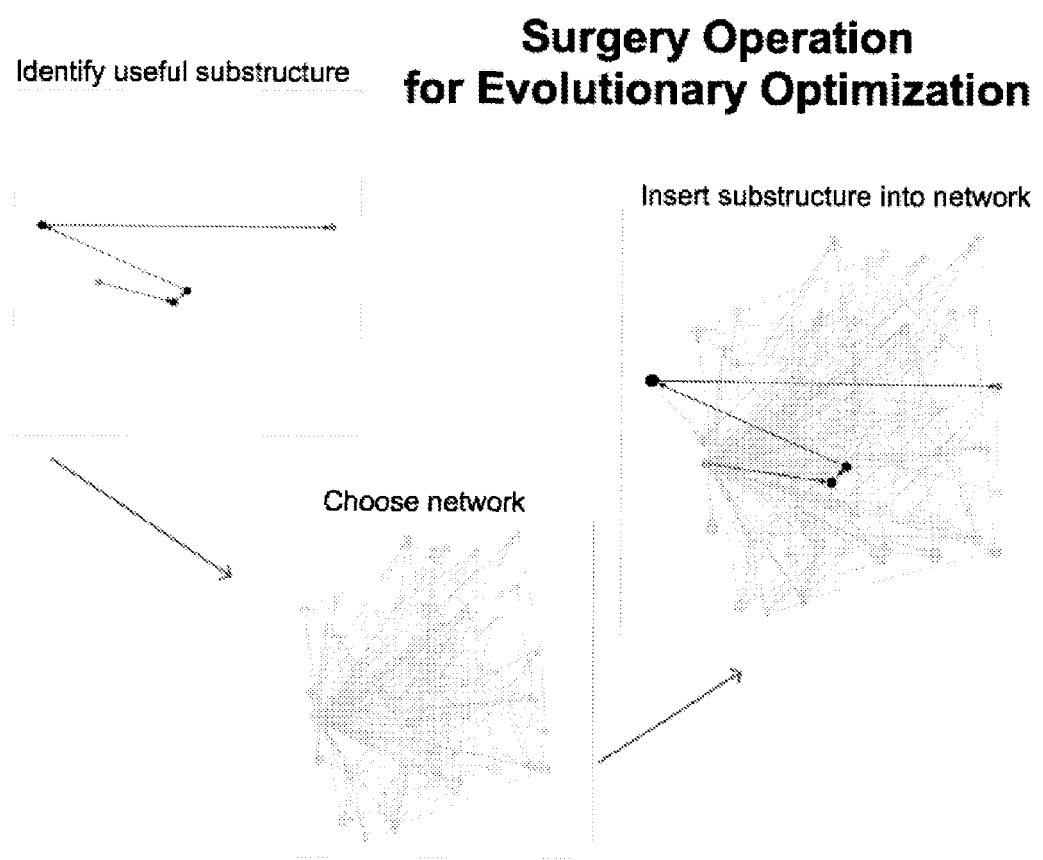
FIG. 27 provides a visualization example of a process whereby a useful substructure of an artificial neural network is identified for performing a particular sub-task, for example, by measuring the activity level of use of certain neural pathways being above a predetermined level of activity, an artificial neural network is selected for performing a task of which the sub-task and its identified neural pathway may comprise a useful substructure and the identified useful substructure is inserted into the artificial neural network (if not already a substructure thereof).

FIG. 27 provides a visualization example of a process whereby a useful substructure of an artificial neural network is identified for performing a particular sub-task, for example, by measuring the activity level of use of certain neural pathways being above a predetermined level of activity, an artificial neural network is selected for performing a task of which the sub-task and its identified neural pathway may comprise a useful substructure and the identified useful substructure is inserted into the artificial neural network (if not already a substructure thereof). For example, FIG. 25A and FIG. 25B show a full network and a sub-network or substructure extracted based on an activity level while FIG. 27 shows its "surgical" insertion into an artificial neural network where the substructure may be presently missing. "Surgery" may be defined as either removal of substructures or implants of substructures from parent networks in a future generation of child networks of EO where the substructures are "useful" because they exhibit at least behavioral similarity over multiple inputs from the same class in at least one network. It can be desirable to extract or surgically remove unsuccessful network substructures or identify a useful substructure and surgically implant that substructure in a network in order to improve the network's performance.

A user-specified number of useful substructures may be maintained in memory such as a database as part of the evolutionary optimization, along with the fitness value of the network from which each substructure was obtained. Conversely, unsuccessful substructures that are unsuccessful at certain tasks may be preserved in a library for surgical removal from a network. The mutation operation may be expanded so that one possible mutation is the inclusion of one of these successful/unsuccessful substructures from the database in the network. This mutation includes either the sub-network from the most successful network thus far or randomly selects one of the other useful substructures maintained in memory. It randomly selects between the two, but weights the selection based on user-defined parameters. For example, the user could specify that the sub-network from the most successful network should be included in 90 percent of the instances in which this mutation occurs and another sub-network from a list maintained in memory should be included in 10 percent of the instances. Another possible mutation is the deletion of one of these substructures as an unsuccessful substructure for a given sub-task. If the deleted substructure is not in a database of useful substructures, it may be added for possible future use as a useful, unsuccessful substructure.

All United States and foreign patents and articles whose citations are provided above and below in the Bibliography should be deemed to be incorporated by reference as to their entire contents for the purposes of understanding the underlying technology behind an embodiment of a method and special purpose apparatus for visualizing neural pathways in an artificial neural network for solving problems in the control, anomaly detection and classification arts utilizing hardware or software according to the various embodiments of the several related patent applications. The embodiments of a method and apparatus for visualizing neural pathways in an artificial neural network should only be deemed to be limited by the scope of the claims which follow.

BIBLIOGRAPHY

1) Xin Yao, "Evolving artificial neural networks," *Proceedings of the IEEE*, 87(9):1423-1447, September 1999.
2) David J. Montana and Lawrence Davis, "Training feed-forward neural networks using genetic algorithms," *Proceedings of the 11th international joint conference on Artificial intelligence—Volume 1*, pps. 762-767, San Francisco, Calif., USA, 1989, Morgan Kaufmann Publishers Inc.
3) D. Fogel. L. Fogel, and V. Porto. "Evolving neural networks," *Biological Cybernetics*, 63(6): 487-493, 1990.
4) Randall D. Beer and John C. Gallagher. Evolving dynamical neural networks for adaptive behavior," *Adapt. Behav.*, 1(1):91-122, June 1992.
5) A. P. Wieland, "Evolving neural network controllers for unstable systems." *Neural Networks, 1991. IJCNN-91-Seattle International Joint Conference on*, volume ii, pages 667-673, July 1991.
6) S. Dominic, R. Das. D. Whitley, and C. Anderson, "Genetic reinforcement learning for neural networks, *Neural Networks, 1991, IJCNN-91-Seattle International Joint Conference on*, volume ii, pages 71-76 vol. 2. July 1991.
7) Faustino Gomez, Jürgen Schmidhuber, and Risto Miikkulainen, "Efficient non-linear control through neuroevolution." Johannes Fürnkranz, Tobias Scheffer, and Myra Spiliopoulou, editors, *Machine Learning: ECML 2006*, volume 4212 of *Lecture Notes in Computer Science*, pages 654-662, Springer Berlin/Heidelberg, 2006.
8) Faustino Gomez, Jürgen Schmidhuber, and Risto Miikkulainen, "Accelerated neural evolution through cooperatively coevolved synapses," *J. Mach. Learn. Res.*, 9:937-965, June 2008.
9) Dario Floreano, Peter Dürr, and Claudio Mattiussi. "Neuroevolution: from architectures to learning," *Evolutionary Intelligence*, 1(1):47-62, 2008.
10) Jürgen Branke, "Evolutionary algorithms in neural network design and training—A review," Jarmo T. Alander, editor. *Proc. of the First Nordic Workshop on Genetic Algorithms and their Applications (1NYWGA)*, volume 95-1, pages 145-163, Vaasa, Finland, 1995.
11) D. Whitley, T. Starkweather, and C. Bogart, "Genetic algorithms and neural networks: optimizing connections and connectivity," *Parallel Computing*, 14(3):347-361, 1990.
12) J. R. Koza and J. P. Rice, "Genetic generation of both the weights and architecture for a neural network. In *Neural Networks, 1991, IJCNN-91-Seattle Inter-national Joint Confrence on*, volume ii, pages 397-404 vol. 2, July 1991.
13) D. Dasgupta and D. R. McGregor. "Designing application-specific neural networks using the structured genetic algorithm," *Combinations of Genetic Algorithms and Neural Networks, 1992. COGANN-92. International Workshop on*, pages 87-96, June 1992.
14) David White and Panos Ligomenides, "Gannet: A genetic algorithm for optimizing topology and weights in neural network design," José Mira, Joan Cabestany, and Alberto Prieto, editors. *New Trends in Neural Computation*, volume 686 of *Lecture Notes in Computer Science*, pages 322-327, Springer Berlin/Heidelberg, 1993.
15) V. Maniezzo. Genetic evolution of the topology and weight distribution of neural networks. *Neural Networks. IEEE Transactions on*, 5(1):39-53. January 1994.
16) P. J. Angeline, G. M. Saunders, and J. B. Pollack, "An evolutionary algorithm that constructs recurrent neural networks," *Neural Networks, IEEE Transactions on*, 5(1): 54-65, January 1994.
17) K. S. Tang, C. Y. Chan, K. F. Man, and S. Kwong. "Genetic structure for nn topology and weights optimization," *Genetic Algorithms in Engineering Systems: Innovations and Applications. 1995. GALESIA. First International Conference on (Conf. Publ. No. 414)*, pages 250-255. September 1995.
18) Yong Liu and Xin Yao. "A population-based learning algorithm which learns both architectures and weights of neural networks," *Chinese Journal of Advanced Software Research (Allerton)*, 10011:54-65, 1996.

19) David E. Moriarty and Risto Mikkulainen, "Efficient reinforcement learning through symbiotic evolution," *Machine Learning*, 22(1):11-32, 1996.
20) David E. Moriarty and Risto Miikkulainen, "Forming neural networks through efficient and adaptive coevolution," *Evol. Comput.*, 5(4):373-399, December 1997.
21) Faustino Gomez and Risto Miikkulainen, "2-d pole balancing with recurrent evolutionary networks," *Proceeding of the International Conference on Artificial Neural Networks (ICANN)*, pages 425-430, 1998.
22) X. Yao and Y. Liu, "A new evolutionary system for evolving artificial neural networks," *Neural Networks. IEEE Transactions on*, 8(3):694-713, May 1997.
23) Joo Carlos Figueira Pujol and Riccardo Poli, "Evolving the topology and the weights of neural networks using a dual representation," *Applied Intelligence*, 8:73-84, 1998.
24) Hussein A. Abbass, "An evolutionary artificial neural networks approach for breast cancer diagnosis," *Artificial Intelligence in Medicine*, 25(3):265-281, 2002.
25) Kenneth O. Stanley and Risto Miikkulainen, "Evolving neural networks through augmenting topologies," *Evolutionary Computation*, 10(2):99-127, 2002.
26) K. O. Stanley, B. D. Bryant, and R. Miikkulainen, "Evolving adaptive neural networks with and without adaptive synapses." *Evolutionary Computation*, 2003. CEC '03, *The 2003 Congress on*, volume 4, pages 2557-2564. December 2003.
27) Enrique Alba and J. Chicano, "Training neural networks with ga hybrid algorithms," Kalyanmoy Deb, editor, *Genetic and Evolutionary Computation*, (GECCO 2004, volume 3102 of *Lecture Notes in Computer Science*, pages 852-863. Springer Berlin/Heidelberg, 2004.
28) J. E. Fieldsend and S. Singh. "Pareto evolutionary neural networks," *Neural Networks, IEEE Transactions on*, 16(2):338-354, March 2005.
29) P. P. Palmes, T. Hayasaka, and S. Usui, "Mutation-based genetic neural network," *Neural Networks. IEEE Transactions on*, 16(3):587-600, May 2005.
30) Y. Kassahun. *Towards a Unified Approach to Learning and Adaptation*," PhD thesis, Christian-Albrechts-University, Kiel, Germany, February 2006.
31) Nils T. Siebel and Gerald Sommer, "Evolutionary reinforcement learning of artificial neural networks," *Int. J. Hybrid Intell. Syst.*, 4(3):171-183, August 2007.
32) N. T. Siebel, J. Botel, and G. Sommer, "Efficient neural network pruning during neuroevolution," *Neural Networks*, 2009. IJCNN 2009. *International Joint Conference on*, pages 2920-2927, June 2009.
33) Kenneth O. Stanley, David B. D'Ambrosio, and Jason Gauci. "A hypercube-based encoding for evolving large-scale neural networks," *Artificial Life*, 15(2):185-212, 2009.
34) Jason Gauci and Kenneth O. Stanley. "Autonomous evolution of topographic regularities in artificial neural networks," *Neural Computation*, 22(7):1860-1898, 2010.
35) Henry Markram, Wulfram Gerstner, and Per Jesper Sjöström, "A history of spike-timing-dependent plasticity." *Frontiers in Synaptic Neuroscience*, 3:4, 2011.
36) Randall D. Beer, "On the dynamics of small continuous-time recurrent neural networks." *Adaptive Behavior*, 3(4): 469-509, 1995.
37) Randall D. Beer, "The dynamics of adaptive behavior. A research program," *Robotics and Autonomous Systems*, 20(2-4):257-289, 1997, ice:title; Practice and Future of Autonomous Agents.
38) John C. Gallagher and Saranyan Vigraham, "A modified compact genetic algorithm for the intrinsic evolution of continuous time recurrent neural networks," *Proceedings of the Genetic and Evolutionary Computation Conference*, GECCO '02, pages 163-170, San Francisco, Calif. USA, 2002, Morgan Kaufmann Publishers Inc.
39) P. Merolla, J. Arthur, F. Akopyan. N. Imam, R. Manohar, and D. S. Modha. "A digital neurosynaptic core using embedded crossbar memory with 45pj per spike in 45 nm," *Custom Integrated Circuits Confrence (CICC)*, 2011 *IEEE*, pages 1-4, September 2011.
40) Robert Preiss, Theodore M. Wong, Pallab Datta, Myron Flickner, Raghavendra Singh. Steven K. Esser, William P. Risk, Horst D. Simon, and Dharmendra S. Modha. "Compass: a scalable simulator for an architecture for cognitive computing," *Proceedings of the International Conference on High Performance Computing, Networking. Storage and Analysis*, SC '12, pages 54:1-54:11, Los Alamitos, Calif. USA, 2012, IEEE Computer Society Press.
41) Nadav Kashtan, Uri Alon, and Jr. Callan, Curtis G., "Spontaneous evolution of modularity and network motifs." *Proceedings of the National Academy of Sciences of the United States of America*, 102(39): pp. 13773-13778, 2005.
42) T. Caelli, Ling Guan, and W. Wen, "Modularity in neural computing." *Proceedings of the IEEE*, 87(9): 1497-1518, September 1999.
43) Sung-Bae Cho and K. Shimohara, "Modular neural networks evolved by genetic programming," *Evolutionary Computation*, 1996, *Proceedings of IEEE International Conference on*, pages 681-684, May 1996.
44) N. Garcia-Pedrajas. C. Hervas-Martinez, and J. Munoz-Perez, "Covnet: a cooperative coevolutionary model for evolving artificial neural networks." *Neural Networks, IEEE Transaction on*, 14(3): 575-596, May 2003.
45) N. Garcia-Pedrajas, C. Hervas-Martinez, and D. Ortiz-Boyer. Cooperative coevolution of artificial neural network ensembles for pattern classification," *Evolutionary Computation, IEEE Transactions on*, 9(3):271-302. June 2005.
46) Joseph Reisinger, Kenneth O. Stanley, and Risto Miikkulainen, "Evolving reusable neural modules. In *Proceedings of the Genetic and Evolutionary Computation Conference*, 2004.
47) Gregory S. Hornby, "Measuring, enabling and comparing modularity, regularity and hierarchy in evolutionary design," *Proceedings of the 2005 conference on Genetic and evolutionary computation*, GECCO '05, pages 1729-1736, New York, N.Y., USA, 2005. ACM.
48) Takumi Kamioka, Eiji Uchibe, and Kenji Doya, "Neuroevolution based on reusable and hierarchical modular representation," *Proc. 15th Int. Conf Advances in Neuro-Information Processing, Part I (ICONIP '08)*, pages 22-31. Berlin, Heidelberg: Springer-Verlage, 2009.
49) Xin Yao and M. M. Islam, "Evolving artificial neural network ensembles," *Computational Intelligence Magazine, IEEE*, 3(1): 31-42, February 2008.
50) S. Singh, A. Barto, and N. Chentanez. "Intrinsically motivated reinforcement learning," 18th *Annual Conference on Neural Information Processing Systems (NIPS)*, 2004.
51) Jeff Hawkins et al., "Sequence memory for prediction, inference and behavior." *Phil. Trans. Royal Soc. B*, pp. 1203-1209, 2009.
52) Glackin et al. "A Novel Approach for the Implementation of Large Scale Spiking Neural Networks on FPGA Hardware," *IWANN* 20051 LNCS 3512, pp. 552-563, 2005.

53) Cassidy et al., "FPGA Based Silicon Spiking Neural Array," *Biomedical Circuits and Systems Conference* (BIOCAS 2007), pp. 75-78. IEEE, 2007.
54) Cassidy et al., "Cognitive Computing Building Block: A Versatile and Efficient Digital Neuron Model for Neurosynaptic Cores." *IBM Research,* 2013.
55) Sharp et al., "Power-efficient simulation of detailed cortical microcircuits on SpiNNaker," *Journal of Neuroscience Methods,* 201, pp. 110-118, 2012.
56) M. Anthony Lewis et al., "Control of a robot leg with an adaptive a(nalog) VLSI CPG chip," *Neurocomputing,* 38-40, 2001, pp. 1409-1421.
57) M. Anthony Lewis et al., "CPG Design Using Inhibitory Networks," *Proc. of the 2005 IEEE International Conference on Robotics and Automation,* (ICRA 2005), pp. 3682-3687, 2005.
58) Simon Friedmann et al., "Reward-based learning under hardware constraints—using a RISC processor embedded in a neuromorphic substrate," *Frontiers in Neuroscience,* 7, p. 160, 2013.
59) B. V. Benjamin et al., "Neurogrid: A mixed-analog-digital multichip system for large-scale neural simulations." *Proceedings of the IEEE,* 102, pp. 699-716, 2014.
60) Giacomo Indiveri et al., "Neuromorphic silicon neuron circuits." *Frontiers in Neuroscience,* 5, 2011.
61) Preiss et al., "Compass: A scalable simulator for an architecture for cognitive computing." *Proceedings of the International Conference on High Performance Computing, Networking, Storage and Analysis,* p. 54. IEEE Computer Society Press, 2012.
62) U.S. Pat. No. 7,533,071, entitled "Neural Modeling and Brain-based Devices Using Special Purpose Processor" and issued to Snook on May 12, 2009.
63) U.S. Pat. No. 8,311,965 entitled "Area Efficient Neuromorphic Circuits Using Field Effect Transistors and Variable Resistance Material" issued to Breitwisch et al., Nov. 13, 2012.
64) U.S. Pat. No. 8,433,665 entitled "Methods and Systems for Three-Memristor Synapse with STDP and Dopamine Signaling" issued to Tang et al., Apr. 30, 2013.
62) U.S. Pat. No. 8,510,239 entitled "Compact Cognitive Synaptic Computing Circuits with Crossbar Arrays Spatially in a Staggered Pattern" issued to Dharmendra S. Modha. Aug. 13, 2013.
63) U.S. Pat. No. 8,515,885 entitled "Neuromorphic and Synaptronic Spiking Neural Network with Synaptic Weights Learned Using Simulation" issued to Modha, Aug. 20, 2013.
63) U.S. Pat. No. 8,600,919 entitled "Circuits and Methods Representative of Spike Timing Dependent Plasticity of Neurons." to Poon et al., Dec. 3, 2012.
64) U.S. Published Patent App. 2009/0292661 entitled "Compact Circuits and Adaptation Techniques for Implementing Adaptive Neurons and Synapses with Spike Timing Dependent Plasticity (STDP)" on Nov. 26, 2009, to Hass.
65) U.S. Published Patent Application No. 2012/0036099 entitled "Methods and Systems for Reward-Modulated Spike-Timing-Dependent Plasticity" on Feb. 9, 2012, to Venkatraman et al.
66) U.S. Published Patent App. No. 2012/0109863 entitled "Canonical Spiking Neuron Network for Spatiotemporal Associative Memory," on May 3, 2012, to Esser et al.
68) U.S. Published Patent App. No. 2013/0073497 entitled "Neuromorphic Event-Driven Neural Computer Architecture in a Scalable Neural Network" on Mar. 21, 2013, to Filipp Akopyan et al.
69) WO Patent App. 2004/027704 published Apr. 1, 2004, entitled "Spiking Neural Network Device," by Dario.
70) Abbass, Hussein A., Michael Towsey, and G. Finn. "C-Net: A method for generating non-deterministic and dynamic multivariate decision trees." *Knowledge and Information Systems* 3.2 (2001): 184-197.
(71) Belatreche, Ammar, Liam P. Maguire, and Martin McGinnity. "Advances in design and application of spiking neural networks." *Soft Computing* 11.3 (2007): 239-248.
(72) Bohte, Sander M., Joost N. Kok, and Han La Poutre. "Error-backpropagation in temporally encoded networks of spiking neurons." *Neurocomputing* 48.1 (2002): 17-37.
(73) García-Pedrajas, Nicolás, Domingo Ortiz-Boyer, and César Hervás-Martínez. "An alternative approach for neural network evolution with a genetic algorithm: Crossover by combinatorial optimization." *Neural Networks* 19.4 (2006): 514-528.
(74) Jin, Yaochu, Ruojing Wen, and Bernhard Sendhoff. "Evolutionary multi-objective optimization of spiking neural networks." *Artificial Neural Networks—ICANN 2007.* Springer Berlin Heidelberg, 2007, 370-379.
(75) Mangasarian, Olvi L., R. Setiono, and W. L Wolberg. "Pattern recognition via linear programming: Theory and application to medical diagnosis." *Large-scale numerical optimization* (1990): 22-31.
(76) Michie, Donald, David J. Spiegelhalter, and Charles C. Taylor. "Machine learning, neural and statistical classification." (1994).
(77) Parekh, Rajesh, Jihoon Yang, and Vasant Honavar. "Constructive neural-network learning algorithms for pattern classification." *Neural Networks, IEEE Transaction on* 11.2 (2000): 436-451.
(78) Pavlidis, N. G., et al. "Spiking neural network training using evolutionary algorithms." *Neural Networks, 2005. IJCNN '05. Proceedings, 2005 IEEE International Joint Conference on.* Vol. 4. IEEE, 2005.
(79) Setiono, Rudy, and Lucas Chi Kwong Hui. "Use of a quasi-Newton method in a feedforward neural network construction algorithm." *Neural Networks, IEEE Transactions on* 6.1 (1995): 273-277.
(80) Moore, Kendra E., and Jack C. Chiang. "ALPHA/Sim: ALPHA/Sim simulation software tutorial," *Proceedings of the 32nd conference on Winter simulation,* pp. 259-267. Society for Computer Simulation International, 2000.
(81) Poor, H. Vincent, and Olympia Hadjiliadis. *Quickest detection,* Vol. 40. Cambridge: Cambridge University Press, 2009.
(82) Trees, Van, and L. Harry. *Detection, Estimation, and Modulation Theory-Part* 1-*Detection. Estimation, and Linear Modulation Theory,* John Wiley & Sons, 2001.
(83) F. Rosenblatt. "The perceptron: A probabilistic model for information storage and organization in the brain." *Psychological Review,* 65(6): 386-408, 1958.
(84) Fogel, David B., Eugene C. Wasson III, and Edward M. Boughton. "Evolving neural networks for detecting breast cancer." *Cancer letters* 96.1, pp. 49-53 (1995).
(85) Boyd, Stephen P., Venkataramanan Balakrishnan. Craig H. Barratt, Nasser M. Khraishi, Xiaoming Li, David G. Meyer, and Stephen A. Norman. "A new CAD method and associated architectures for linear controllers." *IEEE Transactions on Automatic Control,* 33, no. 3, pp. 268-283, 1988.
(86) Garcia. Carlos E., and A. M. Morshedi. "Quadratic programming solution of dynamic matrix control (QDMC)." *Chemical Engineering Communications* 46, no. 1-3, pp. 73-87, 1986.

(87) Athans, Michael, David Castanon, K-P. Dunn, C. Greene, Wing Lee, N. Sandell Jr, and Alan S. Willsky. "The stochastic control of the F-8C aircraft using a multiple model adaptive control (MMAC) method—Part I: Equilibrium flight." *IEEE Transactions on Automatic Control*, 22, no. 5, pp. 768-780, 1977.

(88) Narendra, Kumpati S., and Jeyendran Balakrishnan. "Adaptive control using multiple models." *IEEE Transactions on Automatic Control*, 42, no. 2, pp. 171-187, 1997.

(89) Anderson, Brian, Thomas Brinsmead, Daniel Liberzon, and A. Stephen Morse. "Multiple model adaptive control with safe switching" *International journal of adaptive control and signal processing* 15, no. 5, pp. 445-470, 2001.

(90) Morshedi, A. M., C. R. Cutler, and T. A. Skrovanek. "Optimal Solution of Dynamic Matrix Control with Linear Programing Techniques (LDMC)." *Proc. American Control Conference*, pp. 199-208, 1985.

(91) Gattu, Gangadhar, and Evanghelos Zafiriou. "Nonlinear quadratic dynamic matrix control with state estimation." *Industrial & engineering chemistry research* 31, no. 4, pp. 1096-1104, 1992.

(92) Morari, Manfred, and Jay H Lee. "Model predictive control: past, present and future." *Computers & Chemical Engineering* 23, no. 4, pp. 667-682, 1999.

REFERENCES AUTHORED BY INVENTORS

1) C. D. Schuman and J. D. Birdwell, "Dynamic Artificial Neural Networks with Affective Systems." *PLOS ONE*, vol. 8, is. 11, pp. 1-16, 2013.

2) C. D. Schuman, J. D. Birdwell and M. E. Dean, "Spatiotemporal Classification Using Neuroscience-Inspired Dynamic Architectures," *Biologically Inspired Cognitive Architectures*, pp. 1-9, 2014.

(3) Schuman, Catherine D., and J. Douglas Birdwell. "Variable structure dynamic artificial neural networks." *Biologically Inspired Cognitive Architectures* 6 (2013): 126-130.

(4) Dean, Mark E., Catherine D. Schuman, and J. Douglas Birdwell. "Dynamic Adaptive Neural Network Array." *Unconventional Computation and Natural Computation*. Springer International Publishing, 2014, 129-141.

(5) Schuman, Catherine D., J. Douglas Birdwell, and Mark Dean. "Neuroscience-inspired dynamic architectures." *Biomedical Science and Engineering Center Conference (BSEC), 2014 Annual Oak Ridge National Laboratory*, IEEE, 2014.

(6) Drouhard, Margaret, Catherine D. Schuman, J. Douglas Birdwell, and Mark E. Dean. "Visual Analytics for Neuroscience-Inspired Dynamic Architectures," *IEEE Symposium Series on Computational Intelligence*, 2014.

What we claim is:

1. A computer-implemented method of constructing and visualizing the operation and structure of a spiking/event-driven neural network of an ensemble of neural networks used for classification application of classifying hand-written digits zero through nine as having a digit value, the method using a processor apparatus, the processor apparatus comprising a scanner, a special purpose processor, memory, and a display capable of displaying at least a two-dimensional depiction of a portion of said neural network, and executing a special purpose stored program for first construction and then visualization of at least a digit recognizer substructure for performing a particular task of the given classification application using evolutionary optimization, the ensemble of neural networks recognizing a digit value of an input real-world hand-written image, the computer-implemented method comprising:

scanning by the scanner a first hand-written digit image having a known value between zero and nine to obtain network pixel image data for said hand-written digit having the known value, said network image pixel data comprising at least twenty-eight pixels by twenty-eight pixels scanned using the scanner comprising one of a camera producing digital images and an image scanner for scanning by one of by row, by column and by row and column scanning types;

loading the network pixel image data into memory and using one of a first fitness function and a second different fitness function to construct at least one digit recognizer substructure for recognizing the network pixel image data to produce a guessed digit value;

repeating the scanning and loading to determine an ensemble of neural networks for recognizing hand-written digits, each neural network of the ensemble of neural networks optimizing one of the first and the second fitness function by evolutionary optimization, the ensemble of neural networks comprising at least two hundred neural networks;

the first fitness function scoring at least five hundred selected images including ten hand-written digits between zero and nine of known value and the second fitness function being based on entropy;

constructing at least a portion of a structure of the at least one digit recognizer substructure of the ensemble of neural networks in said memory using the special purpose processor, said neural network structure portion comprising at least three neurons and at least one synapse, the three neurons being at three different locations in at least two-dimensional space and connected by at least one neural pathway, the neural network structure portion stored in memory comprising data describing a connection between one of the at least three neurons and the at least one synapse, the at least one synapse having a distance/delay depending on the distance between two neurons and the output of the at least one synapse input to a second neuron of the three neurons, at least one of the at least three neurons being an input neuron;

performing a discrete-event simulation using simulated time units for depicting discrete events comprising a neuron firing event and a synapse charge event in at least one neural network of the ensemble of neural networks, said neural network structure portion designed using evolutionary optimization for optimizing one of said first and said second fitness functions, the at least one neural network of the ensemble of neural networks comprising at least twenty-eight input neurons;

the ensemble of neural networks using a voting scheme to determine if an input image is one of a hand-written zero through nine and comparing the determined value with a stored known value for a training hand-written digit image stored in memory;

receiving input network image pixel data from the scanner for provision to each neural network of the ensemble of neural networks, clocking discrete events comprising a firing of a neuron and a synapse charge event and associated event times in simulated time units via a clock of the special purpose processor, portions of each said neural network corresponding to each of said at least three neurons and the at least one synapse, neural network data comprising discrete events and associated event times in simulated time units, the special purpose processor computing and storing in the memory, responsive to said network image pixel data received via the scanner, neural network discrete event data comprising the discrete events and associated event times corresponding to said portion of said neural network of the ensemble of neural networks comprising one of said at least three neurons and the at least one synapse, the special purpose processor using said neural network discrete event data to determine an at least two-dimensional depiction of said portion of the structure of the neural network of said ensemble of neural networks representing said correspondence of discrete events and associated event times to one of the at least three neurons and the synapse and tracing discrete events in said portion back in time to at least one input neuron to identify and depict at least one causality path between an input neuron and a neuron of said portion that is not an input neuron;

measuring activity levels of neural pathways to determine visibility of a digit recognizer substructure where a given opacity level defines a neural pathway to be hidden by activity level and visibility of neural pathways to be seen for a given digit recognizer substructure;

constructing a useful substructure or neural network portion for performing a particular sub-task in an ensemble of neural networks for recognizing digits 0 through 9 and using the visibility and distance/delay of neural pathways to determine a substructure or neural network portion to be one of surgically removed due to its being unsuccessful for a certain task and inserted to improve scanned digit image recognition performance of the ensemble of neural networks, and displaying said at least two-dimensional depiction of said portion of the structure of the neural network of the ensemble of neural networks with a depiction of the ensemble of neural networks using a display, the depiction providing information about a scanned input image and results of voting by the ensemble of neural networks resulting in a classification result having a digit one through nine value; and improving the operation of the ensemble of neural networks using evolutionary optimization with real-world input images, not members of a set of training input images, the operation comprising at least one discrete event associated with one of said at least three neurons and the synapse at an at least one discrete event time value in simulated time units when a real-world input image comprising a handwritten digit one through nine is scanned and recognized.

2. The computer-implemented method of claim 1 further comprising:

the special purpose processor repeating the computing and storing by the processor at a subsequent simulated event time unit to cause display of a sequence of discrete events in at least two different two-dimensional displays in simulated time units, the sequence of discrete events in at least two different two-dimensional displays representing activity of the ensemble of neural networks over the simulated time unit.

3. The computer-implemented method of claim 2 further comprising the special purpose processor calculating and the display displaying runtime in simulated network time units via a clock of said special purpose processor, a simulated network time unit being selectable in real time units comprising seconds.

4. The computer-implemented method of claim 2, the at least three neurons comprising at least thirty neurons, the at least thirty neurons comprising at least twenty-eight input neurons, a hidden neuron and a destination neuron, the input neurons, the hidden neuron and the destination neuron being represented by spheres of the same size with color to differentiate among input, hidden and destination neurons.

5. The computer-implemented method of claim 4 further comprising:

tracing an event in one of a digit recognizer substructure and the ensemble of neural networks to an input neuron and displaying one of a causality path, an input/output path, a digit recognizer substructure and an activity of the input neuron and a synapse charge event of the sequence of discrete events in simulated time units and the ensemble of neural networks recognizing a real world scanned input digit image.

6. The computer-implemented method of claim 2 wherein each event of the sequence of events is included in a display according to a simulated time unit value, the method comprising representing each event associated with a synapse as one of a circle, a polygon, and a sphere associated with the representation of the synapse.

7. The computer-implemented method of claim 1 wherein the display further comprises a plurality of connections between the at least three neurons and the at least one synapse in two-dimensional space, the neurons comprising at least one input neuron, one hidden neuron based on activity level and an output neuron, wherein a connection path between the at least one input neuron and the output neuron comprises a causality path of the network image pixel data digit classification application.

8. The computer-implemented method of claim 1 wherein the application is classification using evolutionary optimization to recognize one of a hand-written zero through nine digit input scanned digital image, neuron charge levels falling within a range of −1.0 to +1.0, individual neurons having varying threshold charge levels and the classification comprises a recognition of an input scanned digital image of the real-world handwritten digit as a real-world digit having a value for display.

9. The computer-implemented method of claim 8 further comprising:

comparing a display of a recognition of a first input image recognized as a first digit received by the scanner with a second input image recognized as a second different digit received by the scanner, the processor comparing the first and second input images and recognizing the first input image as representing a similar image to the second input image.

10. The computer-implemented method of claim 8 further comprising:

differentiating between one of a synapse and a neuron that has already activated in the ensemble of neural networks and one of a synapse and a neuron that has not yet actuated by current charge level at the simulated time unit value of imaging at least a neuron firing event and by brightness level of a synapse charge event of the ensemble of neural networks.

11. The computer-implemented method of claim 8 further comprising:

using a voting scheme to determine a classification of an input digital image output of the scanner to a plurality of neural networks of the ensemble of neural networks as one having a value between one and nine according to scanning type, one of by row, by column and by row and column, and voting of the voting scheme being by the ensemble of neural networks.

12. The computer-implemented method of claim 1 further comprising:
rotating, zooming and translating the at least two-dimensional display in three-dimensional space of the depiction of the neural networks comprising the ensemble of neural networks and according to the simulated time unit value.

13. The computer-implemented method of claim 1 further comprising:
varying the value of a simulated time unit in seconds comprising a value of simulated time units for visualizing a neuron firing event and a synapse charge event in the ensemble of neural networks, clocking comprising a given discrete event occurring in a simulated time unit window that is variable in real time.

14. The computer-implemented method of claim 1 further comprising:
increasing the size of one of a neuron and a synapse as an discrete event occurs on the neuron or the synapse, increasing a charge value of a neuron as the value approaches a threshold firing event value, or a brightness value of synapse according to a charge propagating along the synapse at a simulated time unit value.

15. The computer-implemented method of claim 1 wherein the application comprises classification, the method further comprising:
selectively actuating, responsive to receipt of command data, a particular visualization comprising one of a visualization of a detection of an event and network activity leading to the event and animating a causality path associated with the event according to a selected simulated time unit value.

16. A special purpose computer apparatus for constructing and visualizing the operation and structure of a spiking/event-driven neural network of an ensemble of neural networks for a classification application of classifying handwritten digits zero through nine as having a digit value, the special purpose computer apparatus comprising a scanner, a special purpose processor, associated memory, and a display capable of displaying at least a two-dimensional depiction of a portion of said neural network, and executing a special purpose stored program for first construction and then visualization of at least a digit recognizer substructure for performing a particular task of the given classification application using evolutionary optimization, the ensemble of neural networks recognizing a digit value of an input real-world hand-written image, the apparatus comprising:
a scanner comprising one of a camera producing a digital image of and a scanner for scanning a hand-written digit having a known value between zero and nine to obtain network pixel image data for a hand-written digit having the known value comprising at least twenty-eight pixels by twenty-eight pixels and the scanner for scanning by one of by row, by column and by row and column scanning types;
a memory, responsive to the scanner, for receiving the network pixel image data into the memory and the special purpose processor using one of a stored first fitness function and a second different fitness function to construct at least one neural network and using of one of said stored first and said stored second fitness function to construct the at least one digit recognizer substructure for recognizing the scanned network pixel data as a hand-written digit having a value between zero and nine recognizing a guessed digit value;
the special purpose computer for repeating the scanning and receiving to determine an ensemble of neural networks, each neural network of the ensemble of neural networks optimizing one of the first and the second fitness function by evolutionary optimization, the ensemble of neural networks comprising at least two hundred neural networks;
the first fitness function scoring at least five hundred selected images including ten hand-written digits between zero and nine of known value and the second fitness function being based on entropy;
the special purpose processor for loading the network pixel image data into the memory describing via at least one digit recognizer substructure of a neural network of the ensemble of neural networks, the digit recognizer substructure of a neural network comprising at least three neurons and at least one synapse, the three neurons being at three different locations in two-dimensional space, the digit recognizer substructure comprising a neural pathway between one of the at least three neurons and the at least one synapse, the three neurons being at three different locations in at least two-dimensional space and connected by at least one neural pathway to the at least one synapse, the at least one synapse having a distance/delay depending on the distance between two neurons and the output of the at least one synapse input to a second neuron of the three neurons, at least one of the at least three neurons being an input neuron;
the special purpose processor for performing a discrete event simulation using simulated time units for depicting discrete events comprising a neuron firing event and a synapse charge event and associated event times, the discrete events occurring at a value of simulated time units in the ensemble of neural networks, the at least one neural network of the ensemble of neural networks designed using evolutionary optimization to optimize one of a first and a second fitness function to recognize a particular digit between zero and nine, the at least one neural network of the ensemble of neural networks comprising at least twenty-eight input neurons;
the special purpose processor further using a voting scheme to determine if an input image is one of a hand-written digit value of zero through nine and comparing the determined digit value with a stored known value for a training hand-written digit image stored in memory and clocking discrete events and associated event times in simulated time units via a clock of the special purpose processor;
the special purpose processor for receiving network image pixel data from the scanner for provision to each neural network of the ensemble of neural networks, portions of each said neural network corresponding to each of said at least three neurons and the at least one synapse, said network image pixel data further comprising discrete events and associated event times in simulated time units,
the special purpose processor for computing and storing in the memory, responsive to said network image pixel data received via the scanner, discrete event data representing said events generated within the neural network of the ensemble of neural networks in response to the network image pixel data and the correspondence of each said portion of said network image pixel data to a digit recognizer substructure comprising at least three neurons and the at least one synapse at least one discrete event time in simulated time units, the special purpose processor for using said network image pixel data and said discrete event data to determine an at least two-dimensional depiction of a portion of one neural network of said ensemble of neural networks representing the at least one digit recognizer substructure of said portion and at least one correspondence of said discrete event data to one of the at least three neurons and the at least one synapse by tracing discrete events in the digit recognizer substructure or the ensemble of neural networks back in time to an input neuron, a path back to an input neuron from one of the at least three neurons that is not an input neuron and at least one synapse comprising a causality path;

the special purpose processor for measuring activity levels of neural pathways to determine visibility of a substructure where a given opacity level defines a neural pathway to be hidden by activity level and visibility of neural pathways to be seen for a given digit recognizer substructure;

the special purpose processor for constructing a useful substructure for performing a particular sub-task in an ensemble of neural networks for recognizing hand-written digits zero through nine and using the visibility and distance/delay of neural pathways to determine a substructure to be one of surgically removed due to its being unsuccessful for a certain task and inserted to improve scanned digit image recognition performance of the ensemble of neural networks, and the display, responsive to the special purpose processor, for displaying said at least two-dimensional depiction of each of the plurality of neural networks comprising the ensemble neural network using said display, the at least two-dimensional depiction providing information about network image pixel data and results of voting by the ensemble of neural networks resulting in a classification result of the network image pixel data as having a digit one through nine value; and the processor improving the operation of the ensemble of neural networks using evolutionary optimization with real-world input images, not members of a set of training images, the operation comprising at least one discrete event associated with one of said at least three neurons and the at least one synapse at said at least one discrete event time value in simulated time units when a real-world input image when a real world input image comprising handwritten digit values is scanned, recognized and displayed via a voting determination of the ensemble of neural networks.

17. The computer apparatus of claim 16 further comprising:

the special purpose processor repeating the computing and storing by the special purpose processor in memory at a subsequent simulated event time unit to cause display of a sequence of events in at least two different two-dimensional displays in simulated time units, the sequence of events in at least two different two-dimensional displays representing activity of a digit recognizer substructure of the ensemble of neural networks over a simulated time unit range.

18. The computer apparatus of claim 17 wherein the application is classification using evolutionary optimization to recognize one of a hand-written zero through nine digit image, neuron charge levels falling within a range of −1.0 and +1.0, individual neurons having varying firing threshold values and the special purpose processor comprising a recognition of an input scanned input image as a real-world digit having a value for display.

19. The computer apparatus of claim 18 further comprising:

the special purpose processor for comparing a stored display of a recognition of a first input image with a second stored display of a second image output by two different digit recognizer substructures, the special purpose processor for recognizing the first input image as the second image.

20. The computer apparatus of claim 18 further comprising:

the special purpose processor actuating the display to differentiate between one of a synapse and a neuron that has already activated in the neural network and one of a synapse and a neuron that has not yet actuated by charge level between −1.0 and +1.0 for a neuron and by a propagation distance/delay for a synapse.

21. The computer apparatus of claim 17 further comprising:

the special purpose processor varying the value of a reference simulated time unit for visualizing the sequence of events in a digit recognizer substructure or the ensemble of neural networks to recognize one of a real world hand-written digit having a value between zero and nine.

22. The computer apparatus of claim 16, the display further comprising a plurality of connections between the at least two of the three neurons and the at least one synapse in two-dimensional space, the neurons comprising at least one input neuron, one hidden neuron based on activity level and an output neuron, wherein a connection path between the at least one input neuron and the output neuron comprises a causality path of the network image pixel data digit classification application.

23. The computer apparatus of claim 22 further comprising:

the processor tracing an event in one of a digit recognizer substructure and the ensemble of neural networks to an input neuron and displaying one of an input/output path, a causality path, a digit recognizer substructure and a path based on activity of an input neuron in a depiction of a sequence of the events over simulated time units from the firing of an input neuron at simulated time unit zero to reach an output neuron through at least one neural pathway including at least one synapse.

24. The computer apparatus of claim 16, the special purpose processor for calculating and the display for displaying runtime of the ensemble of neural networks in simulated network time units via a clock of said special purpose processor, a simulated network time unit being selectable in real time units comprising seconds.

25. The computer apparatus of claim 16, the at least three neurons comprising at least thirty neurons, the at least thirty neurons comprising at least twenty-eight input neurons, a hidden neuron and a destination neuron, the display representing the input neurons, the hidden neuron and the destination neuron represented by spheres of the same size with color to differentiate among input, hidden and destination neurons.

26. The computer apparatus of claim 16 further comprising:

the special purpose processor for actuating the display for rotating, zooming and translating the two-dimensional depiction of the ensemble of neural networks for recognizing one often digit values of a real-world handwritten input digitized image in three-dimensional space and according to a simulated time unit value.

* * * * *